(12) United States Patent
Nakamura et al.

(10) Patent No.: US 7,895,201 B2
(45) Date of Patent: Feb. 22, 2011

(54) INFORMATION PROCESSING APPARATUS, METHODS, AND PROGRAM FOR SEARCHING SETS FOR AN ELEMENT

(75) Inventors: Akira Nakamura, Kanagawa (JP); Hirotaka Suzuki, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 853 days.

(21) Appl. No.: 11/324,562

(22) Filed: Jan. 4, 2006

(65) Prior Publication Data

US 2006/0153457 A1 Jul. 13, 2006

(30) Foreign Application Priority Data

Jan. 7, 2005 (JP) .......................... P2005-002933

(51) Int. Cl.
*G06F 7/00* (2006.01)
(52) U.S. Cl. ...................................... 707/736; 707/737
(58) Field of Classification Search .................... 707/5, 707/736, 737
See application file for complete search history.

(56) References Cited

U.S. PATENT DOCUMENTS 5,974,412 A * 10/1999 Hazlehurst et al. .............. 707/3

FOREIGN PATENT DOCUMENTS

| JP | 3-273581 | 12/1991 |
|---|---|---|
| JP | 05-028322 | 2/1993 |
| JP | 08-249453 | 9/1996 |
| JP | 11-242674 | 9/1999 |
| JP | 2000-137732 | 5/2000 |
| JP | 2001-126063 | 5/2001 |
| JP | 3273581 | 2/2002 |
| JP | 2002-183206 | 6/2002 |

OTHER PUBLICATIONS

Notification of Reasons for Refusal, issued by Japanese Patent Office on Jan. 12, 2010 in the counterpart application No. 2005-002933.
Seiichi Nakagawa, Information science core curriculum, Lecture pattern information processing, Matuzen Co., Ltd., Mar. 20, 1999, pp. 50-54.
Seiichi Nakagawa, Information science core curriculum, Lecture pattern information processing, Matuzen Co., Ltd., Mar. 20, 1999, pp. 52-53, with words in Fig. 3.3 and Table 3.2 being marked with numbers.

* cited by examiner

*Primary Examiner*—Wilson Lee
*Assistant Examiner*—Michael Le
(74) *Attorney, Agent, or Firm*—Finnegan, Henderson, Farabow, Garrett & Dunner, L.L.P.

(57) ABSTRACT

The present invention is intended to provide a quick search of a plurality of sets. A common representative point setting block sets a common representative point common to sets on the basis of a feature vector stored in a vector information storage block and stores the set point into a common representative point information storage block. A neighborhood table group creation block creates a neighborhood table for each set on the basis of the vector information and common representative point information and stores the created table in a neighborhood table group storage block. A nearest neighborhood vector group search block, upon acquisition of an input vector, searches each set for a nearest neighborhood vector of the input vector on the basis of the vector information, the common representative point information, and the neighborhood table group and outputs the retrieved nearest neighborhood vector as a comparison result. The present invention is applicable to image processing apparatuses.

12 Claims, 38 Drawing Sheets

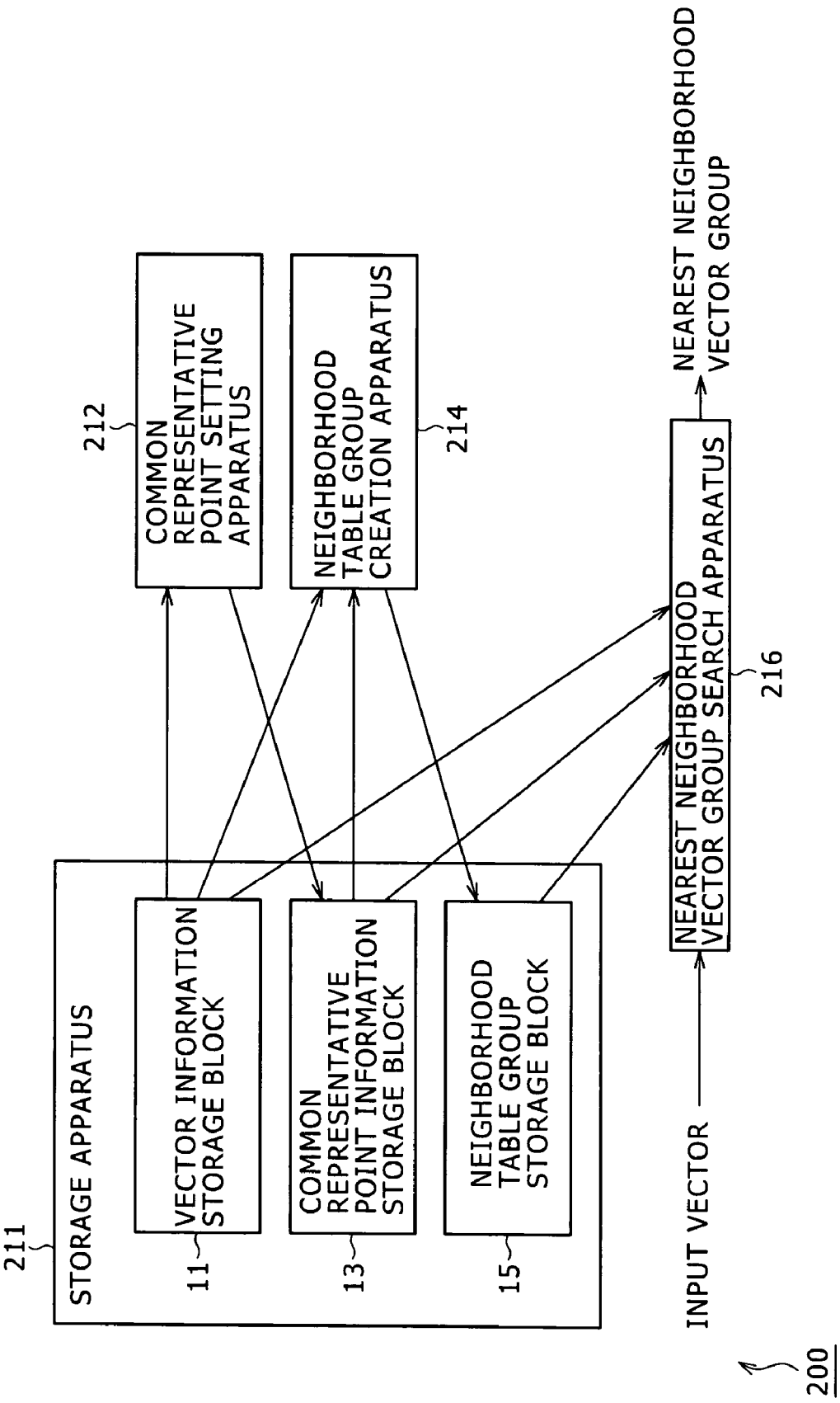

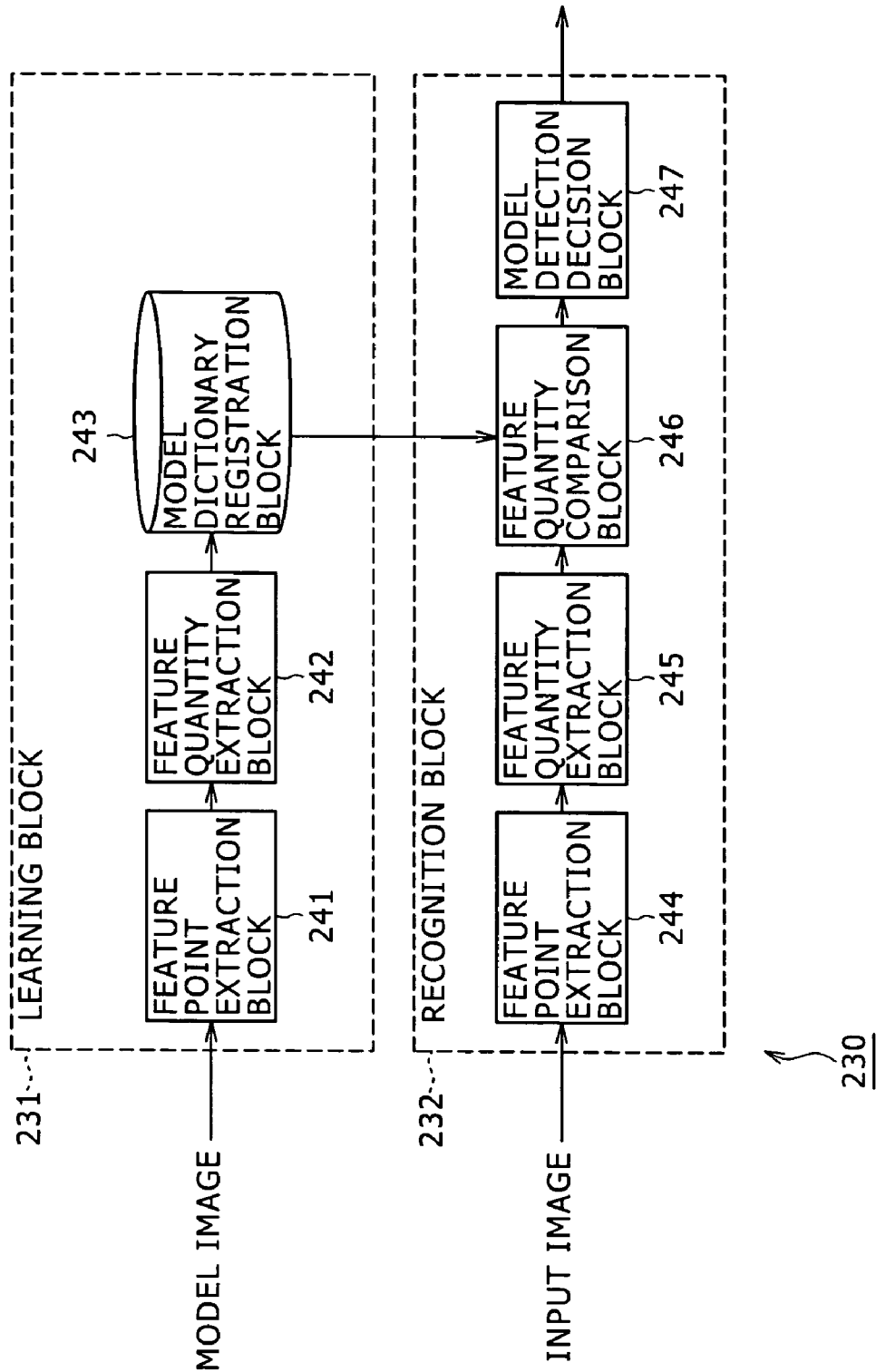

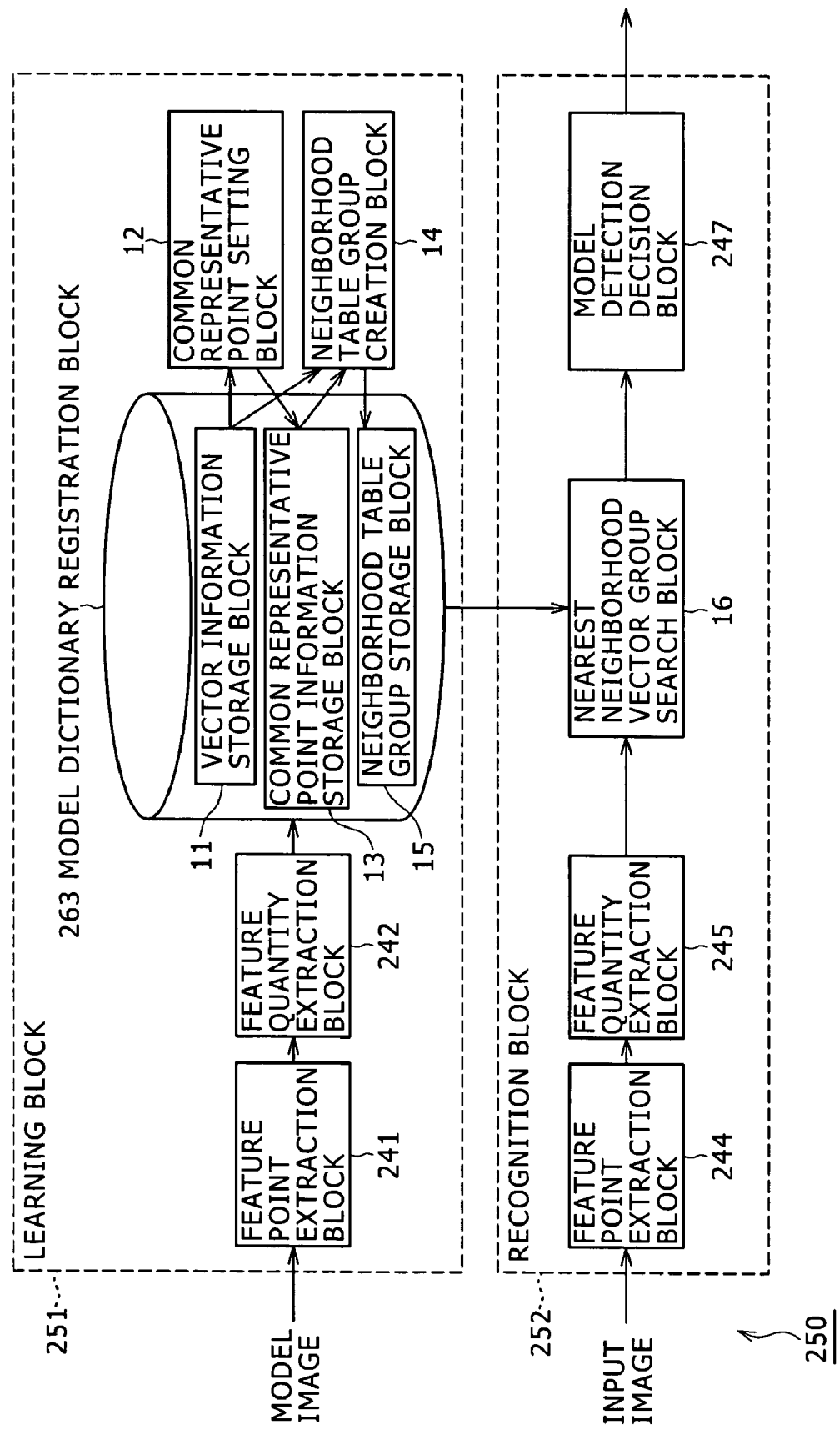

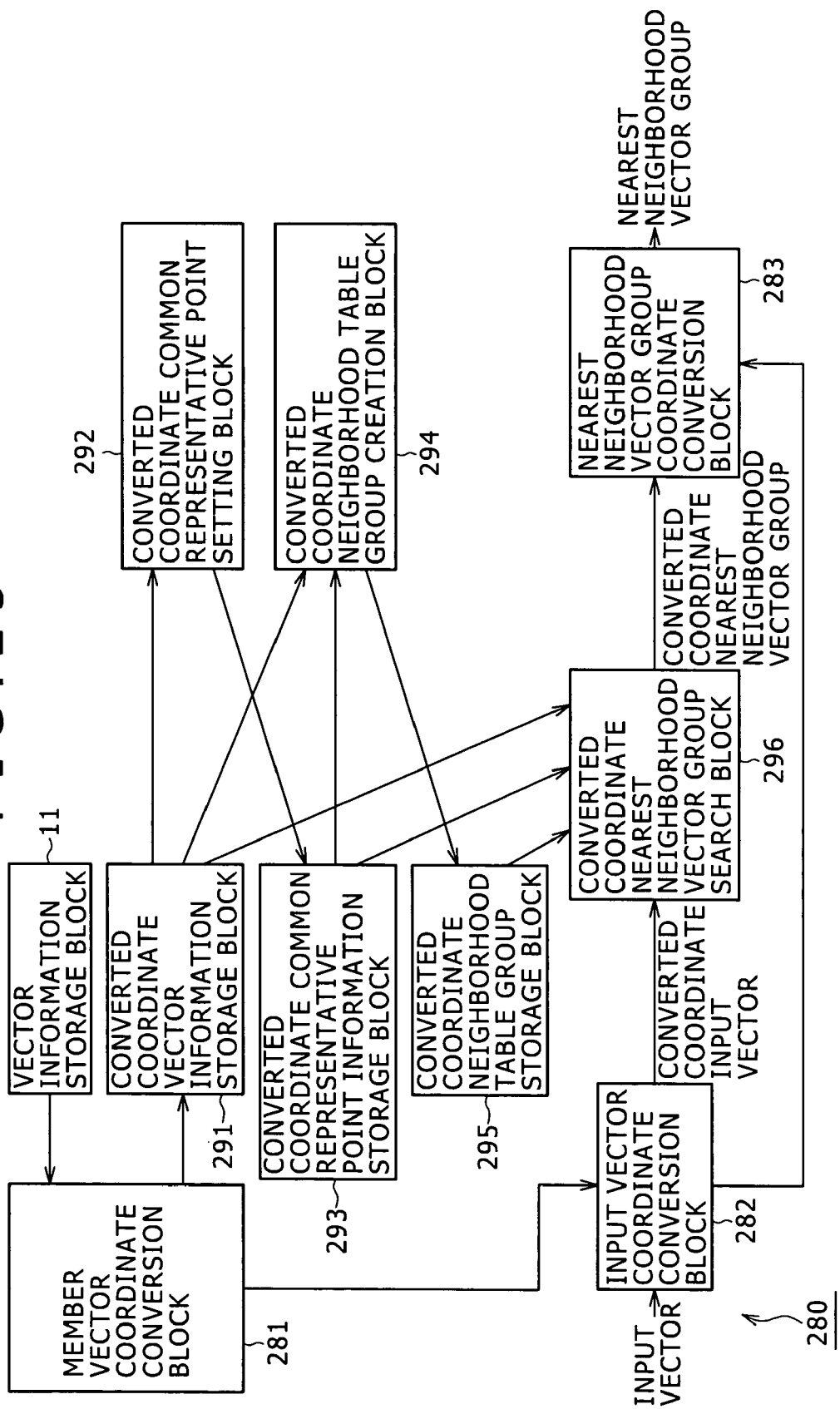

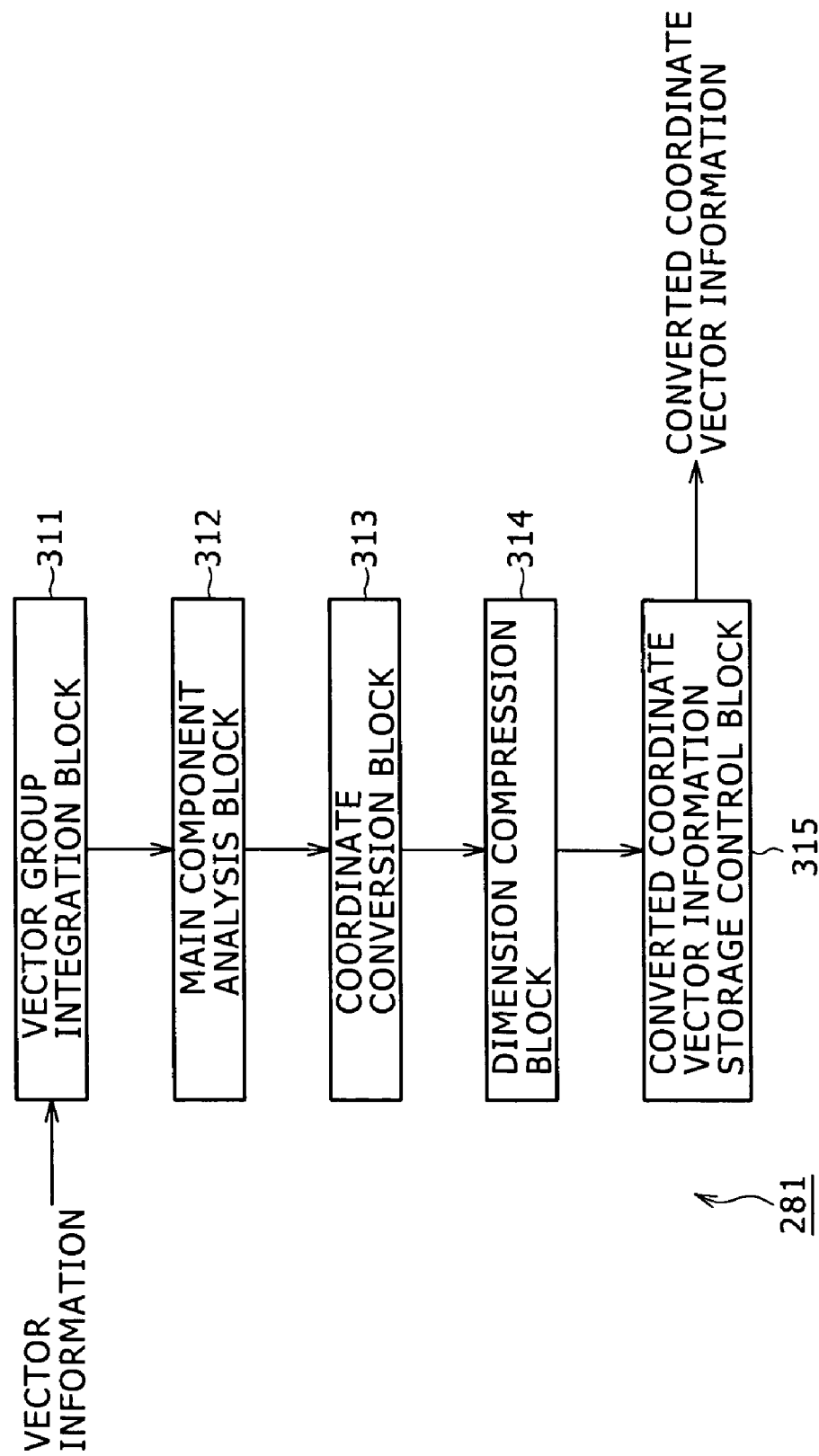

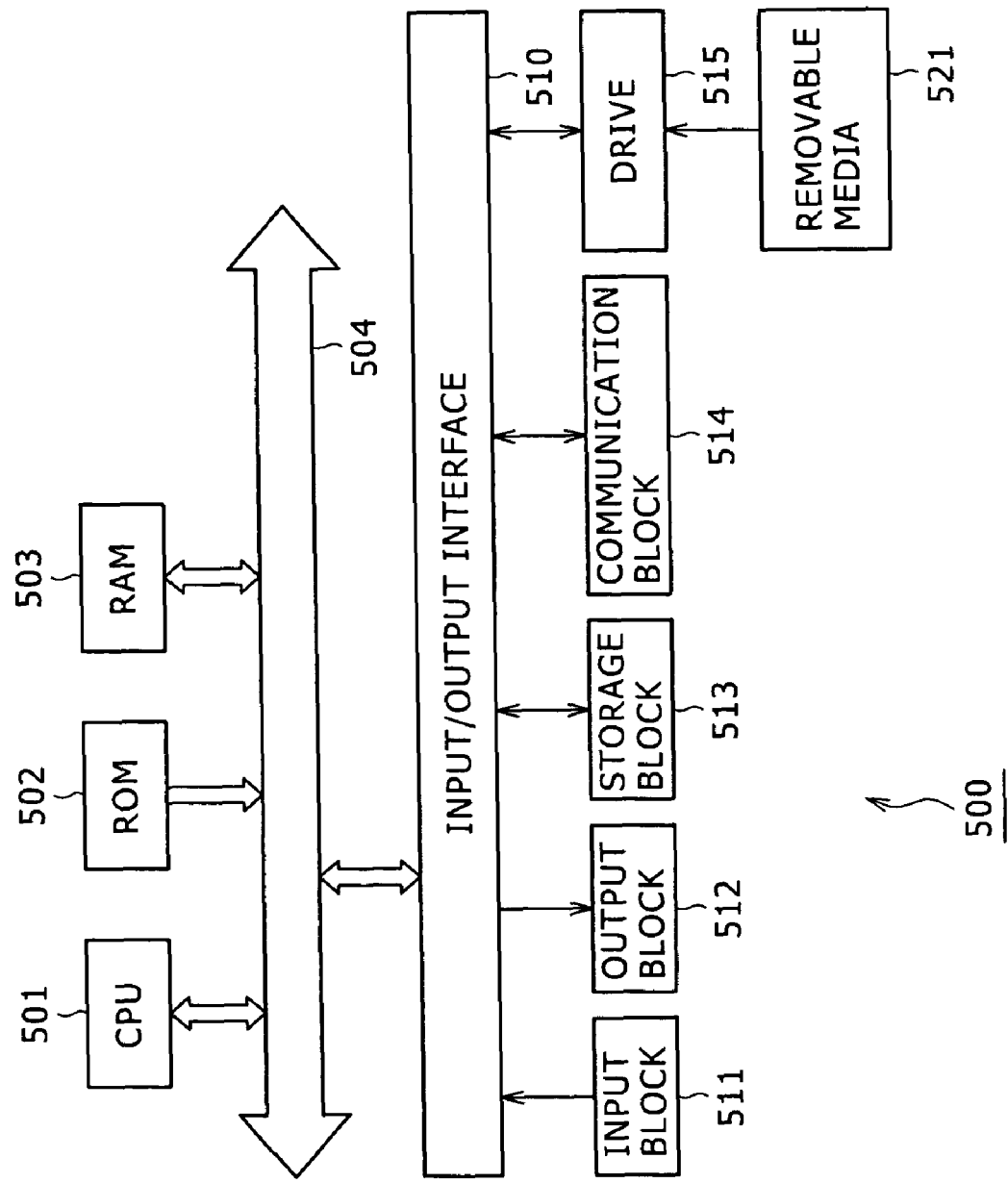

INFORMATION PROCESSING APPARATUS, METHODS, AND PROGRAM FOR SEARCHING SETS FOR AN ELEMENT

CROSS REFERENCES TO RELATED APPLICATIONS

The present invention contains subject matter related to Japanese Patent Application JP 2005-002933 filed in the Japanese Patent Office on Jan. 7, 2005, the entire contents of which being incorporated herein by reference.

BACKGROUND OF THE INVENTION

The present invention relates to an information processing apparatus and method and a program. More particularly, the present invention relates to an information processing apparatus and method and a program that are capable of searching each of a plurality, if any, of sets subject to search for desired elements at high speeds.

Many high-seed search methods have been proposed to solve the so-called nearest neighbor search problem in which, given an n-dimensional input vector, a nearest neighbor vector neighborhood for the input vector is obtained from a set of n-dimensional vector groups.

For example, a method was proposed in which, of N centroid vectors v(i), a predetermined centroid vector is set to remarkable vector $v_1$ and, of distances between remarkable vector $v_1$ and centroid vector v(i), a distance near remarkable vector v1 at N/k-th order is set to radius distance $D_R$ of the remarkable vector to compare distance $D_1$ between input vector u and remarkable vector $v_1$ and $D_R/2$ that is ½ of radius distance $D_R$, thereby determining a range of search for an optimum vector in accordance with a result of the comparison (refer to Japanese Patent No. 3273581 for example).

Also, such a search method is used to search for feature vectors in image recognition processing for example. A feature vector is obtained by combining feature parameters and vectorizing the combination. Comparison between the feature vector of an image subject to processing and the feature vector of a prepared model image may identify a relationship between the image subject to processing and the model image. The image recognition processing based on feature vectors allows the recognition that is hardly affected by viewpoint change or brightness change.

SUMMARY OF THE INVENTION

However, in the above-mentioned method, the scheme in which nearest neighborhood vectors are obtained from many sets of vector groups (many model images for example) when a certain input vector is given (by comparing an image subject to processing with two or more model images) presents problems of lowering efficiency and processing speed if the conventional nearest neighborhood search is simply repeated.

Therefore, present invention addresses the above-identified and other problems associated with related-art methods and apparatuses by providing an information processing apparatus and method and a program that are capable of high-speed searching two or more vector sets if any for neighborhood vectors of an input vector.

In carrying out the invention and according to one embodiment thereof, there is provided an information processing apparatus for searching a plurality of sets for a desired element. The information processing apparatus may include: common representative point setting means for setting common representative points that are a predetermined number of elements of a set obtained by averaging features of the plurality of sets; neighborhood table creation means for creating, for each of the plurality of sets, a neighborhood table that is table information associated with elements of each of the plurality of sets located in the neighborhood of each common representative point on the basis of the common representative points set by the common representative point setting means; and search means for searching elements registered in the neighborhood table created by the neighborhood table creation means for a desired element.

According to the present invention, there is provided an information processing method for an information processing apparatus for searching a plurality of sets for a desired element. The information processing method may include the steps of: setting common representative points that are a predetermined number of elements of a set obtained by averaging features of the plurality of sets; creating, for each of the plurality of sets, a neighborhood table that is table information associated with elements of each of the plurality of sets located in the neighborhood of each common representative point on the basis of the common-representative points set by the common representative point setting step; and searching elements registered in the neighborhood table created by the neighborhood table creation step for a desired element.

According to the present invention, there is provided a program for making a computer execute search processing for searching each of a plurality of sets for a desired element. The program may include the steps of: setting common representative points that are a predetermined number of elements of a set obtained by averaging features of the plurality of sets; creating, for each of the plurality of sets, a neighborhood table that is table information associated with elements of each of the plurality of sets located in the neighborhood of each common representative point on the basis of the common representative points set by the common representative point setting step; and searching elements registered in the neighborhood table created by the neighborhood table creation step for a desired element.

The present invention is intended to provide quick search of a plurality if any of sets subject to search for desired members.

BRIEF DESCRIPTION OF THE DRAWINGS

FIG. 22 is a block diagram illustrating an exemplary configuration of a feature quantity comparison system practiced as another embodiment of the invention;

FIG. 23 is a block diagram illustrating an exemplary configuration of an image processing apparatus according to the invention;

FIG. 24 is a block diagram illustrating another exemplary configuration of the image processing apparatus according to the invention;

FIG. 25 is a block diagram illustrating an exemplary configuration of a feature quantity comparison apparatus practiced as a separate embodiment of the invention;

FIG. 29 is a block diagram illustrating a detail exemplary configuration of a member vector coordinate conversion block shown in FIG. 25;

FIG. 38 is a block diagram illustrating an exemplary configuration of a personal computer according to the invention.

DETAILED DESCRIPTION OF THE PREFERRED EMBODIMENTS

This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Further, the description hereof does not denote the entire invention described herein. In other words, the existence of any invention described herein and not claimed herein will not deny the existence of any inventions that may be filed as a divisional application, emerge as a result of amendment, or added hereto in the future.

In the present invention, an information processing apparatus (a feature quantity comparison apparatus shown in FIG. 1 for example) for searching a plurality of sets for desired elements is provided. This information processing apparatus has common representative point setting means (a common representative point setting block shown in FIG. 1 for example) for setting common representative points that are the predetermined number of elements of a set in which the features of a plurality of sets are averaged, neighborhood table creation means (a neighborhood table group creation block shown in FIG. 1 for example) for creating, for each set, a neighborhood table providing table information associated with the elements of sets located in the neighborhood of each common representative point on the basis of the common representative points set by the common representative point setting means, and search means (a nearest neighborhood vector group search block shown in FIG. 1 for example) for searching the elements entered in the neighborhood table created by the neighborhood table creation means for desired elements.

Figure 2:
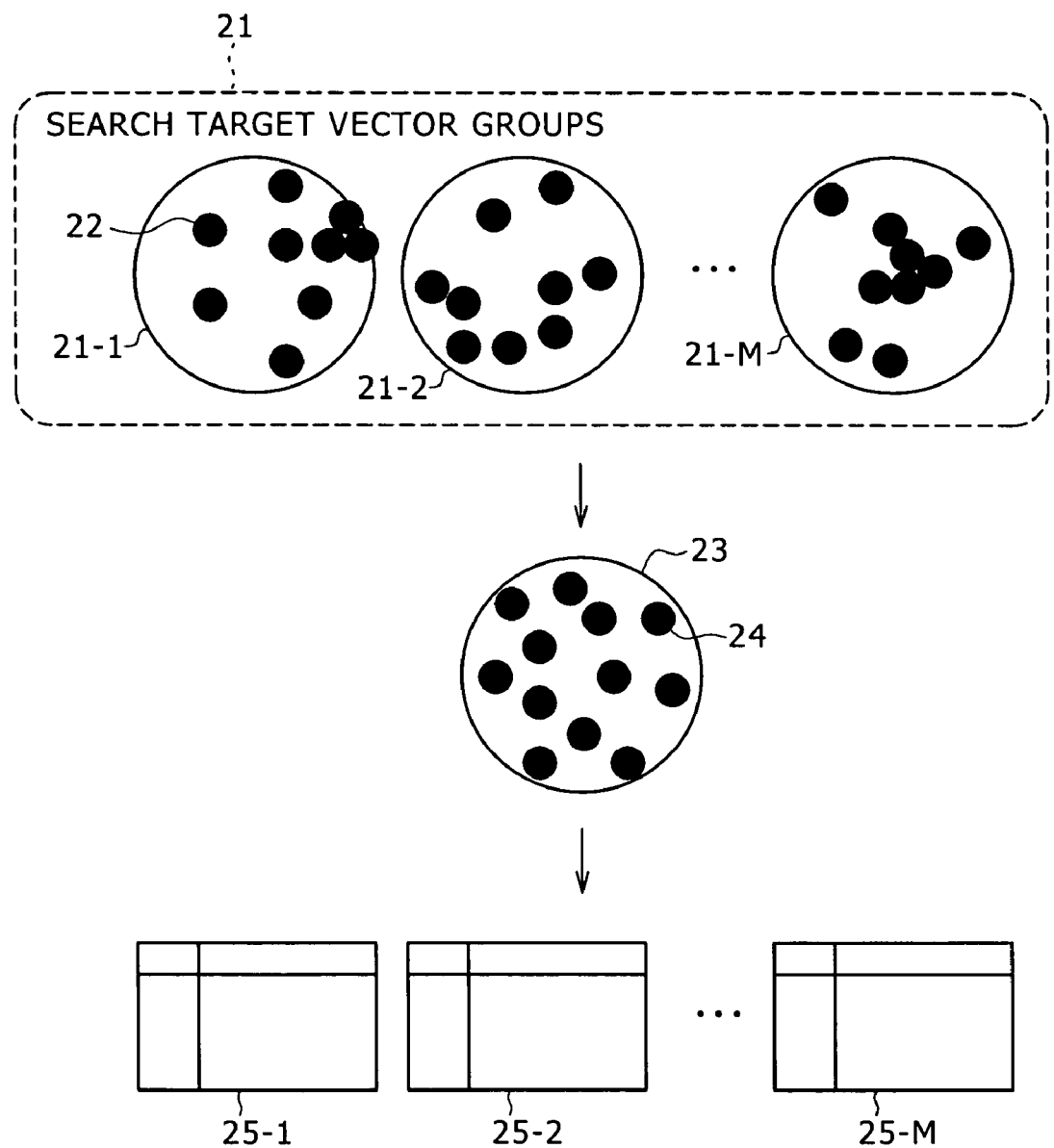
FIG. 2 is a schematic diagram illustrating a manner of creating a neighborhood table group.

The above-mentioned common representative point setting means is adapted to set a common representative point (a common representative point shown in FIG. 2 for example) on the basis of all elements (feature vectors shown in FIG. 2 for example) of a plurality of sets (sets shown in FIG. 2 for example).

The above-mentioned common representative point setting means is adapted to set a common representative point (a common representative point shown in FIG. 2 for example) on the basis of a part of elements (feature vectors shown in FIG. 2 for example) of a plurality of sets (sets shown in FIG. 2 for example).

The above-mentioned search means is adapted to search the elements registered in a neighborhood table (a neighborhood table shown in FIG. 3 for example) created by the neighborhood table creation means for an element nearest to a target element (a nearest neighborhood vector shown in FIG. 4 for example) as a desired element.

The above-mentioned nearest neighborhood table contains elements of a predetermined number (K elements for example) in an order nearer to the common representative point and distance information (distance information shown in FIG. 2 for example) that is ½ of a distance from the common representative point of each element. Only if the distance from the common representative point of a search target element is shorter than a maximum value of the distance information corresponding to the common representative point in the neighborhood table (step S115 shown in FIG. 19 for example), the search means searches the elements registered in the neighborhood table for a desired element (step S117 shown in FIG. 19 for example); otherwise, the search means searches all elements in the set for a desired element (step S119 shown in FIG. 19 for example).

The above-mentioned information processing apparatus also has main component analysis means (a main component analysis block shown in FIG. 29 for example) for analyzing the main component of the distribution of elements each set and coordinate conversion means (a coordinate conversion block shown in FIG. 29 for example) for converting the coordinates of each element such as the main component obtained by the main component analysis means is made one of the coordinate axes.

The above-mentioned information processing apparatus further has dimensional compression means (a dimensional compression block shown in FIG. 29 for example) for compressing the number of dimensions of the distribution of elements converted in coordinate by the above-mentioned coordinate conversion means to reduce the number of dimensions.

The above-mentioned search means (a neighborhood vector group search block shown in FIG. 34 for example) is adapted to subject two or more elements having different types to search targets, thereby searching the elements registered in the neighborhood table for a desired element near each of the two or more target elements.

Figure 35:
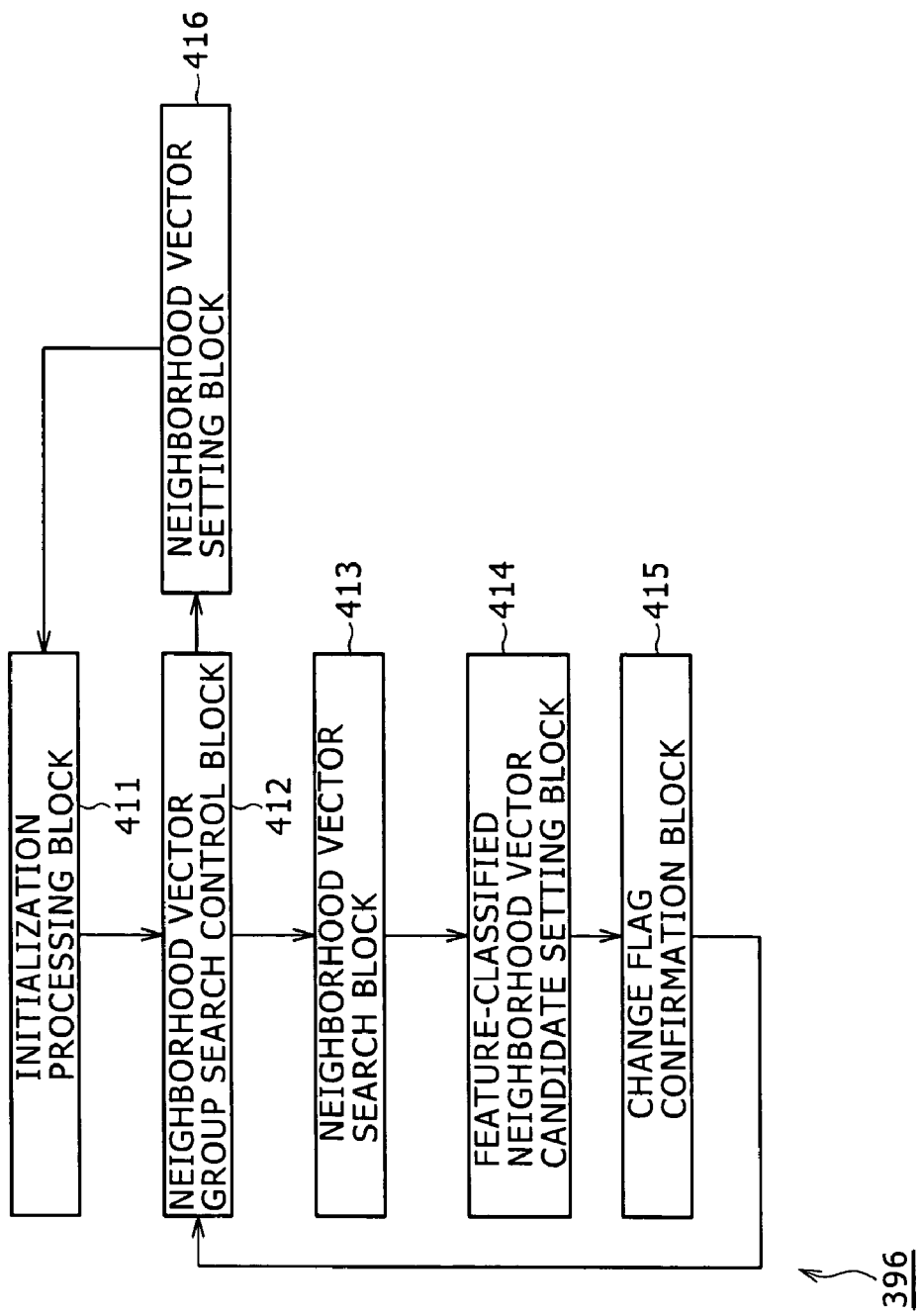
FIG. 35 is a block diagram illustrating a detail exemplary configuration of neighborhood vector group search block shown in FIG. 34.

The above-mentioned search means (a neighborhood vector search block shown in FIG. 35 is adapted to search for an element near one element subject to search and use a result of this search for the search for a element near another element subject to search.

Figure 14:
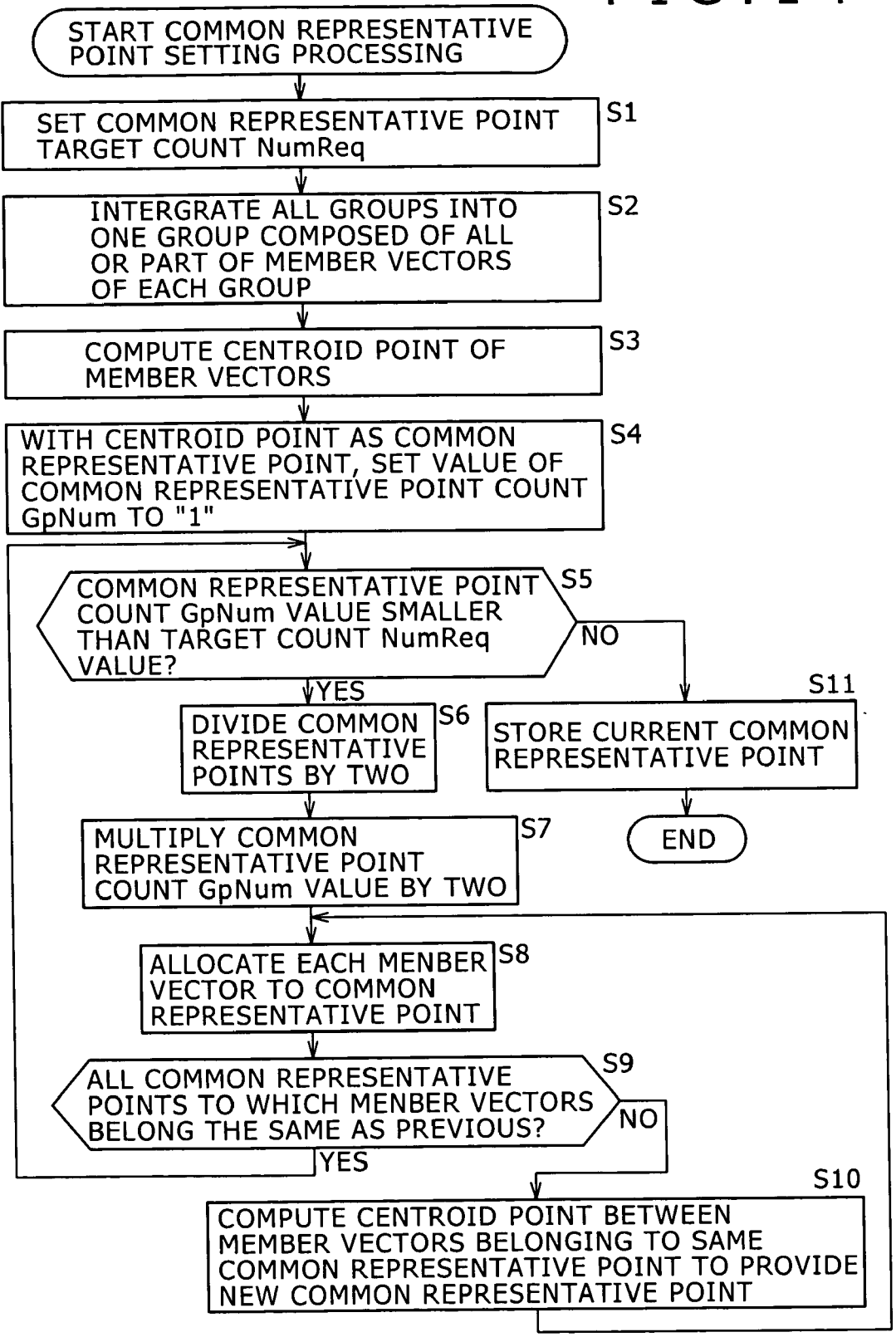
FIG. 14 is a flowchart indicative of exemplary common representative point setting processing.

In the present invention, an information processing method for an information processing apparatus (the feature quantity comparison apparatus shown in FIG. 1 for example) for searching a plurality of sets for desired elements is provided. The above-mentioned information processing method has steps of setting common representative points that are the predetermined number of elements of a set in which the features of a plurality of sets are averaged (steps S4 and S10 shown in FIG. 14 for example), creating, for each set, a neighborhood table providing table information associated with the elements of sets located in the neighborhood of each common representative point on the basis of the common representative points set by the process of the common representative setting step (step S33 shown in FIG. 15 for example), and searching the elements entered in the neighborhood table created by the process of the neighborhood table creation step for desired elements (step S93 shown in FIG. 18 for example).

A program according to the invention is substantially the same as the above-mentioned information processing method in embodiment in which there is a correlation between processing steps (by way of example).

The following describes embodiments of the present invention with reference to accompanying drawings.

Figure 1:
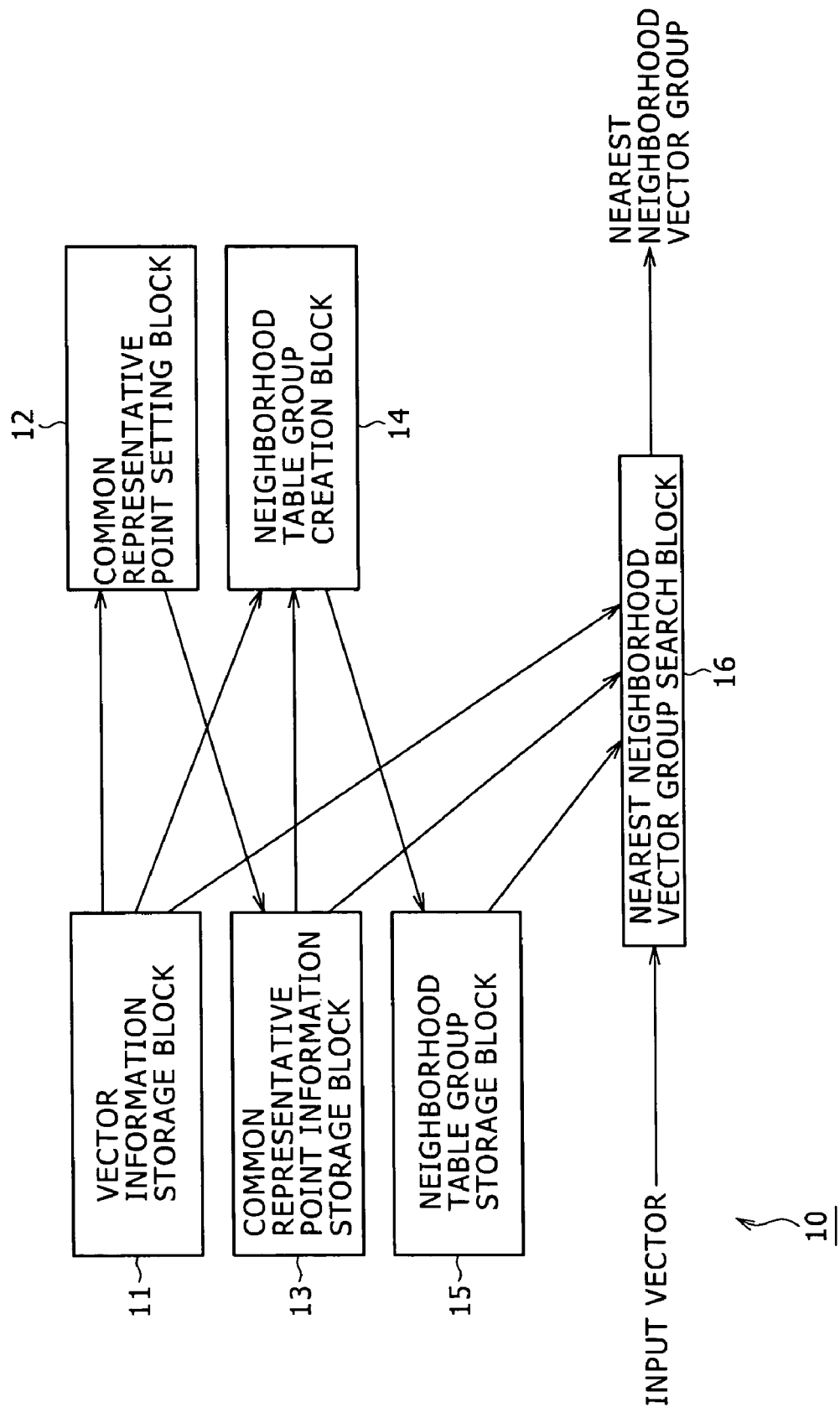
FIG. 1 is a block diagram illustrating an exemplary configuration of a feature quantity comparison apparatus practiced as one embodiment of the invention.

Now, with reference to FIG. 1, there is shown an exemplary configuration of a feature quantity comparison apparatus practiced as one embodiment of the invention.

The feature quantity comparison apparatus 10 shown in FIG. 1 recognizes feature vectors obtained by vectorizing parameters for example that are representative of the feature of information subject to processing such as image and voice. This apparatus compares an input vector that is an entered feature vector with a model vector group, searches each vector set for a vector nearest to the input vector (or a nearest neighborhood vector), and outputs the retrieved nearest neighborhood vector group. As shown in FIG. 1, the feature quantity comparison apparatus 10 has a vector information storage block 11, a common representative point setting block 12, a common representative point information storage block 13, a neighborhood table group creation block 14, a neighborhood table group storage block 15, and a nearest neighborhood vector group search block 16.

The vector information storage block 11 has a storage medium such as a hard disc or a semiconductor memory for example, storing vector information that is the information associated with model feature vectors. Feature vectors are handled as a set for each model. The vector information storage block 11 stores two or more sets of feature vectors. Namely, the vector information storage block 11 stores feature vectors of two or more models and supplies these feature vectors to the common representative point setting block 12, the neighborhood table group creation block 14, and the nearest neighborhood vector group search block 16 as required.

The common representative point setting block 12 gets feature vectors from the vector information storage block 11 and sets a representative point common to the sets (or models), this point being called a common representative point. A common representative point is information indicative of the feature of the distribution of feature vectors of each set (or model) and is a point (or a vector) representative of all or a part of feature vectors. Namely, if a plurality of sets stored in the vector information storage block 11 is handled as one set, a common representative point is a point (or a new element) indicative of the feature of the distribution of the elements of that set. In other words, a set of common representative points is a set obtained by averaging the features of the sets stored in the vector information storage block 11 (or a set with the difference in element distribution between the sets absorbed).

The number of common representative points is any; for example, a number predetermined by user. It is desirable however that the number of common representative points be smaller than the total number of feature vectors because of the nature that the common representative point represents feature vectors and, moreover, smaller than the number of feature vectors of each set (or model). The common representative point setting block 12 sets the common representative points in the number thus set on the basis of all or a part of feature vectors. Details of the common representative point setting method will be described later. The common representative point setting block 12 supplies the information about the set common representative points (or common representative point information) to the common representative point information storage block 13 for storage.

The common representative point information storage block 13 has a storage medium such as a hard disc or a semiconductor memory for example, storing the common representative point information supplied from the common representative point setting block 12. The common representative point information storage block 13 supplies this common representative point information to the neighborhood table group creation block 14 and the nearest neighborhood vector group search block 16 as required.

The neighborhood table group creation block 14 gets vector information from the vector information storage block 11 and then gets common representative point information from the common representative point information storage block 13, thereby creating a neighborhood table that lists feature vectors located in the neighborhood of each common representative point for each set (or model) on the basis of the obtained information. A neighborhood table is table information listing the feature vectors located in the neighborhood of each common representative point as will be described later and is created for each set (or model). Namely, a common representative point (group) is a point (group) representative of the feature vectors of all sets (or models) and a neighborhood table is table information indicative of a relationship between each set and the common representative point thereof. Details of creating a neighborhood table and a method of using a created neighborhood table will be described later. The neighborhood table group creation block 14 creates the above-mentioned neighborhood table for each set (or model) and then supplies the created neighborhood table to the neighborhood table group storage block 15 for storage.

The neighborhood table group storage block 15 has a storage medium such as a hard disc or a semiconductor memory for example, storing neighborhood table groups supplied from the neighborhood table group creation block 14. The neighborhood table group storage block 15 supplies these neighborhood table groups to the nearest neighborhood vector group search block 16 as required.

The nearest neighborhood vector group search block 16 gets an input vector that is a feature vector entered from the outside of the feature quantity comparison apparatus 10 and uses the vector information obtained from the vector information storage block 11, the common representative point information obtained from the common representative point information storage block 13, and the neighborhood table group obtained from the neighborhood table group storage block 15 as required, thereby searching each set (or model) for a nearest vector that is nearest to the input vector on the basis of these pieces of information. The nearest neighborhood vector group search block 16 outputs the nearest vectors thus retrieved to the outside of the feature quantity comparison apparatus 10 as a result of the comparison.

The following describes details of the method of comparison of feature quantities by the feature quantity comparison apparatus 10 with reference to FIGS. 2 through 5.

Before making a comparison between an input vector feature quantity and a model feature vector, the feature quantity comparison apparatus 10 sets common representative points as shown in FIG. 2 to generate a neighborhood table.

The vector information storage block 11 (FIG. 1) stores search target vector groups 21 each made up of a plurality of models (or sets). The search target vector groups 21 are made up of M search target vector groups (namely, sets (or models)) 21-1 through 21-M. Each of the groups is a set of feature vectors 22.

The common representative point setting block 12 (FIG. 1) integrates the search target vector groups 21 into a feature vector group made up of one set 23 and then sets representative points representative of a feature vector group providing an element of the set 23, namely, R common representative points 24 that are representative points common to all sets (or all models).

The neighborhood table group creation block 14 (FIG. 1) gets information about the common representative point 24 via the common representative point information storage block 13 (FIG. 1) and then, on the basis of the vector information obtained from the vector information storage block 11, creates neighborhood tables 25-1 through 25-M for each set and stores the created neighborhood tables into the neighborhood table group storage block 15.

Figure 3:
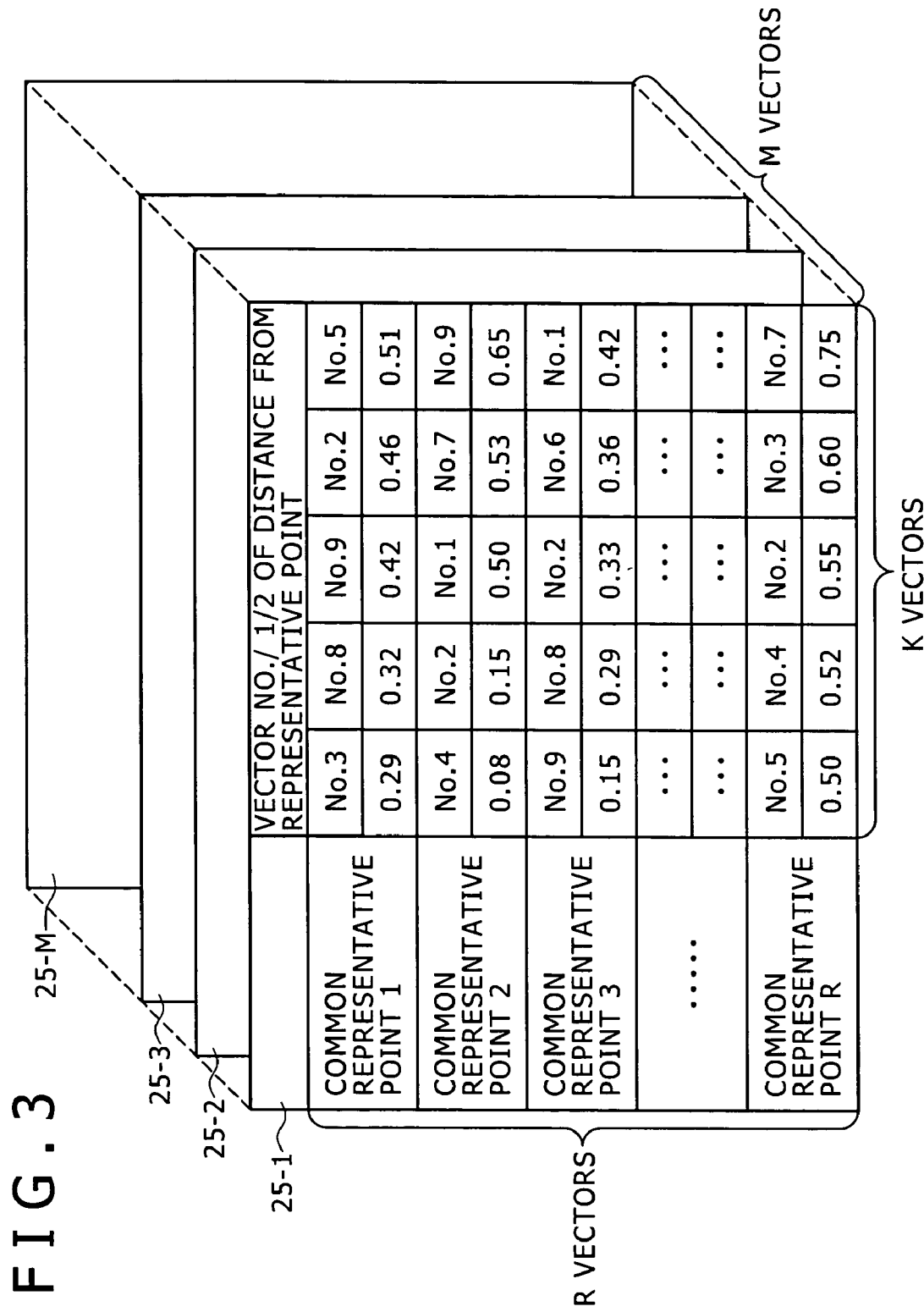
FIG. 3 is a schematic diagram illustrating an exemplary configuration of a neighborhood table.

Each of the neighborhood tables 25 is configured as shown in FIG. 3 for example. Any number of neighborhood vectors of common representative points may be listed in the neighborhood table; namely, the number may be specified by the user or predetermined. Preferably, because of the nature of the neighborhood table indicative of the feature vectors in the neighborhood of common representative points, the number is smaller than the number of feature vectors of each set.

Each neighborhood table lists the identification information of K neighborhood vectors for each of R common representative points and the values of ½ of the distance from the common representative points of neighborhood vectors in the ascending order, as shown in FIG. 3.

For example, the neighborhood table 25-1 lists "No. 3" that is the identification information of a nearest feature vector as a neighborhood vector of common representative point 1 and "0.29" as the value of ½ of the distance between this feature vector and common representative point 1, "No. 8" that is the identification information of a second nearest feature vector and "0.32" as the value of ½ of the distance between this feature vector and common representative point 1, "No. 9" that is the identification information of a third nearest feature vector and "0.42" as the value of ½ of the distance between this feature vector and common representative point 1, "No. 2" that is the identification information of a fourth nearest feature vector and "0.46" as the value of ½ of the distance between this feature vector and common representative point 1, and "No. 5" that is the identification information of a fifth nearest feature vector and "0.51" as the value of ½ of the distance between this feature vector and common representative point 1. Likewise, the neighborhood table 25-1 lists neighborhood vectors for each of common representative points 2 through R up to five (K neighborhood vectors) in the order nearer to each common representative point.

The neighborhood table group creation block 14 creates M neighborhood tables for each of feature vector sets (or models).

Each neighborhood table is used for narrowing a range of feature vectors subject to search when searching for the neighborhood vectors of an input vector.

Figure 4:
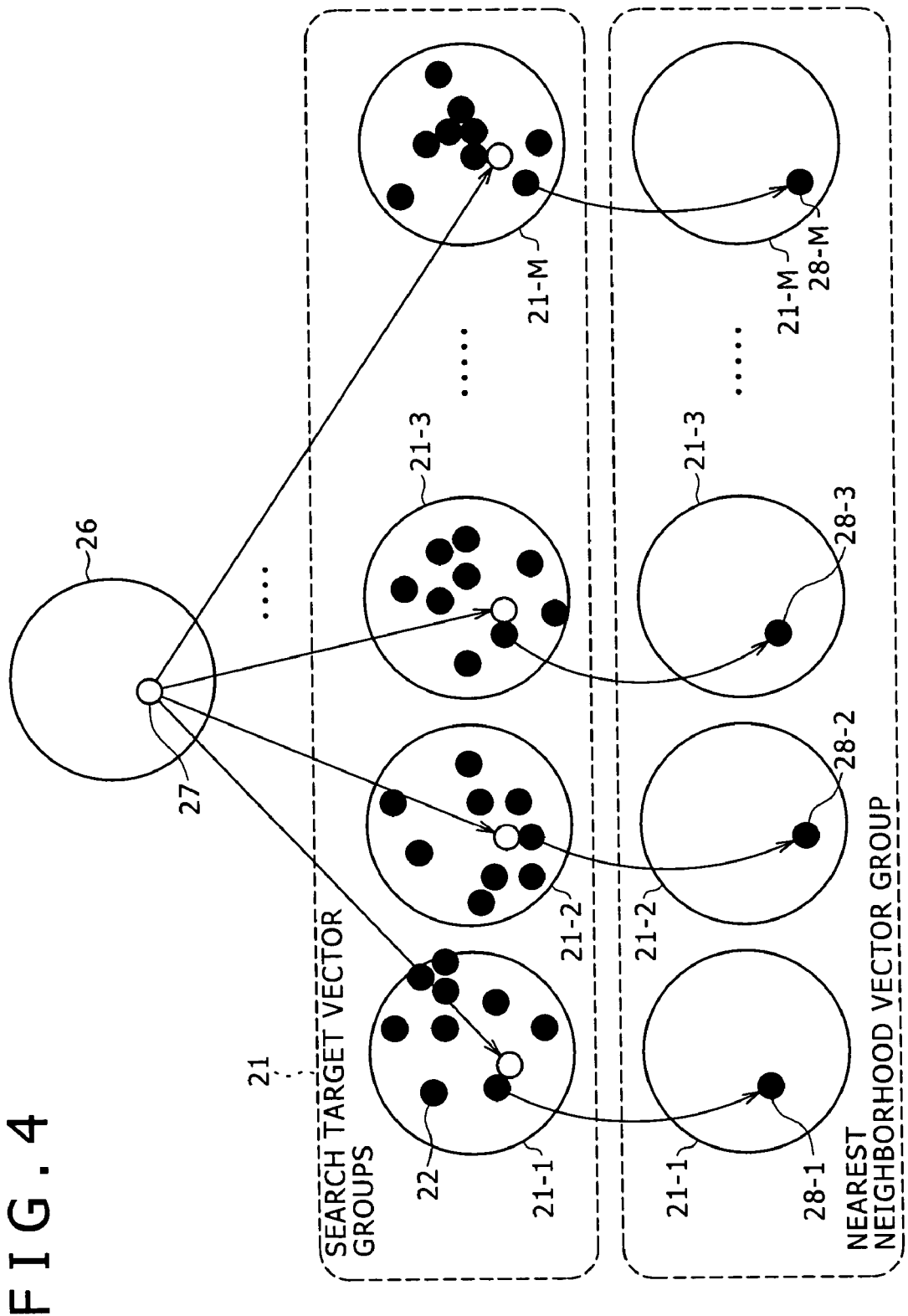
FIG. 4 is a schematic diagram illustrating a manner of searching for a nearest neighborhood vector.

In order to compare the feature of information 26 subject processing with the feature of each model, the nearest neighborhood vector group search block 16 searches the feature vectors 22 of the search target vector groups 21 for a nearest neighborhood vector approximating the input vector 27 that is the feature vector of the information 26 as shown in FIG. 4. Namely, the nearest neighborhood vector group search block 16 first searches the search target vector groups 21-1 for a nearest neighborhood vector 28-1 of the input vector 27 and then searches the search target vector groups 21-2 for a nearest neighborhood vector 28-2 of the input vector 27. Likewise, with search target vector groups 21-3 through 21-M, the nearest neighborhood vector group search block 16 searches for nearest neighborhood vectors of the input vector 27. Then, the nearest neighborhood vector group search block 16 outputs the retrieved nearest neighborhood vectors as a result of the comparison between the information 26 subject to processing and the model.

In searching for nearest neighborhood vectors, the nearest neighborhood vector group search block 16 uses the neighborhood table group shown in FIG. 3 to narrow the search range, thereby speeding up the search for nearest neighborhood vectors. To be more specific, the nearest neighborhood vector group search block 16 first computes the distance between the input vector 27 and the common representative point. Next, the nearest neighborhood vector group search block 16 compares the computed distance with the value of ½ of the distance between neighborhood vector and common representative point in the neighborhood table. If the distance between the input vector 27 and the common representative point is shorter, the nearest neighborhood vector group search block 16 searches the neighborhood vector group (including common representative points) of the common representative points registered in the neighborhood table for the nearest neighborhood vector of the input vector 27, other feature vectors being left unsearched as out of search range. Conversely, if the distance between the input vector 27 and the common representative point is greater, the nearest neighborhood vector group search block 16 searches all feature vectors of that set for the nearest neighborhood vector of the input vector 27.

Figure 5:
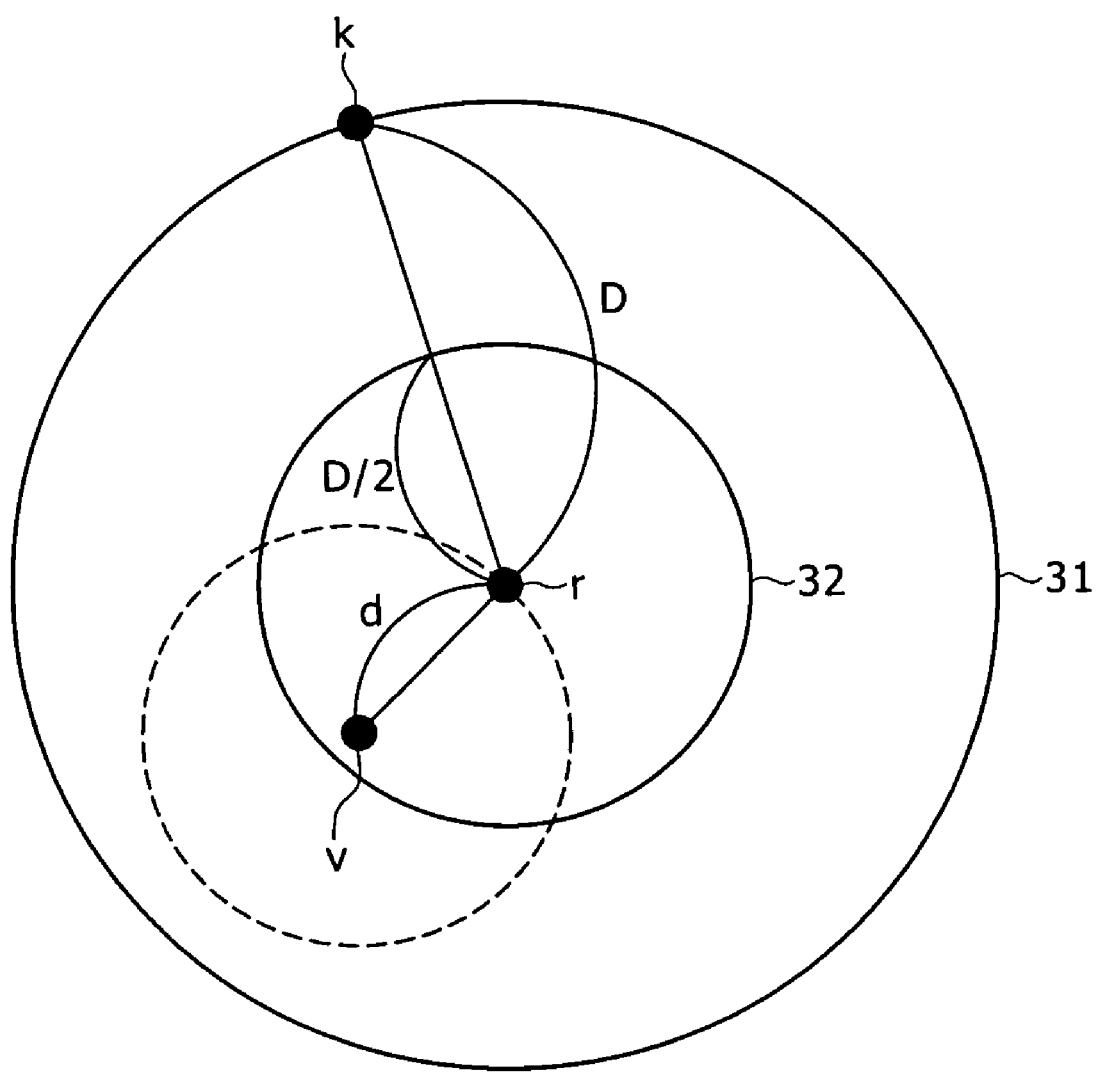
FIG. 5 is a schematic diagram illustrating an example of narrowing a search range.

The following describes a principle of setting a search range with reference to FIG. 5. It is supposed that input vector v, common representative point r, and neighborhood vector k farthest from this common representative point r listed in a neighborhood table (namely, neighborhood vector k near common representative point r in K-th order) be positioned as shown in FIG. 5. A circle 31 is indicative of distance D between common representative point r and neighborhood vector k and a circle 32 is indicative of ½ (D/2) of distance D.

Given common representative point r as standard, if the nearest neighborhood vector of input vector v is farthest from the input vector, then the nearest neighborhood vector thereof is common representative point r. Namely, as shown by a circle of dashed line in FIG. 5, the nearest neighborhood vector of input vector v is never located farther from common representative point r (namely, the nearest neighborhood vector is always located inside the circle of dashed line).

Consequently, if input vector v is located inside the circle 32, namely, if distance d between input vector v and common representative point r is shorter than ½ of distance D between neighborhood vector k and common representative point r (d<D/2), then the circle of dashed line never gets out of the circle 31. Namely, in this case, the nearest neighborhood vector of input vector v is always located nearer than neighborhood vector k of common representative point.

On the basis of the above-mentioned principle of operation, the nearest neighborhood vector group search block 16 computes a distance between the input vector 27 and each common representative point and compares the obtained distance with a value that is ½ of a distance of a farthest neighborhood vector from that common representative point listed in the neighborhood table to the common representative point. Then the nearest neighborhood vector group search block 16 executes this processing for every common representative point. If any common representative point with which the distance between input vector and common representative point is shorter is found, the nearest neighborhood vector group search block 16 searches the neighborhood vectors of that common representative point for the nearest neighborhood vector of the input vector. Only if no common representative point with which the distance between input vector and common representative point is shorter for any common representative point is found, the nearest neighborhood vector group search block 16 searches all feature vectors in the search target vector group for the nearest neighborhood vector.

The nearest neighborhood vector group search block 16 executes the above-mentioned search processing on each search target vector group (or each model) and outputs a nearest neighborhood vector group as a result of the comparison. By doing so, the feature quantity comparison apparatus 10 is able to exclude unnecessary feature vectors that obviously do not provide the nearest neighborhood vector, thereby retrieving desired elements at high speeds. In addition, because the common representative point setting block 12 sets a common representative point common to all search target vector groups (or models) and the nearest neighborhood vector group search block 16 searches for a nearest neighborhood vector with reference to that common representative point, the feature quantity comparison apparatus 10 is able to fast search the search target vector groups for a nearest neighborhood vector even if there are two or more search target vector groups. Namely, if there are a plurality of search target sets, the feature quantity comparison apparatus 10 is able to search these sets for a desired element at high speeds.

The following describes in detail components of the feature quantity comparison apparatus 10 shown in FIG. 1.

Figure 6:
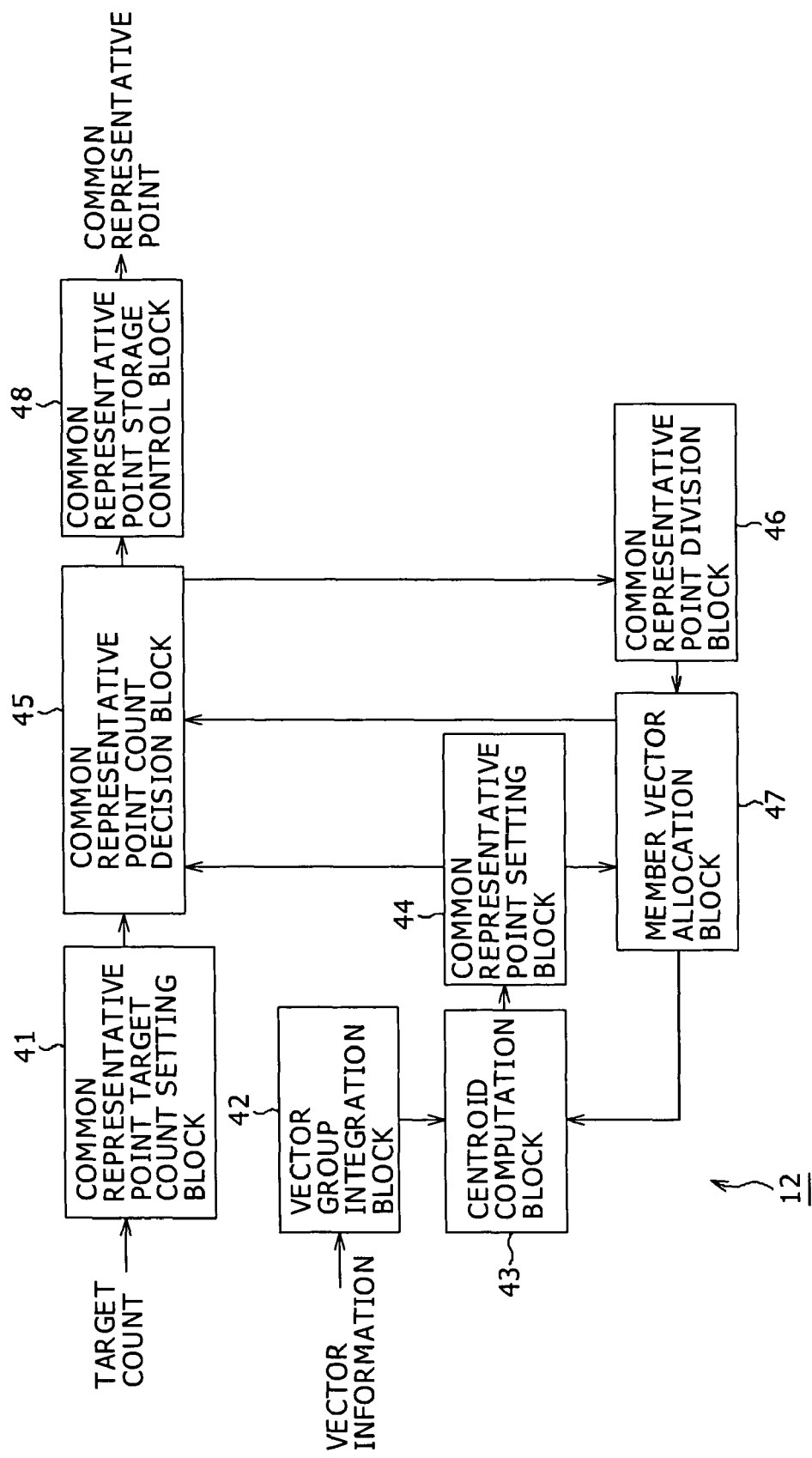
FIG. 6 is a block diagram illustrating a detail exemplary configuration of a common representative point setting block shown in FIG. 1.

Now, referring to FIG. 6, there is shown a detail exemplary configuration of the common representative point setting block 12. In FIG. 6, the common representative point setting block 12 has a common representative point target count setting block 41, a vector group integration block 42, a centroid computation block 43, a common representative point setting block 44, a common representative point count decision block 45, a common representative point division block 46, a member vector allocation block 47, and a common representative point storage control block 48.

The common representative point target count setting block 41 sets a common representative point target count on the basis of user input for example and supplies the obtained information to the common representative point count decision block 45. This common representative point target count is set to 2 to the n-th power (n being an integer) for example. The common representative point target count may also be a user-specified value or a predetermined value.

The vector group integration block 42 obtains vector information from the vector information storage block 11 and, on the basis of the obtained information, integrates all vector groups stored in the vector information storage block 11 into one vector group. Then, the vector group integration block 42 supplies the resultant vector group to the centroid computation block 43.

The centroid computation block 43 computes the centroid (or the centroid position of vector distribution) of vector groups for each vector group on the basis of the vector information supplied from the vector group integration block 42 or the vector information supplied from the member vector allocation block 47. For example, with the vector information supplied from the vector group integration block 42, vector groups are integrated into one group, so that, if the centroid position is computed on the basis of this vector information, the centroid computation block 43 computes the centroid of all vector groups. If the centroid position is computed on the basis of the vector information supplied from the member vector allocation block 47, then the centroid computation block 43 handles a member vector group allocated to a same common representative point by the member vector allocation block 47 as one vector group to compute the centroid position for each vector group. The centroid computation block 43 supplies the information about the computed centroid to the common representative point setting block 44.

The common representative point setting block 44 sets the centroid position supplied from the centroid computation block 43 to the common representative point and supplies the information thereof to the common representative point count decision block 45 and the member vector allocation block 47.

Getting a setting result from the common representative point setting block 44 or an allocation result from the member vector allocation block 47, the common representative point count decision block 45 determines whether the number of common representative points in the setting result or allocation result is smaller than the common representative point target count supplied from the common representative point target count setting block 41. In accordance with the decision made, the common representative point count decision block 45 supplies the information about common representative point to the common representative point division block 46 or the common representative point storage control block 48.

Getting the information about common representative point from the common representative point count decision block 45, the common representative point division block 46 divides each common representative point by two and shifts the resultant halves in a predetermined direction by a minute amount from each other so as to be separated from the original position. For example, the common representative point division block 46 shifts one of the halves of the divided point in the positive direction of x axis by a minute amount and the other in the negative direction of x axis. It should be noted that these corrective directions of the two points may be any directions as long as they are reverse to each other. Namely, the common representative point division block 46 divides the number of common representative points for positional correction, thereby doubling the number of common representative points. The common representative point division block 46 supplies the information about these divided and positionally corrected common representative points to the member vector allocation block 47.

Getting the information about common representative point from the common representative point division block 46, namely the information about the common representative points of which number is double the original number by dividing by the common representative point division block 46, the member vector allocation block 47 allocates member vectors to these common representative points and supplies a result of the allocation to the centroid computation block 43 and the information about the number of common representative points to the common representative point count decision block 45.

Also, getting the result of common representative point setting from the common representative point setting block 44, the member vector allocation block 47 allocates member vectors to the set common representative points on the basis of the received setting result and supplies a result of the allocation and the information about common representative point to the centroid computation block 43.

The common representative point storage control block 48 supplies the information about common representative point from the common representative point count decision block 45 to the common representative point information storage block 13 for storage.

Figure 7:
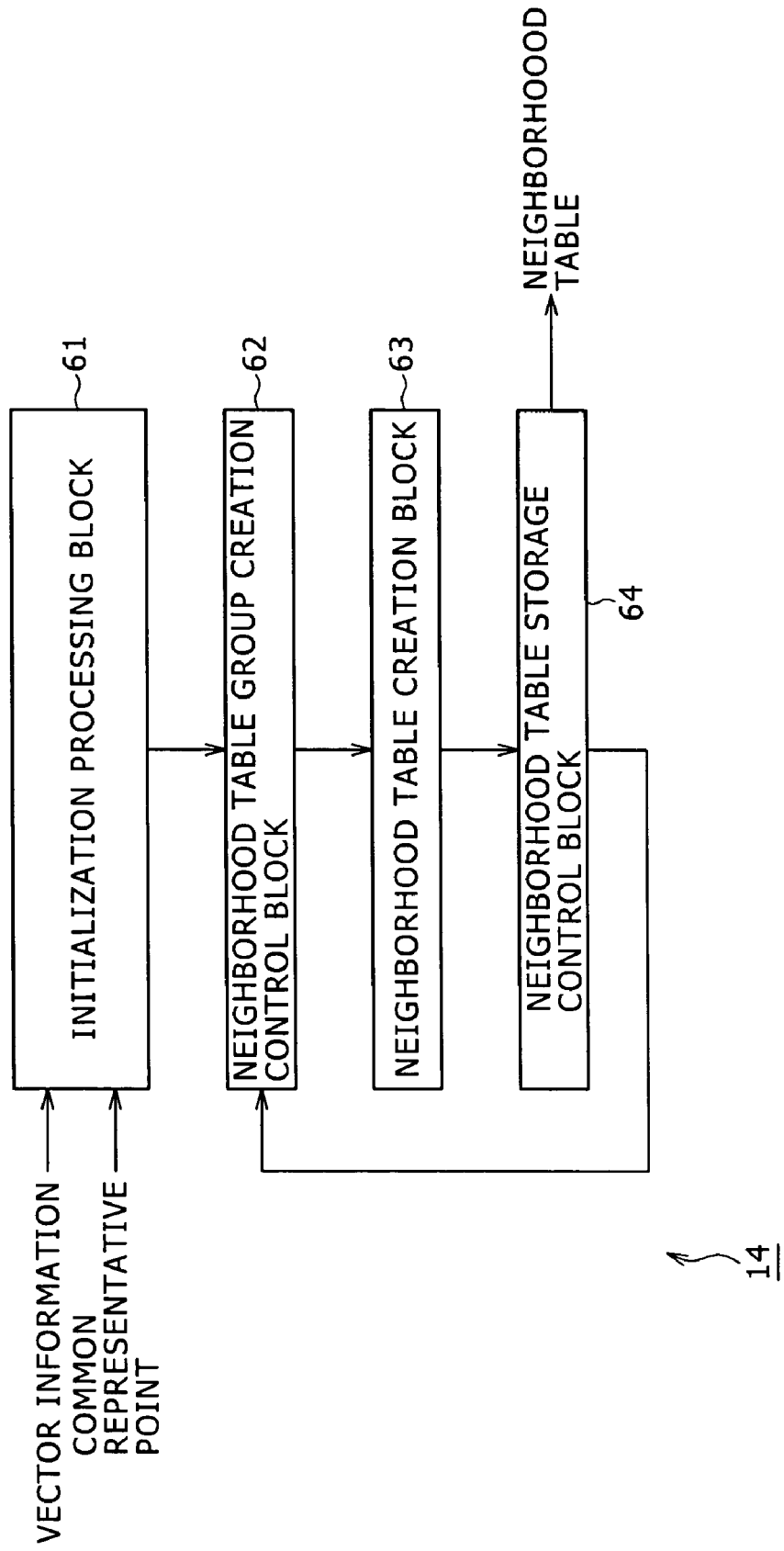
FIG. 7 is a block diagram illustrating a detail exemplary configuration of a neighborhood table group creation block shown in FIG. 1.

Referring to FIG. 7, there is shown a block diagram illustrating a detail exemplary configuration of the neighborhood table group creation block 14 shown in FIG. 1.

In FIG. 7, the neighborhood table group creation block 14 has an initialization processing block 61, a neighborhood table group creation control block 62, a neighborhood table creation block 63, and a neighborhood table storage control block 64.

The initialization processing block 61 gets vector information from the vector information storage block 11 and common representative point information from the common representative point information storage block 13, upon which the initialization processing block 61 executes initialization processing such as initializing variables necessary for the creation of a neighborhood table group.

The neighborhood table group creation control block 62 executes control processing associated with the creation of a neighborhood table group. The neighborhood table creation block 63 executes processing associated with the creation of a neighborhood table. The neighborhood table storage control block 64 controls the neighborhood table group storage block 15 to store created neighborhood tables.

Figure 8:
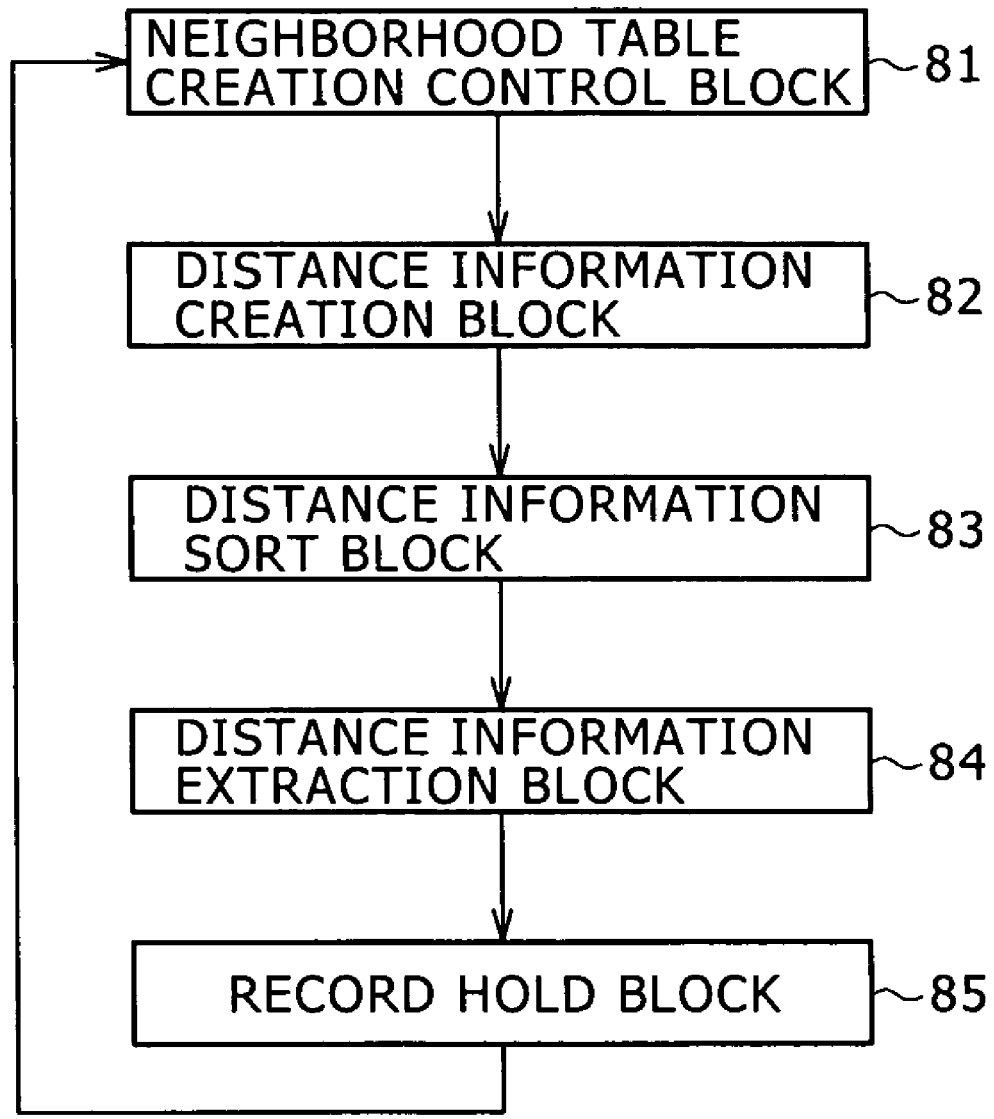
FIG. 8 is a block diagram illustrating a detail exemplary configuration of a neighborhood table creation block shown in FIG. 7.

Referring to FIG. 8, there is shown a block diagram illustrating a detail exemplary configuration of the neighborhood table creation block 63. In FIG. 8, the neighborhood table group creation block 63 has a neighborhood table creation control block 81, a distance information creation block 82, a distance information sort block 83, a distance information extraction block 84, and a record hold block 85.

The neighborhood table creation control block 81 executes control processing associated with the creation of a neighborhood table. The distance information creation block 82 executes processing associated with the creation of distance information for use in a neighborhood table. The distance information sort block 83 sorts the distance information created by the distance information creation block 82 in the ascending order of distances (or in the order of shorter distances). The distance information extraction block 84 extracts the distance information in a predetermined count from shorter distances in the sorted distance information. The record hold block 85 holds the extracted distance information as a record of the neighborhood table and returns the information thereof to the neighborhood table group creation control block 81.

Figure 9:
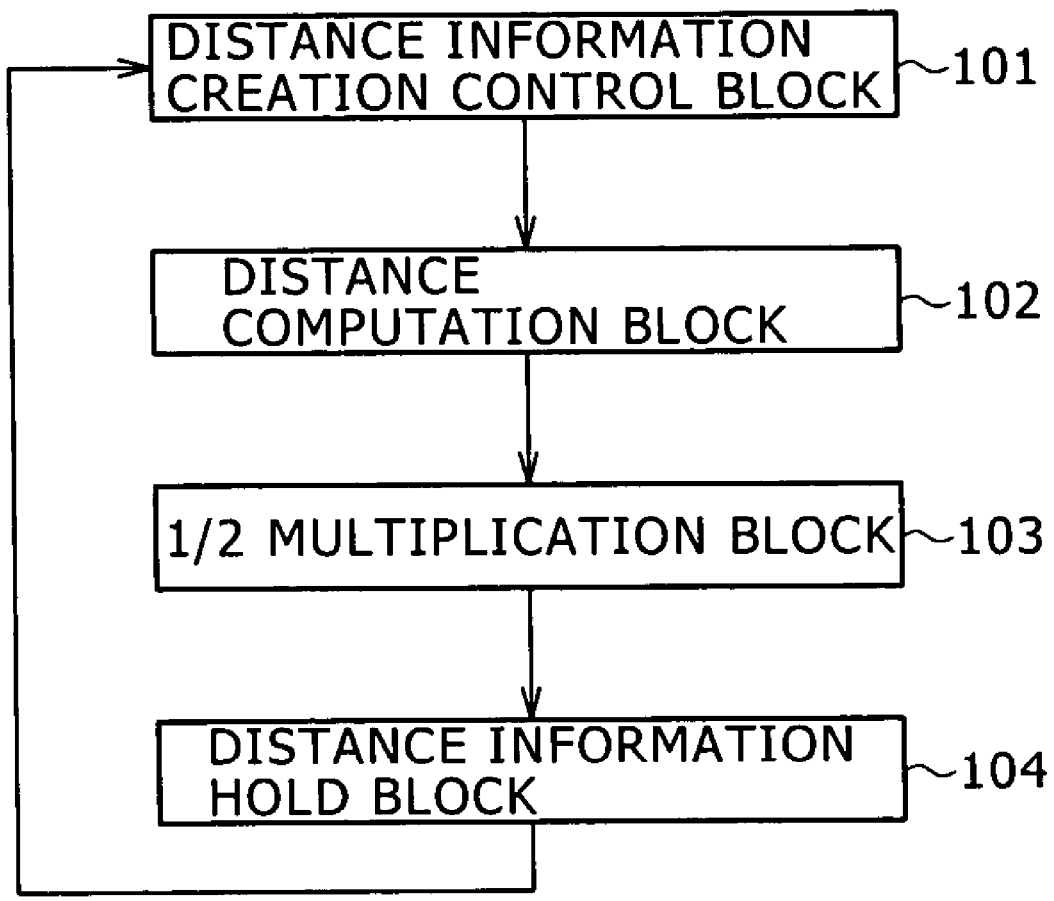
FIG. 9 is a block diagram illustrating a detail exemplary configuration of a distance information creation block shown in FIG. 8.

Referring to FIG. 9, there is shown a block diagram illustrating a detail exemplary configuration of the distance information creation block 82 shown in FIG. 8. In FIG. 9, the distance information creation block 82 has a distance information creation control block 101, a distance computation block 102, a ½ multiplication block 103, and a distance information hold block 104.

The distance information creation control block 101 executes processing associated with the creation of distance information. The distance computation block 102 computes a distance between common representative point specified for processing and member vector. The ½ multiplication block 103 multiplies the computed distance between common representative point and member vector by ½. The distance information hold block 104 holds a value obtained by multiplying the distance between common representative point and member vector by ½ as distance information and returns the information thereof to the distance information creation control block 101.

Figure 10:
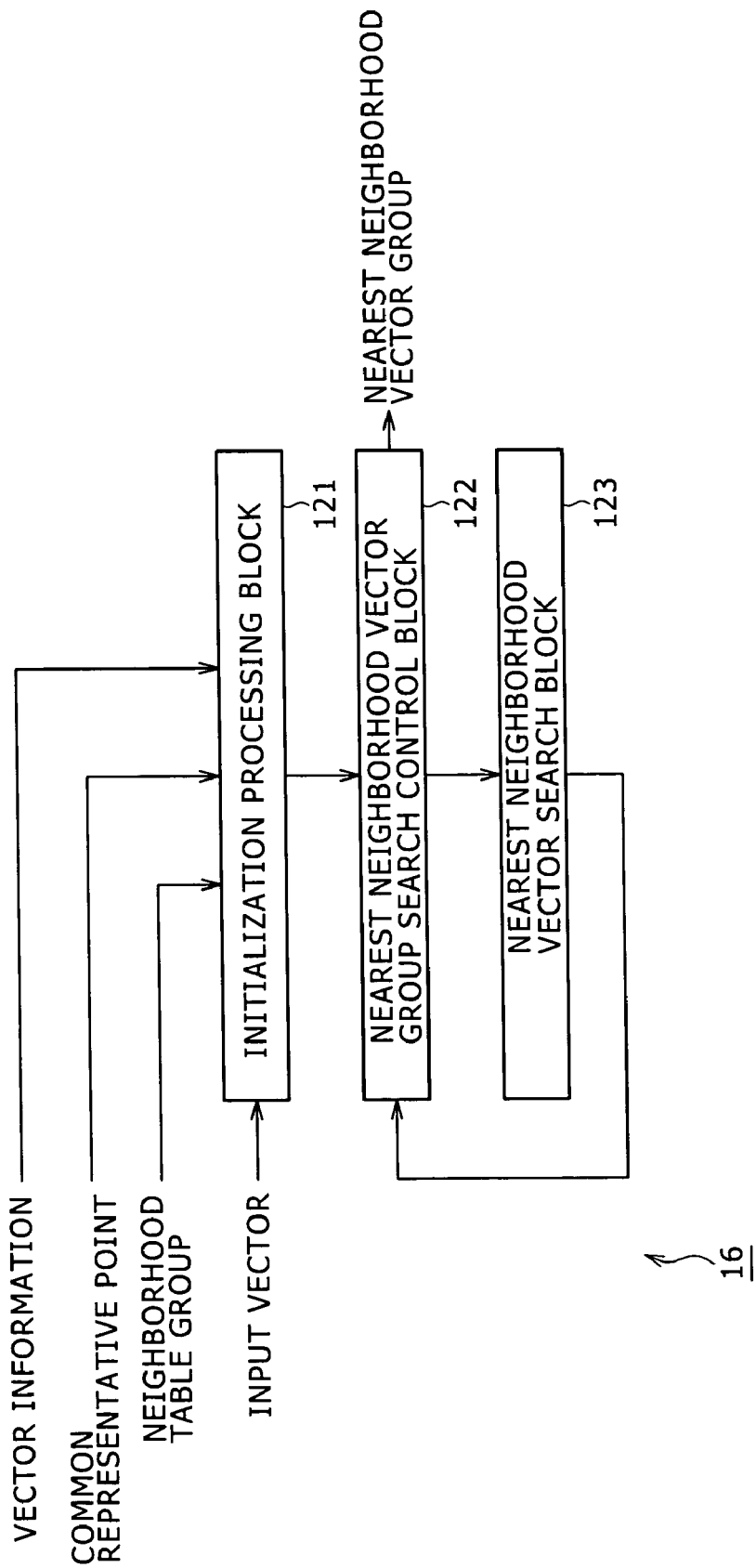
FIG. 10 is a block diagram illustrating a detail exemplary configuration of a nearest neighborhood vector group search block shown in FIG. 1.

Referring to FIG. 10, there is shown a block diagram illustrating a detail exemplary configuration of the nearest neighborhood vector group search block 16 shown in FIG. 1. In FIG. 10, the nearest neighborhood vector group search block 16 has an initialization processing block 121, a nearest neighborhood vector group search control block 122, and a nearest neighborhood vector search block 123 and searches the models stored in the vector information storage block 11 for the nearest neighborhood vector group of an input vector.

Getting an input vector, the initialization processing block 121 gets vector information from the vector information storage block 11, common representative point information from the common representative point information storage block 13, and a neighborhood table group from the neighborhood table group storage block 15, thereby executing initialization processing such as initializing variables necessary for the search for the nearest neighborhood vector group of the input vector.

The nearest neighborhood vector group search control block 122 executes control processing associated with the search for the nearest neighborhood vector group of an input vector. The nearest neighborhood vector search block 123 searches for the nearest neighborhood vector group of the input vector for each vector group under the control of the nearest neighborhood vector group search control block 122 and returns a result of the search processing to the nearest neighborhood vector group search control block 122.

Figure 11:
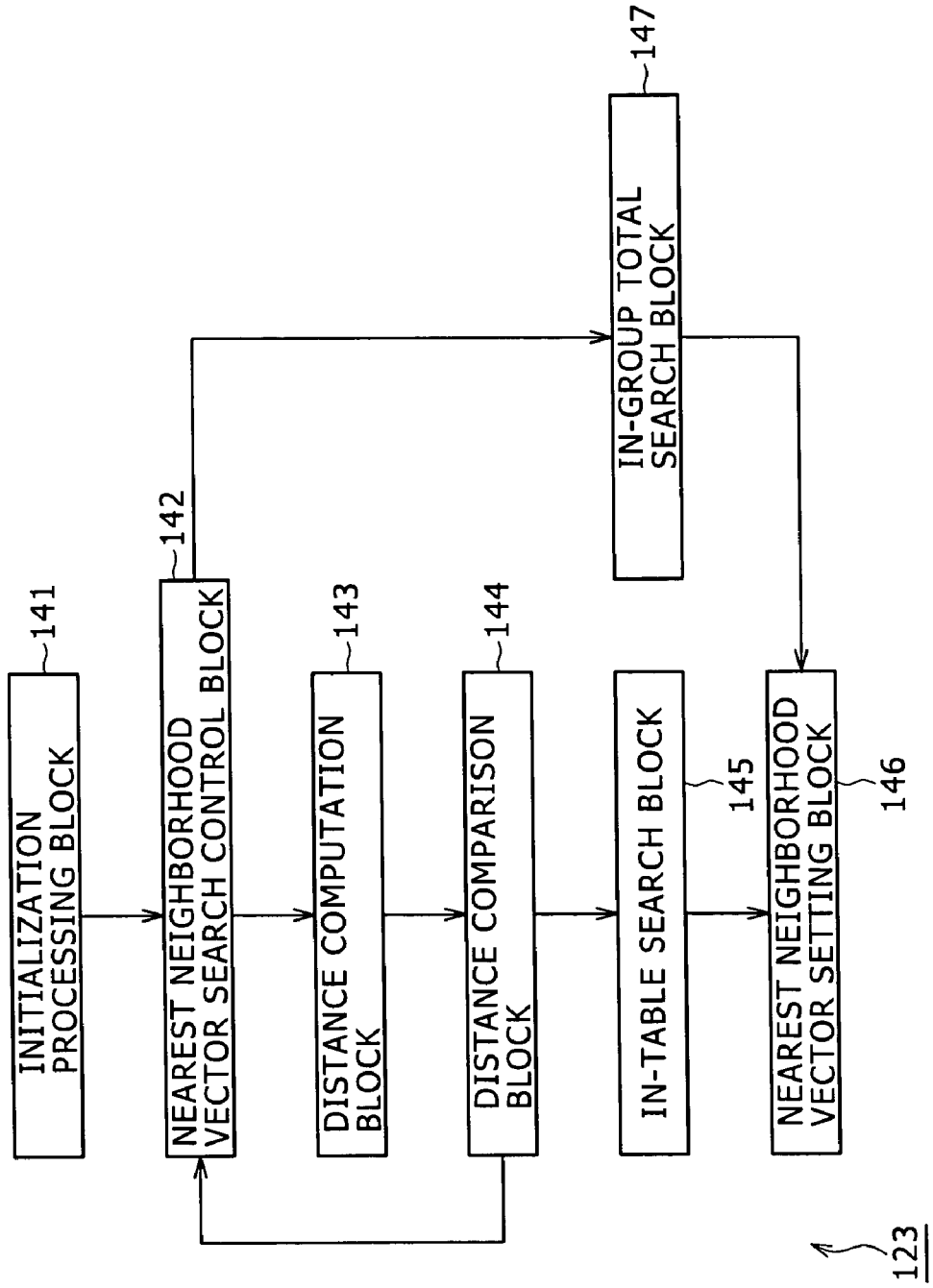
FIG. 11 is a block diagram illustrating a detail exemplary configuration of a nearest neighborhood vector search block shown in FIG. 10.

Referring to FIG. 11, there is shown a block diagram illustrating a detail exemplary configuration of the nearest neighborhood vector search block 123 shown in FIG. 10. In FIG. 11, the nearest neighborhood vector search block 123 has an initialization processing block 141, a nearest neighborhood vector search control block 142, a distance computation block 143, a distance comparison block 144, an in-table search block 145, a nearest neighborhood vector setting block 146, and an in-group total search block 147, thereby executing nearest neighborhood vector search processing for each model (or each vector group).

The initialization processing block 141 executes initialization processing such as initializing variables necessary for the search for the nearest neighborhood vector of an input vector. The nearest neighborhood vector search control block 142 executes control processing associated with the search for the nearest neighborhood vector of an input vector in each vector group subject to search.

The distance computation block 143 computes a distance between input vector and common representative point subject to processing. The distance comparison block 144 compares the computed distance between input vector and common representative point subject to processing with the distance information in the neighborhood table and causes the in-table search block 145 to execute nearest neighborhood vector search processing in accordance with a result of the comparison.

The in-table search block 145 searches the member vectors listed in the neighborhood table for the nearest neighborhood vector of the input vector and supplies a result of this search processing to the nearest neighborhood vector setting block 146.

The nearest neighborhood vector setting block 146 sets a member vector retrieved by the in-table search block 145 or the in-group total search block 147 as the nearest neighborhood vector of the input vector and returns a result of this setting to the nearest neighborhood vector search control block 142.

If no nearest neighborhood vector of the input vector is found in all the common representative points by the nearest neighborhood vector search control block 142, then the in-group total search block 147 searches all member vectors in the vector group subject to processing for the nearest neighborhood vector of the input vector and supplies a result of this search processing to the nearest neighborhood vector setting block 146.

Figure 12:
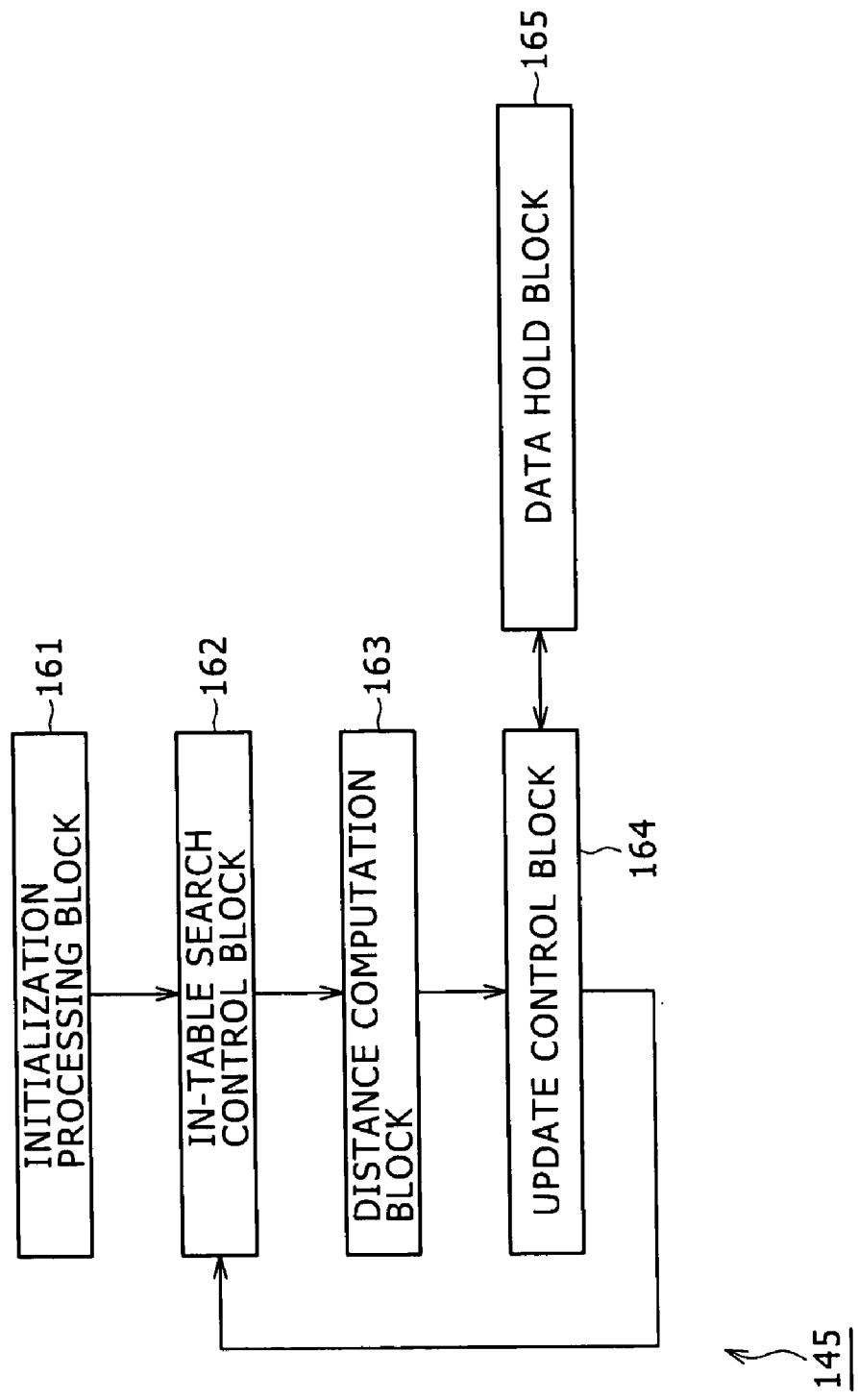
FIG. 12 is a block diagram illustrating a detail exemplary configuration of an in-table search block shown in FIG. 11.

Referring to FIG. 12, there is shown a block diagram illustrating a detail exemplary configuration of the in-table search block 145 shown in FIG. 11. In FIG. 12, the in-table search block 145 has an initialization processing block 161, an in-table search control block 162, a distance computation block 163, an update control block 164, and a data hold block 165, thereby searching the nearest neighborhood vector for member vectors listed in the neighborhood table (namely, in-table search for the nearest neighborhood vector).

The initialization processing block 161 executes initialization processing such as initializing variables necessary for the in-table search for a nearest neighborhood vector. For example, the initialization processing block 161 sets Vkeep that is a candidate of the nearest neighborhood vector to a virtual point of which distance from the input vector is infinite and distance Dkeep from the input vector to infinity. Also, the initialization processing block 161 initializes the value of variable k (to 0 for example). The in-table search control block 162 executes control processing associated with the in-table search for a nearest neighborhood vector. The distance computation block 163 computes a distance between the input vector and a member vector listed in the neighborhood table. The update control block 164 updates the data held in the data hold block 165 on the basis of the computed distance between input vector and member vector. The update control block 164 also returns a result of this control processing to the in-table search control block 162. The data hold block 165 holds data (Vkeep and Dkeep for example) associate with a vector nearest to the input vector (namely, a nearest neighborhood vector candidate).

Figure 13:
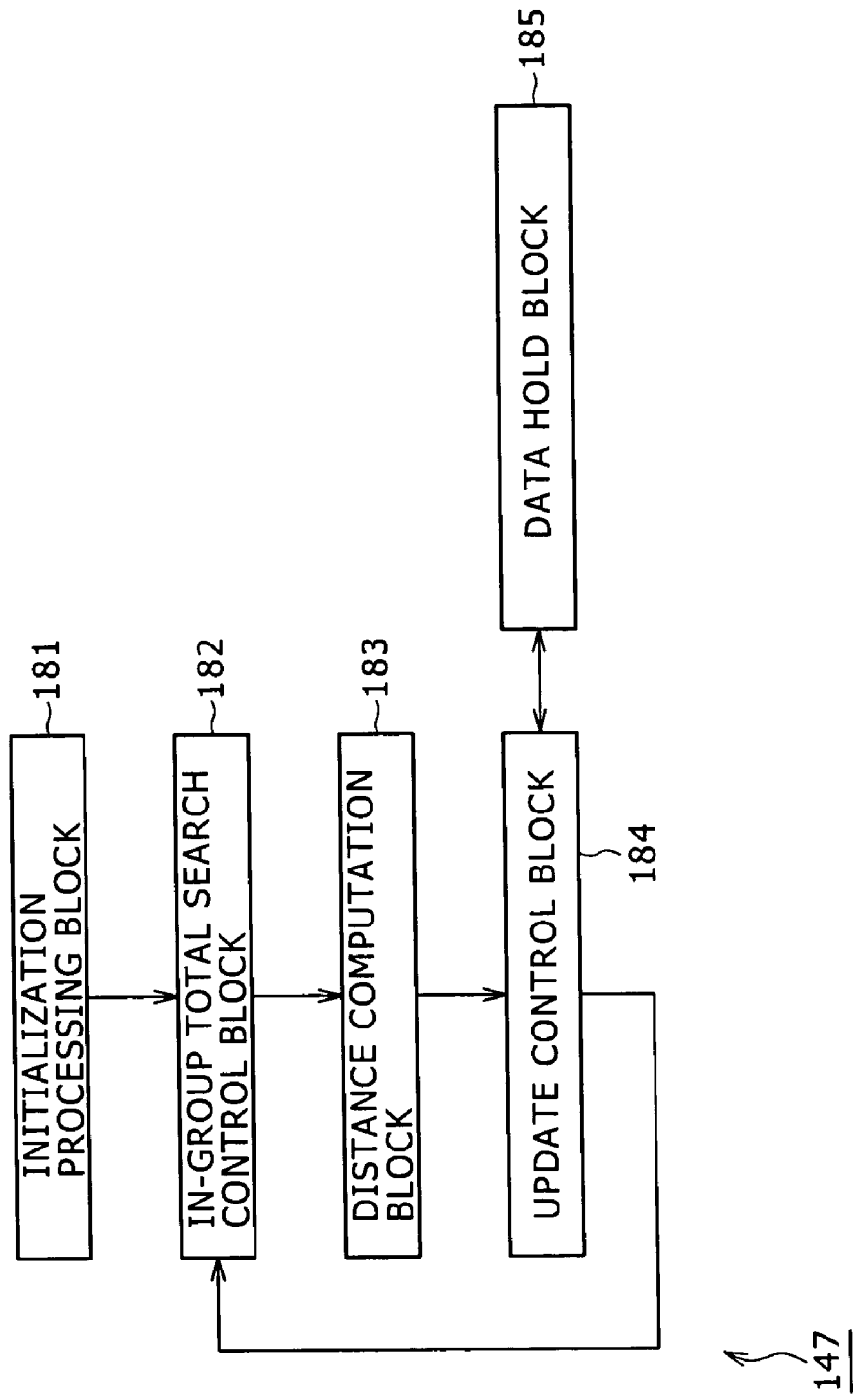
FIG. 13 is a block diagram illustrating a detail exemplary configuration of in-group total search block shown in FIG. 11.

Referring to FIG. 13, there is shown a block diagram illustrating a detail exemplary configuration of the in-group total search block 147 shown in FIG. 11. In FIG. 13, the in-group total search block 147 has an initialization processing block 181, an in-group total search control block 182, a distance computation block 183, an update control block 184, and a data hold block 185, thereby searching for a nearest neighborhood vector for all member vectors in the vector group (namely, in-group total search for a nearest neighborhood vector).

The initialization processing block 181 executes initialization processing such as initializing variables necessary for the in-group total search for a nearest neighborhood vector. For example, the initialization processing block 181 sets Vkeep that is a candidate of the nearest neighborhood vector to a virtual point of which distance from the input vector is infinite and distance Dkeep from the input vector to infinity. Also, the initialization processing block 181 initializes the value of variable i (to 0 for example). The in-group total search control block 182 executes control processing associated with the in-group total search for a nearest neighborhood vector. The distance computation block 183 computes a distance between the input vector and a member vector listed in the neighborhood table. The update control block 184 updates the data held in the data hold block 185 on the basis of the computed distance between input vector and member vector. The update control block 184 also returns a result of this control processing to the in-table search control block 182. The data hold block 185 holds data (Vkeep and Dkeep for example) associate with a vector nearest to the input vector (namely, a nearest neighborhood vector candidate).

The following describes a flow of each processing to be executed by the feature quantity comparison apparatus 10 having the configuration as described above.

First, on the basis of the vector information held in the vector information storage block 11 by the common representative point setting block 12 (FIG. 1), the feature quantity comparison apparatus 10 sets a representative point group common to all vector groups (or models). The following describes a flow of this common representative point setting processing with reference to the flowchart shown in FIG. 14.

When common representative point setting processing starts, the common representative point target count setting block 41 (FIG. 6) sets, in step S1, variable NumReq of common representative point target count on the basis of an entered target count (for example, 2 to the n-th power, n being an integer) and supplies the setting to the common representative point count decision block 45.

In step S2, the vector group integration block 42 gets vector information from the vector information storage block 11 and, on the basis of this vector information, integrates all groups stored in the vector information storage block 11 into a single group made up of all or a part of member vectors of each group. Namely, the vector group integration block 42 reconfigures all member vectors of each group or a part of member vectors extracted from each group by a given method into a single group. Whether to make this group integration by use of all or a part of member vectors may be determined by a given method every time or in a predetermined manner.

When the group integration has been completed, getting the vector information about the vector integration from the vector group integration block 42, the centroid computation block 43 computes the centroid (the action point of the resultant force of gravity working on mass points of that are member vectors) of the member vectors in step S3 and supplies a result of this computation to the common representative point setting block 44.

In step S4, the common representative point setting block 44 sets the obtained centroid as a common representative point and sets the value of variable GpNum indicative of the number of common representative points to "1", supplying a result of this setting to the common representative point count decision block 45. In step S5, the common representative point count decision block 45 determines whether the value of GpNum that is the number of common representative points is smaller than the value of target count NumReq.

If the value of GpNum is found smaller than the value of NumReq, namely, if the target number of common representative points is found not set (or if the number of set common representative points is found not reaching the target count), then the common representative point count decision block 45 supplies this information to the common representative point division block 46, upon which the procedure goes to step S6.

In step S6, the common representative point division block 46 divides each common representative point into two on the basis of the supplied common representative point information, thereby executing positional correction. Then, in step S7, the common representative point division block 46 doubles the value of GpNum that is the number of common representative points and supplies a result of this multiplication to the member vector allocation block 47.

In step S8, the member vector allocation block 47 allocates member vectors to common representative points. In step S9, the member vector allocation block 47 determines whether all common representative points to which the member vectors belong are the same as before, namely, whether the common representative points are the same as at the last allocation and the same member vectors as at the last allocation are allocated to these common representative points.

If the common representative points to which the member vectors belong are found not the same as before, namely, if there is a difference in common representative point between this time and the last time of allocation or a difference in the allocation of member vectors, then the member vector allocation block 47 supplies a result of this decision to the centroid computation block 43, upon which the procedure goes to step S10.

In step S10, the centroid computation block 43 computes the centroid of the member vectors belonging to the same common representative point. The common representative point setting block 44 sets the computed centroid to a new common representative point. Namely, the centroid computation block 43 regards member vectors allocated to one common representative point as a single group and computes the centroid of each group. The common representative point setting block 44 supplies the computed centroid to the member vector allocation block 47 as a common representative point, upon which the procedure returns to step S8 to repeat the above-mentioned processing therefrom. On the basis of the supplied common representative point information, the member vector allocation block 47 allocates member vectors to each common representative point again.

Namely, the member vector allocation block 47, the centroid computation block 43, and the common representative point setting block 44 repeat steps S8 through S10 until the member vector allocation block 47 determines in step S9 that the common representative point to which member vectors belong are all the same as at the last allocation.

If the common representative points to which member vectors belong are determined the same as at the last allocation in step S9, then the member vector allocation block 47 supplies a result of this decision to the common representative point count decision block 45, upon which the procedure returns to step S5 to repeat the above-mentioned processing therefrom.

Namely, the common representative point count decision block 45, the common representative point division block 46, the member vector allocation block 47, the centroid computation block 43, and the common representative point setting block 44 repeat steps S5 through S10 until the common representative point count decision block 45 determines in step S5 that the value of GpNum that is the number of common representative points is not smaller than the value of target count NumReq.

If the value of GpNum is found not smaller than the value of NumReq in step S5, namely, if the target number of common representative points has been set (or if the number of common representative points set has reached the target count), then the common representative point count decision block 45 supplies this information to the common representative point storage control block 48, upon which the procedure goes to step S11.

In step S11, the common representative point storage control block 48 supplies the received common representative point information to the common representative point information storage block 13 for storage. The common representative point information storage block 13 stores the received common representative point information.

Having completed the processing of step S11, the common representative point storage control block 48 ends the above-mentioned common representative point setting processing.

As described above, the common representative point setting block 12 executes common representative point setting processing to set R common representative points by use of the centroid. Consequently, the feature quantity comparison apparatus 10 is able to easily create a neighborhood table for each set (or model) even if there are two or more vector sets (or models) subject to search and quickly search for a neighborhood vector of the input vector for each set (or model) by use of this neighborhood table.

Having set R common representative points as described above, the feature quantity comparison apparatus 10 creates the number of neighborhood tables providing the table information associated with the neighborhood vectors of each common representative point equal to the number of vector groups (or M vector groups) (namely, creates a neighborhood table group made up of M neighborhood tables). On the basis of the vector information stored in the common representative point information storage block 13 and the vector information stored in the vector information storage block 11, the neighborhood table group creation block 14 (FIG. 1) executes neighborhood table group creation processing. The following describes a flow of this neighborhood table group creation processing with reference to the flowchart shown in FIG. 15.

When the neighborhood table group creation processing starts, the initialization processing block 61 (FIG. 7) of the neighborhood table group creation block 14 executes initialization processing such as initializing the value of variable j ($0 \leq j \leq M-1$) indicative of a vector group subject to processing, the value of variable h ($0 \leq h \leq -R-1$) indicative of a common representative point subject to processing, and the value of variable i ($0 \leq i \leq N-1$) indicative of a member vector subject to processing to "0" for example in step S31. It should be noted that M, R and N are given natural numbers.

In step S32, the neighborhood table group creation control block 62 determines whether a neighborhood table has been created for each of all M vector groups. If there is any vector group for which a neighborhood table has not been created, the neighborhood table group creation control block 62 supplies a result of this decision to the neighborhood table creation block 63, upon which the procedure goes to step S33. In step S33, the neighborhood table creation block 63 creates a neighborhood table for vector group S(j). Details of this neighborhood table creation processing will be described later.

Having created the neighborhood table, the neighborhood table creation block 63 supplies the created neighborhood table to the neighborhood table storage control block 64, upon which the procedure goes to step S34.

In step S34, getting the created neighborhood table, the neighborhood table storage control block 64 supplies the received neighborhood table to the neighborhood table group storage block 15 to add the neighborhood table to the neighborhood table group (one or more neighborhood tables) made up of the neighborhood tables of other vectors. Under the control of the neighborhood table storage control block 64, the neighborhood table group storage block 15 stores the supplied neighborhood table to the already stored neighborhood table group. It should be noted that if the neighborhood table group storage block 15 stores no neighborhood table and therefore the supplied neighborhood table is the first one for the neighborhood table group storage block 15, then the neighborhood table group storage block 15 stores the supplied neighborhood table as a new neighborhood table group.

Having completed the processing of step S34, the neighborhood table storage control block 64 returns a result of the processing to the neighborhood table group creation control block 62. In step S35, the neighborhood table group creation control block 62 adds "1" to variable j, thereby changing vector groups subject to processing for which a neighborhood table is created.

As described above, the neighborhood table group creation control block 62, the neighborhood table creation block 63, and the neighborhood table storage control block 64 repeat steps S32 through S35 until the neighborhood table group creation control block 62 determines in step S32 that the neighborhood tables for all vector groups have been created (or M neighborhood tables have been created). If the neighborhood tables for all vector groups are found created in step S32, then the neighborhood table group creation control block 62 ends the neighborhood table group creation processing.

By executing the neighborhood table group creation processing as described above, the neighborhood table group creation block 14 is able to create a neighborhood table for each vector group (or a neighborhood table group made up of M neighborhood tables). In doing so, use of a common representative point common to all vector groups allows the neighborhood table group creation block 14 to quickly create the neighborhood tables for two or more search target vector sets (or vector group) if any. Also, use of this neighborhood table group for the searching for the nearest neighborhood vector of an input vector allows the feature quantity comparison apparatus 10 to quickly search each set for the nearest neighborhood vector of an input vector if there are two or more vector sets subject to search.

Figure 15:
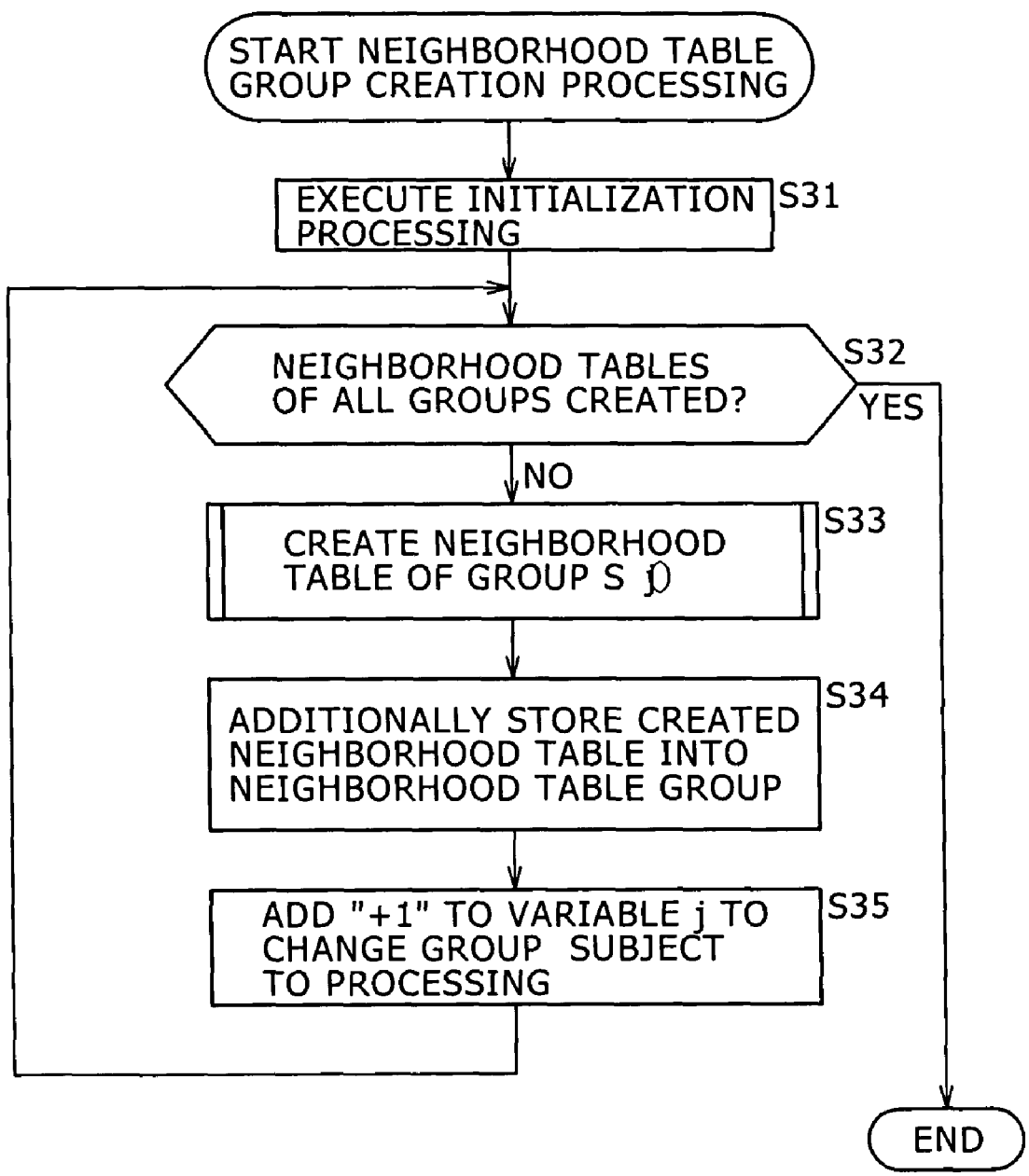
FIG. 15 is a flowchart indicative of exemplary neighborhood table group creation processing.
Figure 16:
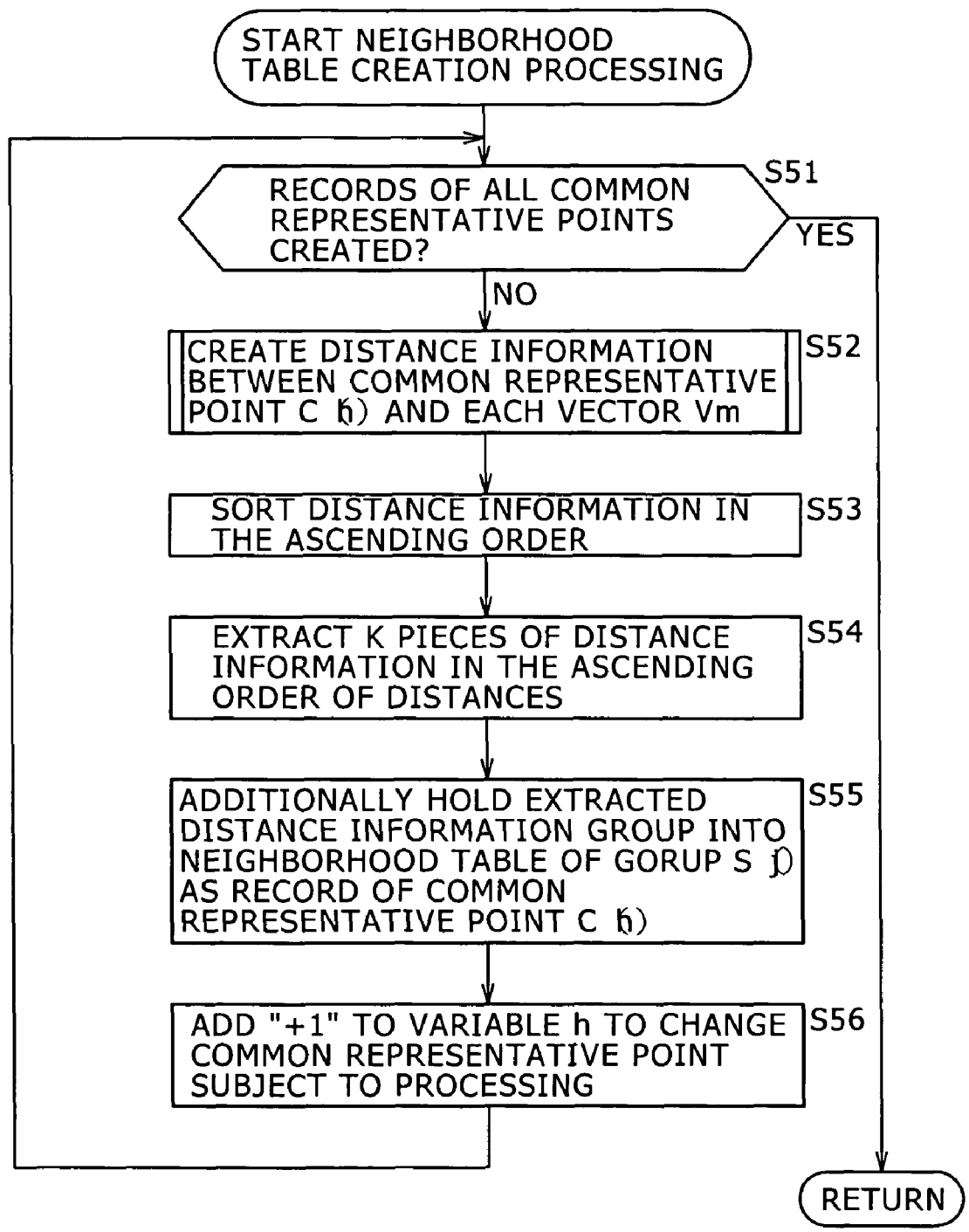
FIG. 16 is a flowchart indicative of exemplary neighborhood table creation processing.

The following describes details of the flow of the neighborhood table creation processing to be executed by the neighborhood table creation block 63 (FIG. 7) in step S33 shown in FIG. 15, with reference to the flowchart shown in FIG. 16.

When neighborhood table creation processing starts, the neighborhood table group creation control block 81 (FIG. 8) of the neighborhood table creation block 63 determines in step S51 whether the records for R common representative points have all been created. As described above with reference to FIG. 3, a neighborhood table is configured by records corresponding to common representative points. The neighborhood table group creation control block 81 determines whether the neighborhood vectors for these common representative points have all been obtained (K neighborhood vectors, K being any natural number), the creation of R records has been completed, and the neighborhood table has been completed. If there remain any common representative point for which records have not been created (or the neighborhood table has not been obtained) and the records for all common representative points have not been created, then the neighborhood table group creation control block 81 causes the procedure to go to step S52.

In step S52, the distance information creation block 82 creates distance information between common representative point C(h) subject to processing and each vector Vm (each member vector of a vector group subject to processing), the distance information being ½ of the distance between common representative point C(h) and member vector Vm. Details of this distance information creation processing will be described later. The distance information creation block 82 supplies the created distance information to the distance information sort block 83, upon which the procedure goes to step S53. In step S53, the distance information sort block 83 sorts the created distance information in the shorter order (or in the ascending order of distance values) and supplies a result of the sorting to the distance information extraction block 84. In step S54, the distance information extraction block 84 extracts K pieces of distance information in the ascending order and supplies the extracted distance information to the record hold block 85.

In step S55, the record hold block 85 holds the distance information group extracted by the distance information extraction block 84 such that the distance information group is added to the neighborhood table of group S(j) currently subject to processing as a record of common representative point C(h). Namely, the record hold block 85 holds the distance information group supplied from the distance information extraction block 84 as records of a neighborhood table.

The record hold block 85 returns a result of this processing to the neighborhood table group creation control block 81. In step S56, the neighborhood table group creation control block 81 adds "1" to the value of variable h to change the common representative points subject to processing, upon which the procedure returns to step S51 to repeat the above-mentioned processing therefrom.

Namely, the neighborhood table group creation control block 81, the distance information creation block 82, the distance information sort block 83, the distance information extraction block 84, and record hold block 85 repeat steps S51 through S56 until the neighborhood table group creation control block 81 determines in step S51 that the records of all common representative points have been created.

If the records for all common representative points are found created and a neighborhood table is found created for the vector group subject to processing in step S51, then the neighborhood table group creation control block 81 ends the neighborhood table creation processing and causes the record hold block 85 to return the record group held therein to the neighborhood table storage control block 64 (FIG. 7) as a neighborhood table, upon which the procedure returns to step S33 to repeat the above-mentioned processing therefrom in FIG. 15.

Figure 17:
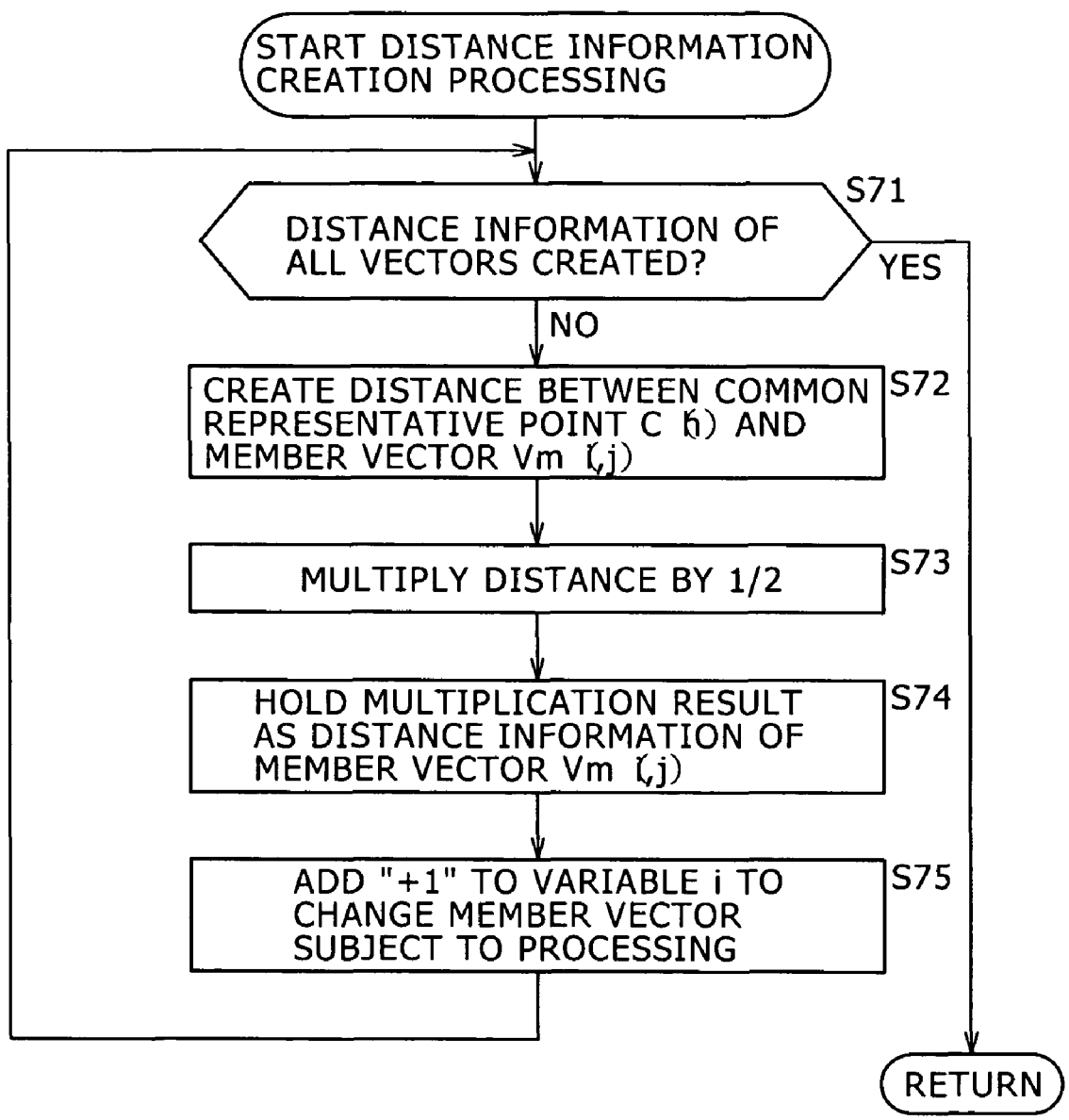
FIG. 17 is a flowchart indicative of exemplary distance information creation processing.

The following describes details of a flow of distance information creation processing to be executed by the distance information creation block 82 (FIG. 8) in step S52 shown in FIG. 16, with reference to the flowchart shown in FIG. 17.

When the distance information creation processing starts, the distance information creation control block 101 (FIG. 9) of the distance information creation block 82 determines in step S71 whether distance information of all of N member vectors Vm(i, j) in vector group S(j) currently subject to processing has been created for common representative point C(h) currently subject to processing. If any member vector Vm(i, j) is found for which the distance information has not been created and therefore the records for all of R common representative points have not been created, then the distance information creation control block 101 causes the procedure to go to step S72.

In step S72, the distance computation block 102 computes a distance between common representative point C(h) currently subject to processing and member vector Vm(i, j). For example, suppose that common representative point C(h) and member vector Vm(i, j) exist on one plane and the positions thereof be indicated by x and y coordinates and let coordinates of common representative point C(h) be (x1, y1) and coordinates of member vector Vm(i, j) be (x2, y2), then distance Dcm(h, i, j) between common representative point C(h) and member vector Vm(i, j) is obtained from the following equation (1):

$$Dcm=\sqrt{(x1-x2)^2+(y1-y2)^2} \quad (1)$$

Namely, distance Dcm is indicated by the square root of a sum of the square of a different between the coordinates. The distance computation block 102 supplies the computed distance to the ½ multiplication block 103. In step S73, the ½ multiplication block 103 multiplies the computed distance by ½ to get Dcm/2 and supplies a result thereof to the distance information hold block 104.

In step S74, the distance information hold block 104 holds a result of the multiplication as the distance information of member vector Vm(i, j) and returns a result of this processing to the distance information creation control block 101. In step S75, the distance information creation control block 101 adds "1" to the value of variable i indicative of member vector Vm subject to processing to change member vectors subject to processing. After changing member vectors subject to processing, the distance information creation control block 101 causes the procedure to return to step S71 to repeat the above-mentioned processing therefrom on a new member vector subject to processing.

Namely, the distance information creation control block 101, the distance computation block 102, the ½ multiplication block 103, and the distance information hold block 104 repeat steps S71 through S75 until the distance information creation control block 101 determines in step S71 that the distance information of all member vectors has been created.

If, in step S71, the distance information of all of N member vectors Vm(i, j) in vector group S(j) currently subject to processing is found created for common representative point C(h) currently subject to processing, then the distance information creation control block 101 ends this distance information creation processing and causes the distance information hold block 104 to supply the distance information held therein to the distance information sort block 83 (FIG. 8), upon which the procedure returns to step S52 shown in FIG. 16 to repeat the above-mentioned processing therefrom.

The nearest neighborhood vector group search block 16 of the feature quantity comparison apparatus 10 shown in FIG. 1 searches each vector group (or each model) for a nearest neighborhood vector for an input vector on the basis of a neighborhood table group stored in the neighborhood table group storage block 15, common representative point information stored in the common representative point information storage block 13, and vector information stored in the vector information storage block 11 and outputs the retrieved nearest neighborhood vectors as a nearest neighborhood vector group. The following describes a flow of this nearest neighborhood vector group search processing with reference to the flowchart shown in FIG. 18. When an input vector has been entered to start nearest neighborhood vector group search processing, the initialization processing block 121 of the nearest neighborhood vector group search block 16 gets vector information from the vector information storage block 11, gets common representative point information from the common representative point information storage block 13, and gets a neighborhood table group from the neighborhood table group storage block 15, thereby executing initialization processing such as initializing (to "0" for example) the value of variable j indicative of a vector group subject to processing, the value of variable h indicative of a common representative point subject to processing, and the value of variable i and variable k indicative of a member vector subject to processing in step S91.

In step S92, the nearest neighborhood vector group search control block 122 determines whether the nearest neighborhood vector for the input vector has been searched for all of M vector groups (or models). If any vector group is found not yet processed, then the nearest neighborhood vector group search control block 122 supplies a result of this decision to the nearest neighborhood vector search block 123, upon which the procedure goes to step S93. In step S93, the nearest neighborhood vector search block 123 executes processing of searching the vector group subject to processing for the nearest neighborhood vector of the input vector. Details of this nearest neighborhood vector search processing will be described later. If the nearest neighborhood vector has been retrieved, the nearest neighborhood vector search block 123 supplies a result of this search processing to the nearest neighborhood vector group search control block 122, upon which the procedure goes to step S94. In step S94, the nearest neighborhood vector group search control block 122 adds "1" to the value of variable j to change vector groups subject to processing, upon which the procedure returns to step S91 to repeat the above-mentioned processing therefrom on a new vector group subject to processing.

Namely, the nearest neighborhood vector group search control block 122 and the nearest neighborhood vector search block 123 repeat steps S92 through S94 until the nearest neighborhood vector group search control block 122 determines in step S92 that all of M vector groups have been searched for the nearest neighborhood vector.

If all vector groups are found searched for the nearest neighborhood vector of the input vector in step S92, thereby obtaining all nearest neighborhood vector groups, then the nearest neighborhood vector group search control block 122 outputs the nearest neighborhood vector groups, thereby ending this nearest neighborhood vector group search processing.

As described above, when the nearest neighborhood vector group search block 16 searches each vector group (or model) for the nearest neighborhood vector of an input vector and outputs retrieved nearest neighborhood vector groups, the feature quantity comparison apparatus 10 is able to easily make a comparison in feature between model and input information even if there are two or more models.

Figure 18:
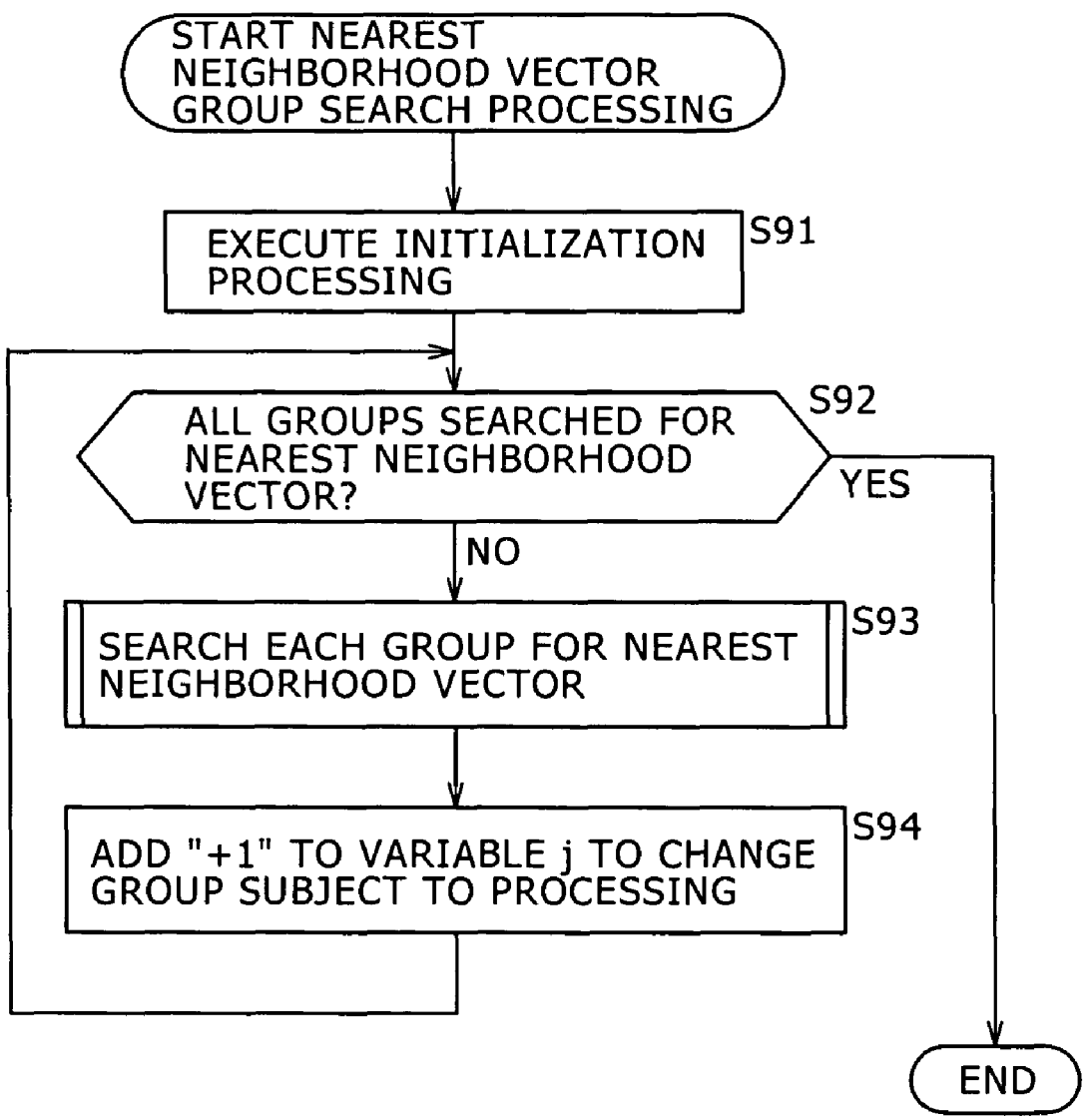
FIG. 18 is a flowchart indicative of exemplary nearest neighborhood vector group search processing.
Figure 19:
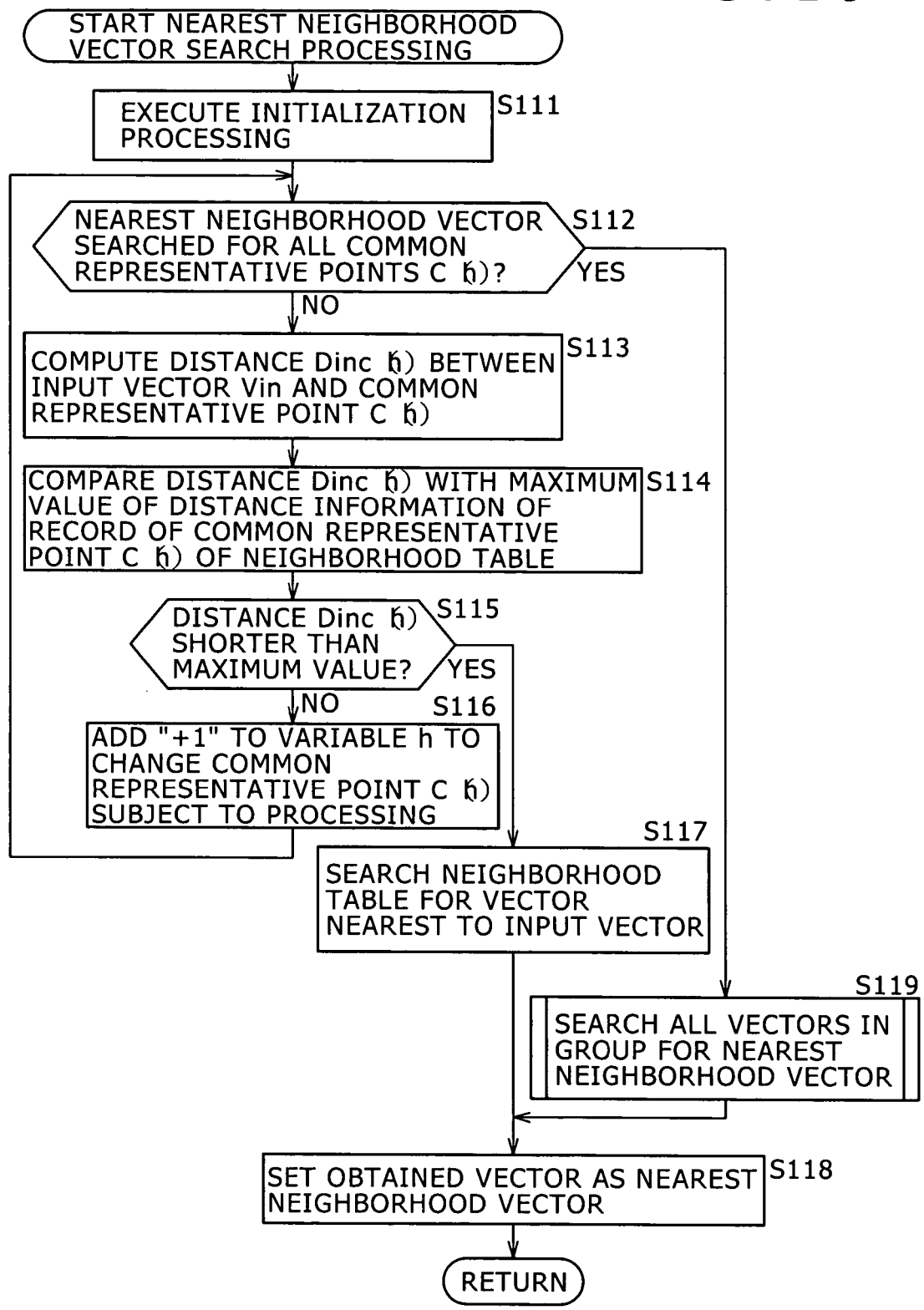
FIG. 19 is a flowchart indicative of exemplary nearest neighborhood search processing.

The following describes details of a flow of nearest neighborhood vector search processing to be executed by the nearest neighborhood vector search block 123 (FIG. 10) in step S93 shown in FIG. 18, with reference to the flowchart shown in FIG. 19.

When the nearest neighborhood vector search processing starts, the initialization processing block 141 (FIG. 11) of the nearest neighborhood vector search block 123 executes initialization processing such as initializing (to "0" for example) the value of variable h indicative of a common representative point subject to processing and variable i and variable k indicative of a member vector subject to processing in step S111.

In step S112, the nearest neighborhood vector search control block 142 determines whether all of R common representative points C(h) have been searched for the nearest neighborhood vector for. If all of R common representative points C(h) are found not searched for the nearest neighborhood vector, namely, if there remain any common representative points not yet processed, then the nearest neighborhood vector search control block 142 supplies a result of this decision to the distance computation block 143, upon which the procedure goes to step S113.

In step S113, the distance computation block 143 computes distance Dinc(h) between input vector Vin and common representative point C(h) and supplies a result of the computation to the distance comparison block 144. The distance computation block 143 computes the square root of the sum of the square of a difference between coordinates in the same manner as with the above-mentioned equation (1), namely the computation of the distance between common representative point and member vector.

In step S114, the distance comparison block 144 compares distance Dinc(h) with a maximum value of the distance information of the record of common representative point C(h) of the neighborhood table to determine in step S115 whether distance Dinc(h) is smaller. If the maximum value of the distance information of the record of common representative point C(h) of the neighborhood table is found smaller than distance Dinc(h), then the distance comparison block 144 returns a result of this comparison to the nearest neighborhood vector search control block 142, upon which the procedure goes to step S116.

In step S116, the nearest neighborhood vector search control block 142 adds "1" to the value of variable h to change common representative points C(h) subject to processing, upon which the procedure returns to step S112 to repeat the above-mentioned processing therefrom on new common representative point C(h).

Namely, the nearest neighborhood vector search control block 142, the distance computation block 143, and the distance comparison block 144 repeat steps S112 through S116 until the nearest neighborhood vector search control block 142 determines in step S112 that all common representative points C(h) have been searched for the nearest neighborhood vector or the distance comparison block 144 determines in step S115 that distance Dinc(h) is smaller than the maximum value of the distance information of the record of common representative point C(h) of the neighborhood table.

If distance Dinc(h) is found smaller than the maximum value of the distance information of the record of common representative point C(h) of the neighborhood table in step S115, then the distance comparison block 144 supplies a result of this decision to the in-table search block 145, upon which the procedure goes to step S117. In step S117, the in-table search block 145 searches the neighborhood table subject to processing for a vector that is nearest to the input vector. Namely, the in-table search block 145 restricts the search range in which to search for the nearest neighborhood vector of the input vector to the neighborhood vectors listed in the neighborhood table and searches these neighborhood vectors for the nearest neighborhood vector. Details of the flow of this in-table search processing for the nearest neighborhood vector will be described later.

When the processing of step S117 has been completed, the in-table search block 145 supplies a result of the search to the nearest neighborhood vector setting block 146. In step S118, the nearest neighborhood vector setting block 146 sets the vector retrieved by the in-table search block 145 and supplied therefrom to the nearest neighborhood vector and supplies this nearest neighborhood vector to the nearest neighborhood vector group search control block 122, thereby ending the nearest neighborhood vector search processing, upon which the procedure returns to step S93 shown in FIG. 18 to repeat the above-mentioned processing therefrom.

Namely, if there is any common representative point with which the distance from the input vector is smaller than the maximum value (½ of the distance) of the distance information of the record in the neighborhood table, the in-table search block 145 searches the neighborhood vectors (the member vectors listed in the neighborhood table) of that common representative point for the nearest neighborhood vector of the input vector.

If the search for the nearest neighborhood vector is found executed for all common representative points C(h) in step S112, namely, there is no more common representative points with which the distance from the input vector is smaller than the maximum value (½ of the distance) of the distance information of the record, then the nearest neighborhood vector search control block 142 supplies a result of this decision to the in-group total search block 147, upon which the procedure goes to step S119.

In step S119, the in-group total search block 147 searches all member vectors in the group for a vector (or a nearest neighborhood vector) that is nearest to the input vector. The in-group total search block 147 supplies a result of this search to the nearest neighborhood vector setting block 146, upon which the procedure returns to step S118 to repeat the above-mentioned processing therefrom.

In this case, in step S118, the nearest neighborhood vector setting block 146 sets the member vector retrieved by the in-group total search block 147 and supplied as a result of the search to the nearest neighborhood vector and supplies this nearest neighborhood vector to the nearest neighborhood vector group search control block 122, thereby ending the nearest neighborhood vector search processing, upon which the procedure returns to step S93 shown in FIG. 18 to repeat the above-mentioned processing therefrom.

As described above, the nearest neighborhood vector search block 123 sets the search range of the nearest neighborhood vector to the neighborhood vectors or the entire vector group in accordance with the distance between input vector and common representative point and executes search processing within that search range. This setup allows the nearest neighborhood vector search block 123 to restrict the search range of the nearest neighborhood vector to the neighborhood vectors of a common representative point if the input vector is near any one of common representative points, to be more specific, if there is any common representative point with which the distance between input vector and common representative point is smaller than the maximum value of the distance information (½ of the distance between common representative point and neighborhood vector) registered in the record of the common representative point of the neighborhood table, thereby excluding unnecessary candidates (those member vectors that will not obviously become the nearest neighborhood vector) to speed up the search for the nearest neighborhood vector.

Also, the above-mentioned processing makes it practicable to execute entire vector group search processing on only a group with which it is necessary to set all member vectors of a vector group to a search range and execute search processing within neighborhood vectors for a vector group in which obviously unnecessary member vectors exist. Namely, if there are two or more vector sets subject to search, the nearest neighborhood vector search block 123 is able to quickly search each set for the neighborhood vector of an input vector without involving the degradation of search accuracy.

Figure 20:
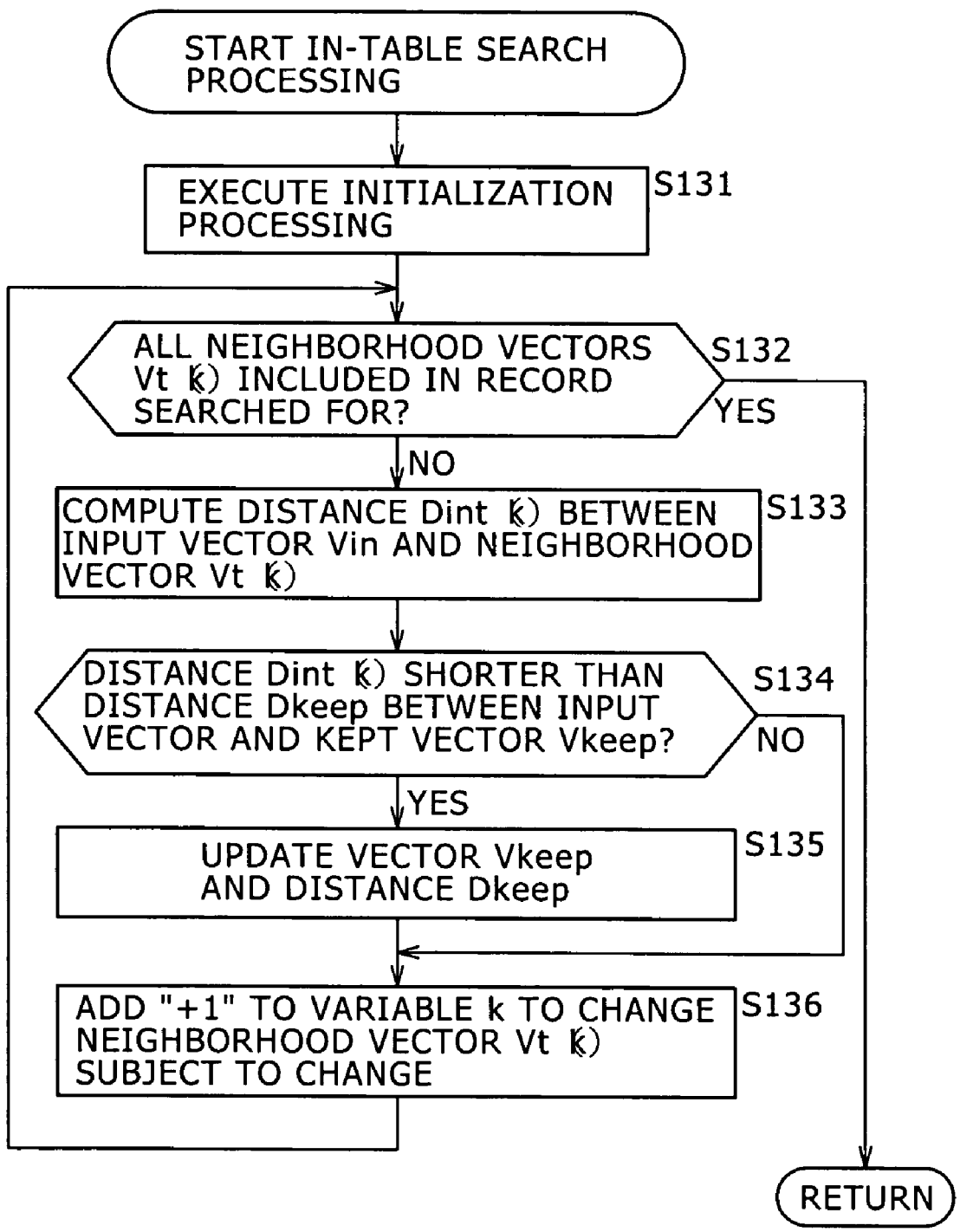
FIG. 20 is a flowchart indicative of exemplary in-table search processing.

The following describes details of a flow of in-table search processing to be executed by the in-table search block 145 (FIG. 11) in step S117 shown in FIG. 19, with reference to the flowchart shown in FIG. 20.

First, when in-table search processing starts, the initialization processing block 161 (FIG. 12) of the in-table search block 145 executes initialization processing such as initializing (to "0" for example) the value of variable k indicative of a neighborhood vector subject to search, setting nearest neighborhood vector candidate Vkeep held in the data hold block 165 to a virtual point at infinity from an input vector, and setting distance Dkeep from an input vector of that nearest neighborhood vector candidate Vkeep to infinity in step S131.

In step S132, the in-table search control block 162 determines whether search has been made on all of K neighborhood vectors Vt(k) (0≦k≦K−1) included in the record. If there is any neighborhood vector Vt(k) not yet processed, then the in-table search control block 162 supplies a result of the decision to the distance computation block 163, upon which the procedure goes to step S133.

In step S133, the distance computation block 163 computes a distance Dint(k) between input vector Vin and neighborhood vector Vt(k) and supplies the computed distance to the update control block 164, upon which the procedure goes to step S134.

In step S134, the update control block 164 determines whether distance Dint(k) is smaller than distance Dkeep between input vector Vin and nearest neighborhood vector candidate Vkeep. If distance Dint(k) is found smaller than distance Dkeep, then the update control block 164 supplies the information about neighborhood vector Vt(k) subject processing and distance Dint(k) to the data hold block 165, upon which the procedure goes to step S135. In step S135, the data hold block 165 updates the information of distance Dkeep between nearest neighborhood vector candidate Vkeep and the input vector by use of the supplied information about neighborhood vector Vt(k) and distance Dint(k).

The update control block 164 returns a result of the above-mentioned control processing to the in-table search control block 162, upon which the procedure goes to step S136. If distance Dint(k) is found greater than distance Dkeep between input vector Vin and vector Vkeep in step S134, then the update control block 164 skips step S135 and returns a result of this control processing to the in-table search control block 162, upon which the procedure goes to step S136.

In step S136, the in-table search control block 162 adds "1" to the value of variable k to change neighborhood vectors Vt(k) subject to processing, upon which the procedure returns to step S132 to repeat the above-mentioned processing therefrom on new neighborhood vector Vt(k) subject to processing.

Namely, the in-table search control block 162, the distance computation block 163, the update control block 164, and the data hold block 165 repeat steps S132 through S136 until the in-table search control block 162 determines that search has been made on all neighborhood vectors Vt(k) included in the record in step S132.

Then, if search has been made on all neighborhood vectors Vt(k) included in the record in step S132, the in-table search control block 162 causes the data hold block 165 to supply nearest neighborhood vector candidate Vkeep held therein and the information of distance Dkeep from the input vector to the nearest neighborhood vector setting block 146 as a result of the search processing to end the in-table search processing, upon which the procedure returns to step S117 shown in FIG. 19 to repeat the above-mentioned processing from step S118.

Figure 21:
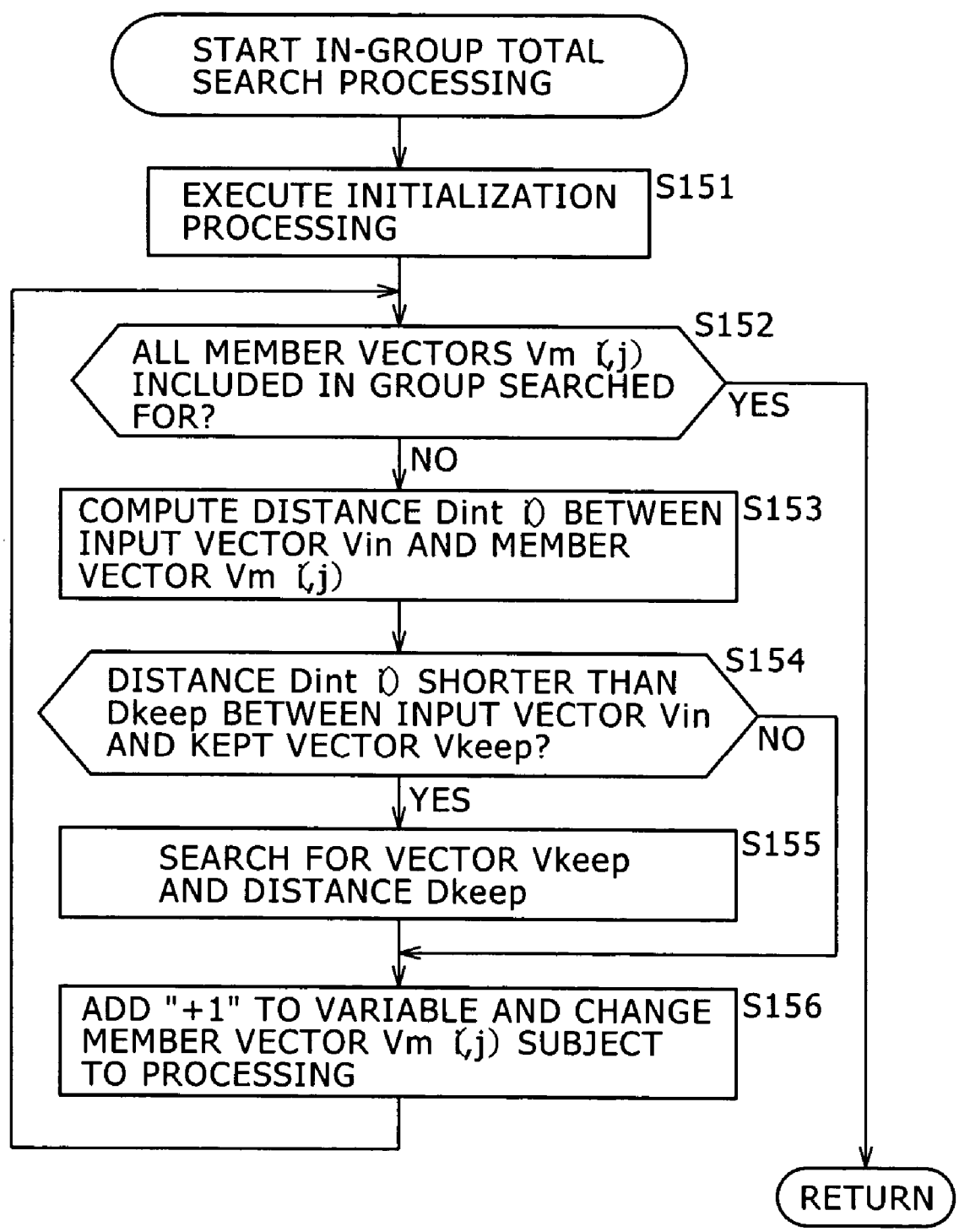
FIG. 21 is a flowchart indicative of exemplary in-group total search processing.

The following describes details of a flow of in-group total search processing to be executed by the in-group total search block 147 (FIG. 11) in step S119 shown in FIG. 19, with reference to the flowchart shown in FIG. 21.

First, when the in-group total search processing starts, the initialization processing block 181 (FIG. 13) of the in-group total search block 147 executes initialization processing such as initializing (to "0" for example) the value of variable i indicative of a member vector subject to processing, setting candidate Vkeep of the nearest neighborhood vector held in the data hold block 185 to a virtual point at infinity from an input vector, and setting distance Dkeep from the input vector of nearest neighborhood vector candidate Vkeep to infinity in step S151.

In step S152, the in-group total search control block 182 determines whether search has been made on all of N member vectors Vm(i, j) included in the group. If any member vector Vm(i, j) is found not yet processed, the in-group total search control block 182 supplies a result of this decision to the distance computation block 183, upon which the procedure goes to step S153.

In step S153 the distance computation block 183 computes distance Dint(i) between input vector Vin and member vector Vm(i, j) subject to processing and supplies a result of this computation to the update control block 184, upon which the procedure goes to step S154.

In step S154, the update control block 184 determines whether distance Dint(i) is smaller than distance Dkeep between input vector Vin and nearest neighborhood vector candidate Vkeep. If Dint(i) is found smaller than distance Dkeep, then the update control block 184 supplies information of member vector Vm(i, j) subject to processing and distance Dint(i) to the data hold block 185, upon which the procedure goes to step S155. In step S155, the data hold block 185 updates the information of nearest neighborhood vector candidate Vkeep held therein and distance Dkeep from the input vector by use of the information of supplied vector Vm(i, j) and distance Dint(i).

The update control block 184 returns a result of this control processing to the in-group total search control block 182, upon which the procedure goes to step S156. If, in step S154, distance Dint(i) is found greater than distance Dkeep between input vector Vin and nearest neighborhood vector Vkeep held therein, then the update control block 184 skips step S155 and returns a result of the control processing to the in-group total search control block 182, upon which the procedure goes to step S156.

In step S156, the in-table search control block 162 adds "1" to the value of variable i to change member vectors Vm(i, j) subject to processing, upon which the procedure returns to step S152 to repeat the above-mentioned processing therefrom on new member vector Vm(i, j) subject to processing.

Namely, the in-table search control block 162, the distance computation block 163, the update control block 164, and the data hold block 165 repeat steps S152 through S156 until the in-table search control block 162 determines that search has been made on all of N member vectors Vm(i, j) (0≦i≦N−1) included in the record.

If, in step S152, search is found made on all of N member vectors Vm(i, j) included in the vector group, then the in-group total search control block 182 supplies information of nearest neighborhood vector Vkeep held in the data hold block 185 and distance Dkeep from the input vector thereof to the nearest neighborhood vector setting block 146 as a result of the search processing and ends this in-group total search processing, upon which the procedure returns to step S119 shown in FIG. 19 to repeat the above-mentioned processing from step S118.

As described above, the feature quantity comparison apparatus 10 shown in FIG. 1 computes a representative point common to all vector groups (or models), creates a neighborhood table by use of the computed common representative point, and searches for a nearest neighborhood vector of an input vector by use of the created neighborhood table, so that, if there are two or more vector sets subject to search, the feature quantity comparison apparatus 10 is able to quickly search the vector sets for a nearest neighborhood vector of the input vector. Namely, if there a plurality of sets subject to search, the feature quantity comparison apparatus 10 is able to search these sets for desired elements at high speeds.

It should be noted that, in the above description, constants N, M, R, K and so on of parameters may be any natural numbers as far as there is no contradiction between relationships of measure; namely, these constants may be user-specified values or predetermined values.

Also, with the embodiments of the present invention, any kind of vector information may be used for the input vector for searching for a nearest neighborhood vector and the member vector (or model) subject to search. In addition, the embodiments of the present invention may be used for the search of non-vector information, for example. For example, the embodiments of the present invention are applicable to any search processing as far as searching sets for desired elements.

The present invention is described with reference to FIG. 1 in which the feature quantity comparison apparatus 10 is practiced as one embodiment. Further the present invention may be embodied in a system made up of a plurality of apparatuses. For example, the components of the feature quantity comparison apparatus 10 shown in FIG. 1 may be configured as separate apparatuses. FIG. 22 shows an exemplary configuration of a feature quantity comparison system practiced as another embodiment of the present invention.

In FIG. 22, a feature quantity comparison system 200 has a storage apparatus 211, a common representative point setting apparatus 212, a neighborhood table group creation apparatus 214, and a nearest neighborhood vector group search apparatus 216 and executes substantially the same processing as the feature quantity comparison apparatus 10 shown in FIG. 1.

The storage apparatus 211 incorporates a vector information storage block 11, a common representative point information storage block 13, and a neighborhood table group storage block 15, storing the above-mentioned kinds of information into these blocks correspondingly.

The common representative point setting apparatus 212 corresponds to the common representative point setting block 12 shown in FIG. 1, the neighborhood table group creation apparatus 214 corresponds to the neighborhood table group creation block 14 shown in FIG. 1, and the nearest neighborhood vector group search apparatus 216 corresponds to the nearest neighborhood vector group search block 16 shown in FIG. 1, executing substantially the same processing as that executed by the corresponding blocks. Therefore, the description of these blocks will be skipped.

Namely, like the feature quantity comparison apparatus 10 shown in FIG. 1, the present invention is also applicable to the feature quantity comparison system 200 thus configured. That is, if there are two or more sets subject to search, the feature quantity comparison system 200 is able to search each set for desired elements at high speeds.

Further, the feature quantity comparison apparatus 10 shown in FIG. 1 may also be configured as a part of another apparatus. For example, the feature quantity comparison apparatus 10 may be configured as a part of an image processing apparatus that executes image recognition processing for example.

FIG. 23 is a block diagram illustrating an exemplary configuration of an image processing apparatus practiced as one embodiment of the invention. In FIG. 23, an image processing apparatus 230 vectorizes the feature of an input image and compares a resultant feature vector with the feature vector of a model image to detect a feature common to (or approximating) these images, thereby recognizing the input image.

In FIG. 23, the image processing apparatus 230 is made up of a learning block 231 and a recognition block 232. The learning block 231 is a processing block for registering the feature vectors of model image as a model dictionary and has a feature point extraction block 241, a feature quantity extraction block 242, and a model dictionary registration block 243.

The feature point extraction block 241 extracts predetermined feature points from a model image and supplies the extracted feature points to the feature quantity extraction block 242. The feature quantity extraction block 242 extracts the feature quantity of the feature points extracted by the feature point extraction block 241 and registers the extracted feature quantity into the model dictionary registration block 243 as a feature vector.

The recognition block 232 extracts a feature vector of an input image, compares the extracted feature vector with the feature vector of a model image, and determines whether there is any portion that matches (or approximating) the model. The recognition block 232 has a feature point extraction block 244, a feature quantity extraction block 245, a feature quantity comparison block 246, and a model detection decision block 247.

The feature point extraction block 244 extracts predetermined feature points from an input image and supplies the extracted feature points to the feature quantity extraction block 245. The feature quantity extraction block 245 extracts a feature quantity of the feature points extracted by the feature point extraction block 244 and supplies the extracted feature quantity to the feature quantity comparison block 246. The feature quantity comparison block 246, having the same configuration as that of the feature quantity comparison apparatus 10 shown in FIG. 1, and executes the same processing as that of the feature quantity comparison apparatus 10 to compare the feature vector of the model image registered in the model dictionary registration block 243 with the feature vector of the input image, supplying a result of this comparison to the model detection decision block 247. The model detection decision block 247 determines on the basis of this comparison result whether the feature of the input image has been detected in the model image, outputting a result of this decision to the outside of the apparatus as a result of the recognition processing.

Thus, the feature quantity comparison apparatus 10 shown in FIG. 1 may be used as the feature quantity comparison block 246 to execute the comparison of feature vectors by the image processing apparatus 230. In this case, the feature quantity comparison block 246 also executes the same processing as the above-mentioned processing executed by the feature quantity comparison apparatus 10.

In addition, the same processing blocks as the components (FIG. 1) of the feature quantity comparison apparatus 10 may be configured as other than the feature quantity comparison block 246. FIG. 24 is a block diagram illustrating another exemplary configuration of the image processing apparatus 230 shown in FIG. 23.

In the case of FIG. 24, like the image processing apparatus 230 shown in FIG. 23, an image processing apparatus 250 has a learning block 251 and a recognition block 252. The learning block 251 has a model dictionary registration block 263, a common representative point setting block 12, and a neighborhood table group creation block 14 instead of the model dictionary registration block 243 of the learning block 231. The model dictionary registration block 263 has a vector information storage block 11, a common representative point information storage block 13, and a neighborhood table group storage block 15 in addition to the capabilities of the model dictionary registration block 243.

The recognition block 252 has a nearest neighborhood vector group search block 16 instead of the feature quantity comparison block 246 of the recognition block 232.

Namely, in the case of the image processing apparatus 230 shown in FIG. 23, the recognition block 232 has the feature quantity comparison block 246 corresponding to the feature quantity comparison apparatus 10 shown in FIG. 1. In the case of the image processing apparatus 250 shown in FIG. 24, the recognition block 252 has only the nearest neighborhood vector group search block 16 of the feature quantity comparison apparatus 10 shown in FIG. 1 and the learning block 251 has the other components of the feature quantity comparison apparatus 10 shown in FIG. 1 (namely, the vector information storage block 11, the common representative point setting block 12, the common representative point information storage block 13, the neighborhood table group creation block 14, and the neighborhood table group storage block 15).

As described above, each component of the feature quantity comparison apparatus 10 may be configured for the image processing apparatus 230 in any manner as far as the contents of the processing by the component remain substantially the same (namely, as far as the component is configured such that the component corresponds to the feature quantity comparison apparatus 10).

In addition, the above-mentioned configuration of the feature comparison according to the invention may be combined with other technologies. For example, in order to make the processing of member vector groups easier, the coordinate conversion processing based on main component analysis may be applied to the above-mentioned feature quantity comparison processing.

FIG. 25 is a block diagram illustrating another exemplary configuration of the feature quantity comparison apparatus. A feature quantity comparison apparatus 280 is obtained by applying coordinate conversion processing based on main component analysis to the feature quantity comparison processing by the feature quantity comparison apparatus 10 shown in FIG. 1 and has a vector information storage block 11, a member vector coordinate conversion block 281, an input vector coordinate conversion block 282, a nearest neighborhood vector group coordinate conversion block 283, a converted coordinate vector information storage block 291, a converted coordinate common representative point setting block 292, a converted coordinate common representative point information storage block 293, a converted coordinate neighborhood table group creation block 294, a converted coordinate neighborhood table group storage block 295, and a converted coordinate nearest neighborhood vector group search block 296.

The member vector coordinate conversion block 281 executes main component analysis on the basis of the vector information stored in the vector information storage block 11 as will be described later, thereby converting the coordinates of each member vector. The member vector coordinate conversion block 281 supplies the coordinate-converted vector information (or converted coordinate vector information) to the converted coordinate vector information storage block 291 for storage therein. Also, the member vector coordinate conversion block 281 supplies the information about a result of main component analysis to the input vector coordinate conversion block 282.

The input vector coordinate conversion block 282 executes substantially the same coordinate conversion processing as the member vector coordinate conversion block 281 on an input vector on the basis of the information about the result of main component analysis supplied from the member vector coordinate conversion block 281 and supplies the input vector on the converted coordinates (or the converted coordinate input vector) to the converted coordinate nearest neighborhood vector group search block 296. Also, the input vector coordinate conversion block 282 supplies the information about the result of main component analysis to the nearest neighborhood vector group conversion block 283.

Getting a nearest neighborhood vector group on the converted coordinate (or a converted coordinate nearest neighborhood vector group) supplied from the converted coordinate nearest neighborhood vector group search block 296, the nearest neighborhood vector group conversion block 283 executes coordinate conversion processing corresponding to the input vector coordinate conversion block 282 on the obtained converted coordinate nearest neighborhood vector group on the basis of the information about the result of main component analysis supplied from the input vector coordinate conversion block 282, thereby converting the converted coordinate nearest neighborhood vector group into the original coordinate system (or the coordinate system of the vector information stored in the vector information storage block 11) to output the nearest neighborhood vector group of the original coordinate to the outside of the feature quantity comparison apparatus 280.

The converted coordinate vector information storage block 291, the converted coordinate common representative point setting block 292, the converted coordinate common representative point information storage block 293, the converted coordinate neighborhood table group creation block 294, the converted coordinate neighborhood table group storage block 295, and the converted coordinate nearest neighborhood vector group search block 296 correspond to the vector information storage block 11, the common representative point setting block 12, the common representative point information storage block 13, the neighborhood table group creation block 14, the neighborhood table group storage block 15, and the nearest neighborhood vector group search block 16 shown in FIG. 1 respectively, executing the same processing as the processing by these blocks except that the former blocks execute the processing on the converted coordinates. Therefore, the description of the former blocks will be skipped.

Figure 26B:
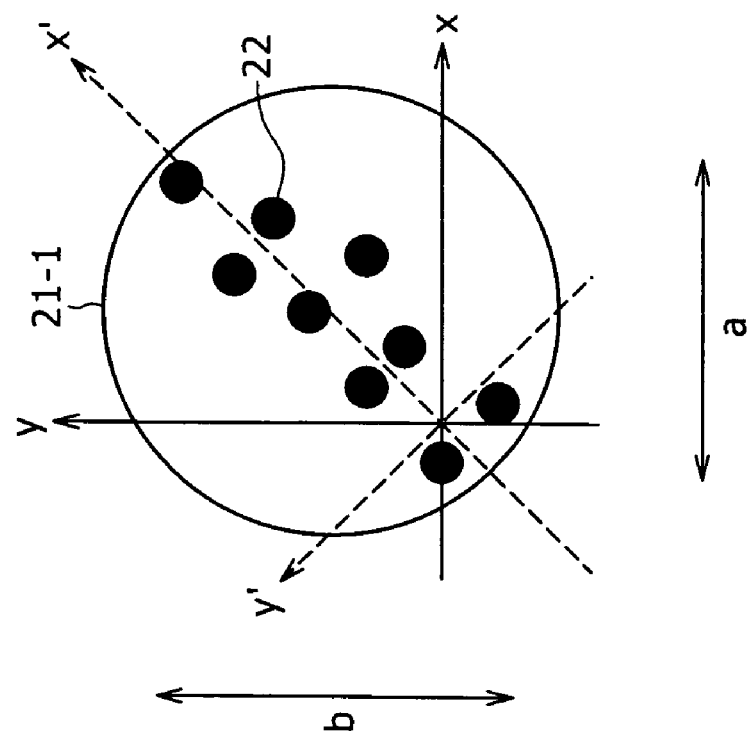
FIGS. 26A and 26B are schematic diagrams illustrating manners of coordinate conversion.
Figure 26A:
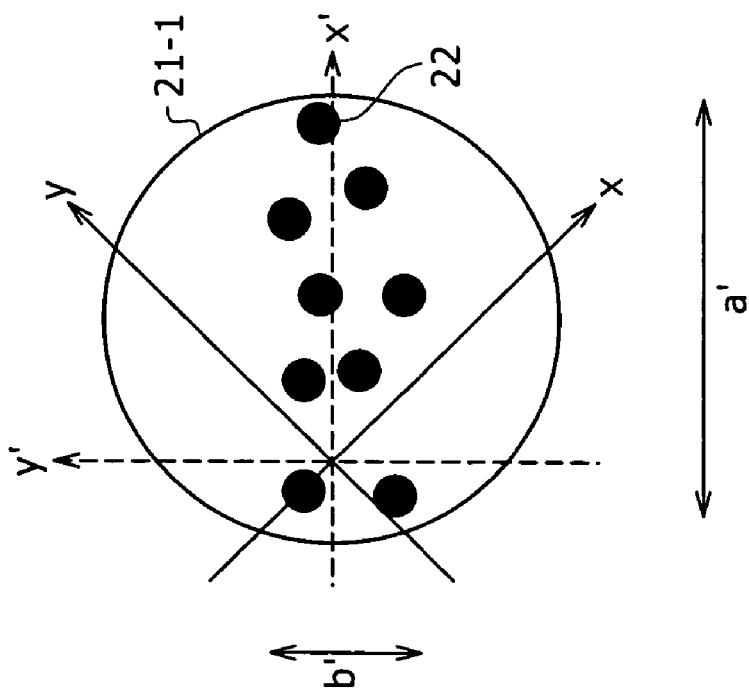

The following describes the coordinate conversion based on main component analysis with reference to FIGS. 26A and 26B. FIG. 26A shows an exemplary distribution of feature vectors 22 in a vector group 21-1. As shown in FIG. 26A, it is supposed that the feature vectors 22 of the vector group 21-1 be distributed on a plane defined by x coordinate and y coordinate. The feature vectors 22 are indicative of a predetermined feature of image information for example, so that the distribution thereof is not uniform; it is highly possible for this distribution to have a predetermined deviation. For example, an image edge portion is extracted as a feature point, a feature of the extracted edge portion comes to be included in each feature vector 22. Namely, because a same or approximating feature is included in each feature vector 22, the distribution of these feature vectors 22 comes to have a deviation in distribution.

Consequently, the distribution of the feature vectors 22 has a direction in which the feature vectors 22 are distributed in a widest range (namely, the direction in which the contribution to distribution is highest). This direction is referred to as a main component.

The feature quantity comparison apparatus 280 shown in FIG. 25 detects this main component from the distribution of member vectors to convert the coordinates of member vectors into the coordinates having this main component as axes as shown in FIG. 26B.

Namely, as shown in FIG. 26A, the feature quantity comparison apparatus 280 converts the coordinates of the feature vectors 22 distributed on a coordinate system defined by x coordinate and y coordinate into a coordinate system defined by x' coordinate and y' coordinate perpendicular to x' coordinate that are the main components of the feature vectors 22. FIG. 26B shows a distribution of the feature vectors 22 after coordinate conversion.

This coordinate conversion causes the distribution of feature vectors 22 that are approximately the same in degree, range a in the x coordinate direction and range b in the y coordinate direction to a' in the x' coordinate direction and b' in the y' coordinate direction (a'>>b'). Namely, the distribution of feature vectors 22 deviates in the direction of x' coordinate owing to the coordinate conversion.

Figures 27A, 27B, 27C:
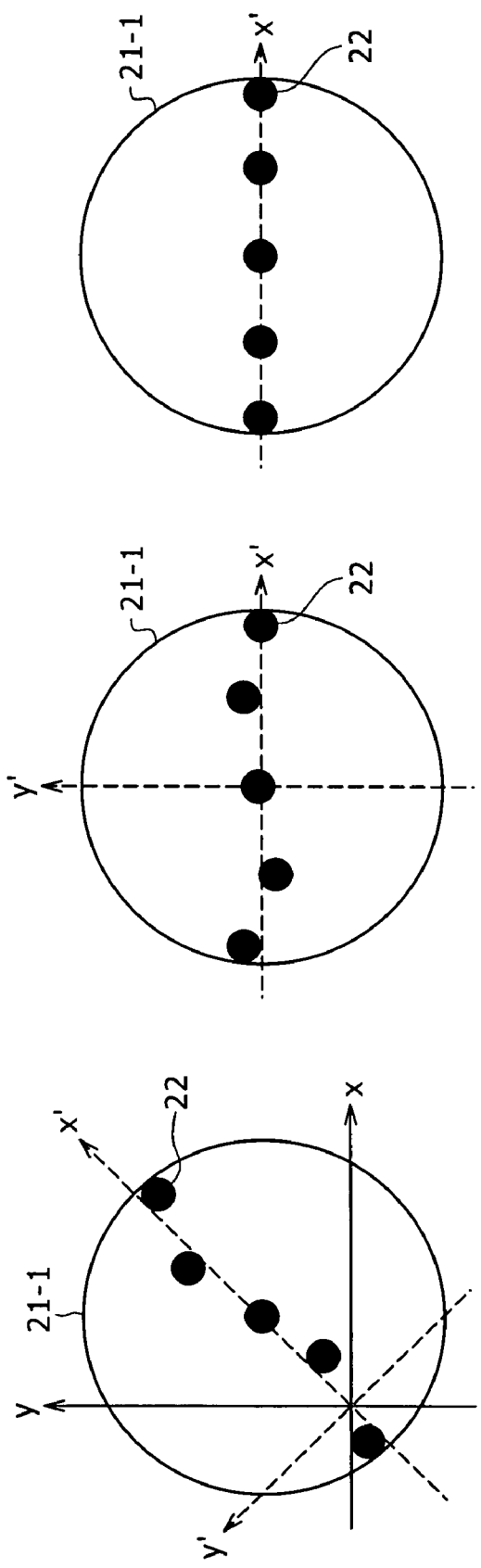
FIGS. 27A, 27B, and 27C are schematic diagrams illustrating manners of dimensional compression.

By executing main component analysis as described above for coordinate conversion, the feature quantity comparison apparatus 280 omits the distribution in the direction in which the contribution ratio to the distribution of member vectors is low to execute dimensional compression as shown in FIG. 27A, 27B and 27C for example. For example, as shown in FIG. 27A, if the feature vectors 22 distributed almost linearly along the x' axis direction provide the main vectors of the vector group 21-1, then the coordinate conversion of the feature vectors 22 as shown in FIG. 27B results in the distribution of feature vectors 22 only in the x' coordinate direction, almost not in the y' coordinate direction perpendicular to the x' coordinate direction. In such a case, the feature quantity comparison apparatus 280 omits the distribution in the y' coordinate direction overwhelmingly small in the contribution ratio to the distribution relative to the main component and regards all feature vectors as being on the x' axis (or on the single dimension). Namely, in this case, the feature quantity comparison apparatus 280 dimensionally compresses the distribution of the feature vectors 22 from two-dimensional coordinates to single-dimensional coordinates. This dimensional compression of the distribution of feature vectors allows the feature quantity comparison apparatus 280 to reduce the number of dimensions of operational expressions for computing the distance between vectors for example, thereby reducing operational quantities. Namely, the feature quantity comparison apparatus 280 executes the above-mentioned dimensional compression to mitigate the load of searching for the nearest neighborhood vector of each input vector, thereby enhancing the speed of the processing.

In addition to the dimensional compression such as described above, the feature quantity comparison apparatus 280 may execute the main component analysis as shown in FIG. 28 for example, for coordinate conversion, thereby speeding up the search for a nearest neighborhood vector by use of the deviation in contribution ratio.

In the search for a nearest neighborhood vector, the feature quantity comparison apparatus 280 computes the distance between an input vector and each member vector in a search range one by one and a member vector having the shortest distance is regarded as a nearest neighborhood vector as described above. To be more specific, the feature quantity comparison apparatus 280 first holds, as an initial value of nearest neighborhood vector candidate Vkeep, a point with which distance Dkeep from an input vector is at infinity. Next, the feature quantity comparison apparatus 280 computes the distance between the input vector and each of all member vectors in a search range one by one. If the compute distance is found smaller than distance Dkeep held in the feature quantity comparison apparatus 280, then the feature quantity comparison apparatus 280 updates distance Dkeep between nearest neighborhood vector candidate Vkeep and the input vector. Repeating this operation, the feature quantity comparison apparatus 280 sets the candidate Vkeep held last (namely, the candidate held after the processing of all member vectors) as the nearest neighborhood vector.

Figure 28A:
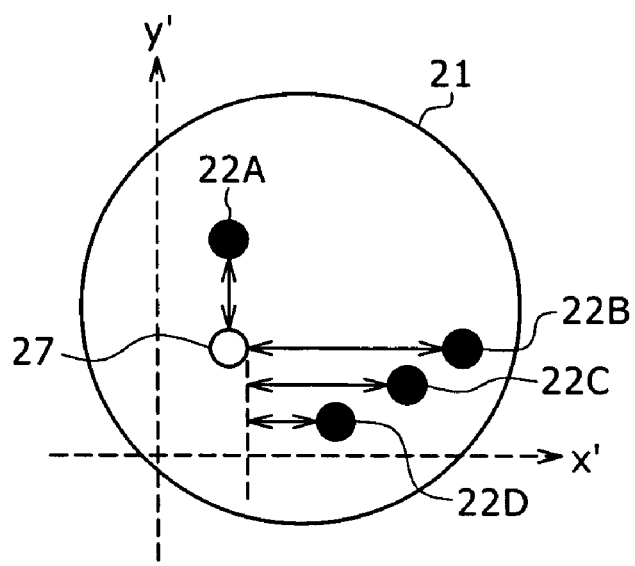
FIGS. 28A and 28B are schematic diagrams illustrating manners of inter-vector distance comparison.

Namely, with a vector group 21 as shown in FIG. 28A, if a feature vector 22A is held, for an input vector 27, as candidate Vkeep of a nearest neighborhood vector, the feature quantity comparison apparatus 280 first computes a distance between a feature vector 22B and the input vector 27 and compares the computed distance with a distance between a feature vector 22A and the input vector 27. If the feature vector 22A is nearer to the input vector, then the feature quantity comparison apparatus 280 computes a distance between a feature vector 22C and the input vector 27 and compares the computed distance with the distance between the feature vector 22A and the input vector 27. Likewise, if the feature vector 22A is nearer to the input vector 27, the feature quantity comparison apparatus 280 computes a distance between a feature vector 22D and the input vector 27 and compares the computed distance with the distance between the feature vector 22A and the input vector 27. Thus, the feature quantity comparison apparatus 280 computes the distances between the feature vectors and the input vector one by one and compares the computed distances with the distance between the current nearest neighborhood vector candidates and the input vector. If a neighborhood vector nearest from the input vector is newly found, then the feature quantity comparison apparatus 280 sets that member vector as a new nearest neighborhood vector candidate and holds the information thereof.

The distance computed this moment between vectors is indicated by the square root of a sum of the square of a difference between the coordinate components of two points as shown in equation (1) above. Because the value of the difference between coordinate components is always positive, the absolute value of the difference between two distances (indicative which feature vector is nearer to the input vector) is determined by a sum of positive values. Namely, if a distance between two points is computed and the computed distance is compared with a certain reference distance for example and if the square of the difference between certain coordinate components of these two points is greater than the square of the reference distance, then the distance between these two points is always longer than the reference distance.

Therefore, in computing distances between member vectors and an input vector, the feature quantity comparison apparatus 280 sequentially computes the squares of the differences between components in the descending order of contribution ratios (a term relatively larger in value), adds the computed distances, and, every time the addition is made, compares the obtained distance with the square of distance Dkeep between nearest neighborhood vector candidate Vkeep and the input vector. By doing so, the feature quantity comparison apparatus 280 may stops distance computation of a member vector when a result of the addition has exceeded the square of distance Dkeep (without adding the square of the difference between components having lower contribution ratios (a term relatively smaller in value)) because such a member vector never becomes a nearest neighborhood vector candidate, thereby moving to the distance computation for a next member vector.

Figure 28B:
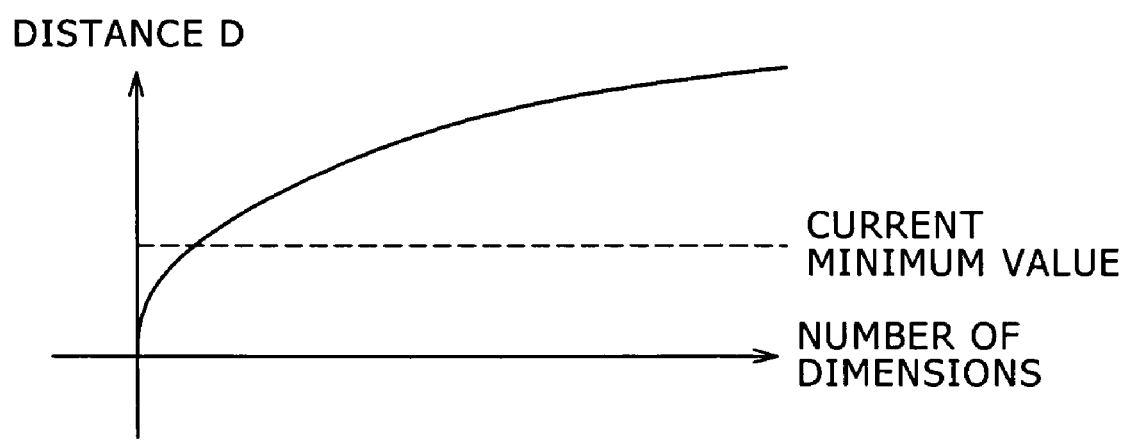

In other words, in the computation of distances between member vectors and an input vector, the feature quantity comparison apparatus 280 adds the squares of the differences between components of coordinates of two points in the descending order of contribution ratios, a result of this addition plots a curve as shown in FIG. 28B. Namely, thus giving a deviation to the distribution of feature vectors 22 for each component and executing the computation as described above, the feature quantity comparison apparatus 280 may make higher the possibility of exceeding the value of distance (Dkeep) of the nearest neighborhood vector candidates held in the stage of early dimensions, thereby omitting the computation.

Consequently, by the comparison between a result of the addition of the squares of difference between components and the distance (Dkeep) held every time the addition is made, the feature quantity comparison apparatus 280 may reduce the operational quantity of the distance computation to enhance the efficiency of the search for nearest neighborhood vectors, thereby speeding up the search processing.

The following describes a detail exemplary configuration of the feature quantity comparison apparatus 280 shown in FIG. 25. Referring to FIG. 29, there is shown a block diagram illustrating a detail exemplary configuration of the member vector coordinate conversion block 281 shown in FIG. 25. In FIG. 29, the member vector coordinate conversion block 281 has a vector group integration block 311, a main component analysis block 312, a coordinate conversion block 313, a dimension compression block 314, and a converted coordinate vector information storage control block 315.

The vector group integration block 311 integrates vector groups on the basis of the vector information obtained from the vector information storage block 11 into one vector group and supplies the information thereof to the main component analysis block 312.

The main component analysis block 312 executes main component analysis on the distribution of member vectors and supplies a result of the analysis to the coordinate conversion block 313. On the basis of the supplied result of the analysis, the coordinate conversion block 313 coordinate-converts each member vector into a coordinate system with the main components used as coordinate axes and supplies a result of this conversion to the dimension compression block 314. The dimension compression block 314 dimensionally compresses the distribution of member vectors on the converted coordinates as required and supplies a result of this compression to the converted coordinate vector information storage control block 315. The converted coordinate vector information storage control block 315 supplies the converted coordinate vector information that is the vector information of member vectors on the converted coordinates to the converted coordinate vector information storage block 291 for storage therein.

Figure 30:
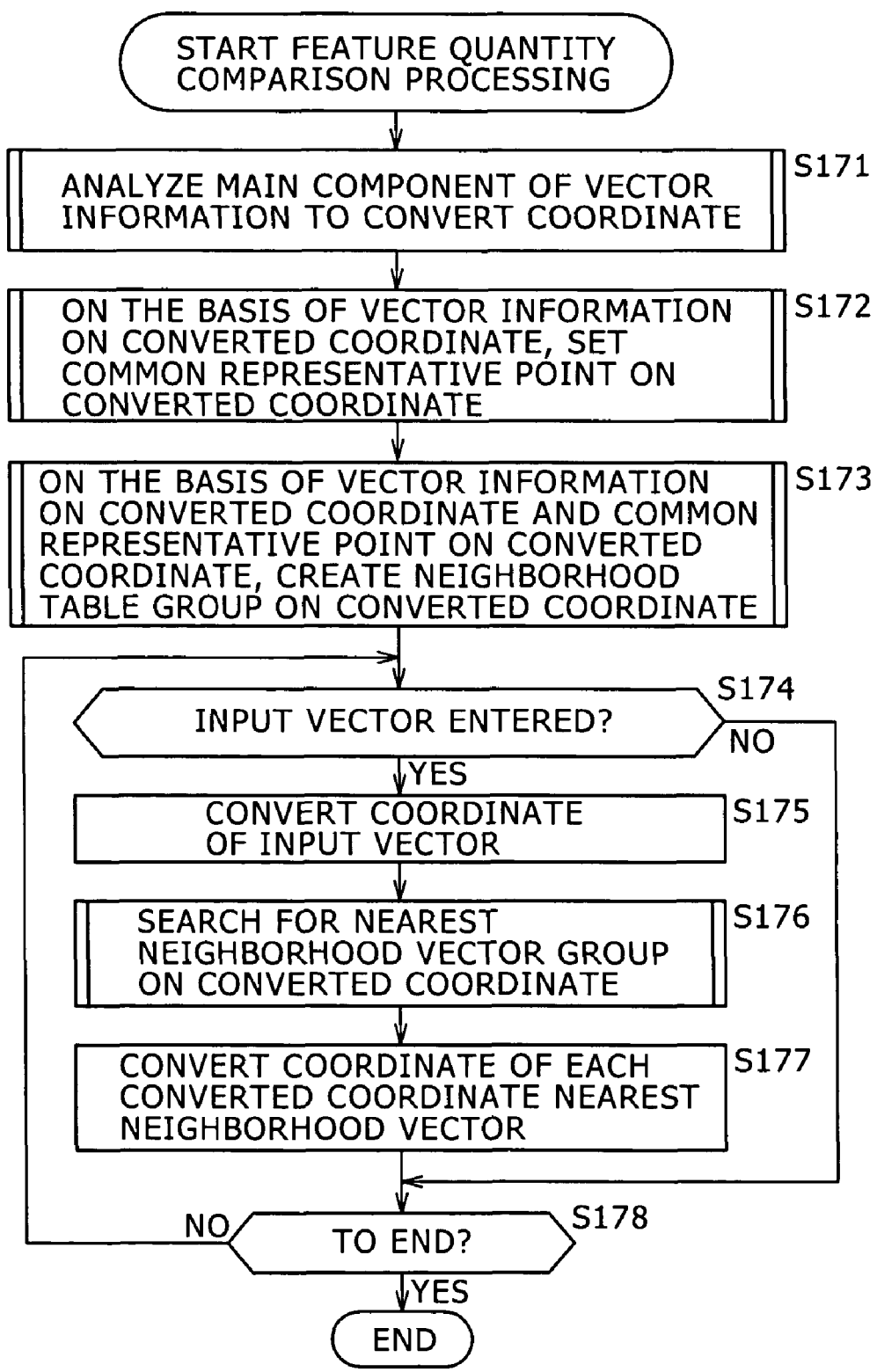
FIG. 30 is a flowchart indicative of feature quantity comparison processing.

The following describes a flow of the feature quantity comparison processing to be executed by the feature quantity comparison apparatus 280 with reference to the flowchart shown in FIG. 30.

When the feature quantity comparison processing starts, the member vector coordinate conversion block 281 analyzes the main components of the distribution of all member vectors on the basis of the vector information supplied from the vector information storage block 11 in step S171 and, on the basis of a result of this analysis, coordinate-converts each member vector. Details of this member vector coordinate conversion processing will be described later.

In step S172, the converted coordinate common representative point setting block 292 gets converted coordinate vector information from the converted coordinate vector information storage block 291 and, on the basis of the vector information on the converted coordinates, sets a common representative point on the converted coordinates (namely, a converted coordinate common representative point). It should be noted that this converted coordinate common representative point setting processing is generally the same as the common representative point setting processing described above with reference to the flowchart shown in FIG. 14 except that the former is on the converted coordinates, so that the detail description thereof will be skipped.

In step S173, the converted coordinate neighborhood table group creation block 294 creates a neighborhood table group on converted coordinates (namely, a converted coordinate neighborhood table group) on the basis of the vector information on the converted coordinates obtained from the converted coordinate vector information storage block 291 and the common representative point on the converted coordinates obtained from the converted coordinate common representative point information storage block 293. It should be noted that this converted coordinate neighborhood table group creation processing is generally the same as the neighborhood table group creation processing described above with reference to the flowchart shown in FIG. 15 except that the former is on the converted coordinates, so that the detail description thereof will be skipped.

In step S174, the input vector coordinate conversion block 282 determines whether an input vector has been entered. If an input vector is found entered, then, in step S175, on the basis of the information about the main component analysis result supplied from the member vector coordinate conversion block 281, the input vector coordinate conversion block 282 converts the coordinates of the input vector and supplies the input vector on the converted coordinates (namely, the converted coordinate input vector) to the converted coordinate nearest neighborhood vector group search block 296.

In step S176, the converted coordinate nearest neighborhood vector group search block 296 searches for a nearest neighborhood vector group of the supplied converted coordinate input vector group (namely, a converted coordinate nearest neighborhood vector group) on the converted coordinates. This converted coordinate nearest neighborhood vector search processing is generally the same as the nearest neighborhood vector group search processing described above with reference to the flowchart shown in FIG. 18 except that the former is on the converted coordinates, so that the detail description thereof will be skipped. Having retrieved a converted coordinate nearest neighborhood vector group, the converted coordinate nearest neighborhood vector group search block 296 supplies the vector group to the nearest neighborhood vector group conversion block 283, upon which the procedure goes to step S177.

In step S177, on the basis of the information about the main component analysis supplied from the input vector coordinate conversion block 282, the nearest neighborhood vector group conversion block 283 converts the coordinates of each converted coordinate nearest neighborhood vector into the original coordinate system. The nearest neighborhood vector group conversion block 283 outputs the nearest neighborhood vector group after conversion (namely, the nearest neighborhood vector group of the original coordinate system) to the outside of the feature quantity comparison apparatus 280 as a result of the feature quantity comparison, upon which the procedure goes to step S178.

If no input vector is found entered in step S174, then the input vector coordinate conversion block 282 causes the procedure to go to step S178. In step S178, the nearest neighborhood vector group conversion block 283 determines whether to end the feature quantity comparison processing. If this processing is not to be ended, then the procedure returns to step S174 to repeat the above-mentioned processing therefrom.

It should be noted that, if the feature quantity comparison processing is to be ended in step S178 on the basis of user specification for example, then the nearest neighborhood vector group conversion block 283 ends the feature quantity comparison processing.

Figure 31:
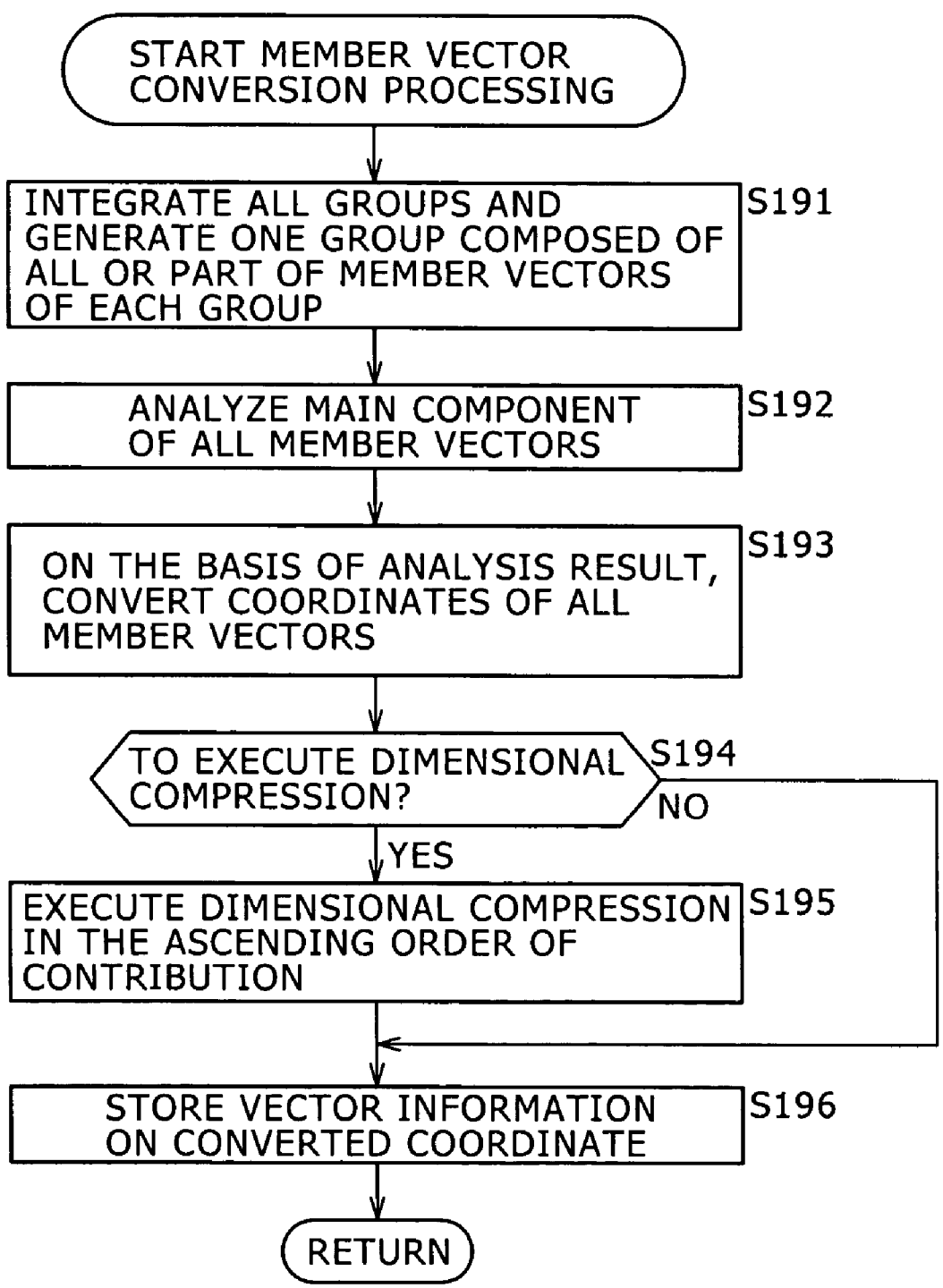
FIG. 31 is a flowchart indicative of member vector coordinate conversion processing.

The following describes details of a flow of member vector coordinate conversion processing to be executed in step S171 shown in FIG. 30, with reference to the flowchart shown in FIG. 31.

When the member vector coordinate conversion processing starts, the vector group integration block 311 (FIG. 29) of the member vector coordinate conversion block 281 integrates all vector groups in step S191 on the basis of the vector information supplied from the vector information storage block 11 into one vector group made up of all or a part of member vectors of each vector group and supplies this vector group to the main component analysis block 312, upon which the procedure goes to step S192.

In step S192, the main component analysis block 312 executes main component analysis of all member vectors and supplies a result of this analysis to the coordinate conversion block 313, upon which the procedure goes to step S193. In step S193, the coordinate conversion block 313 converts the coordinates of all member vectors on the basis of the supplied analysis result and supplies a result of this conversion to the dimension compression block 314, upon which the procedure goes to step S194. In step S194, the dimension compression block 314 determines whether to execute dimensional compression on the supplied converted coordinate member vector on the basis of user specification for example. If the dimensional compression is to be executed, then the procedure goes to step S195, in which the dimensional compression processing is executed in the ascending order of dimensions (coordinates) of lower contribution ratio to the distribution of the converted coordinate member vectors, thereby dimensionally compressing the distribution of the converted coordinate member vectors to a desired number of dimensions. When the processing of step S195 has come to an end, then the dimension compression block 314 supplies a result of this processing to the converted coordinate vector information storage control block 315, upon which the procedure goes to step S196.

If the dimensional compression is not to be executed in step S194, then the dimension compression block 314 skips step S195 and supplies the vector information of converted coordinate member vectors directly to the converted coordinate vector information storage control block 315 without executing the dimensional compression processing, upon which the procedure goes to step S196.

In step S196, the converted coordinate vector information storage control block 315 supplies the supplied converted coordinate vector information to the converted coordinate vector information storage block 291 (FIG. 25) for the storage therein. The converted coordinate vector information storage block 291 stores the converted coordinate vector information supplied from the converted coordinate vector information storage control block 315.

When the processing of step S196 has ended, the converted coordinate vector information storage control block 315 ends the member vector coordinate conversion processing, upon which the procedure returns to step S171 shown in FIG. 30 to repeat the above-mentioned processing therefrom.

As described above, by analyzing the main components of the distribution of member vectors, converting the coordinates of each vector on the basis of a result of the analysis, and making the comparison between feature quantities, the feature quantity comparison apparatus 280 is able to search each set for the neighborhood vectors for an input vector at high speeds. Namely, even if there are two or more sets subject to search, the feature quantity comparison apparatus 280 is able to search each set for desired elements at high speeds.

It should be noted that, in the above-mentioned example, the comparison of feature vectors of only one type has been described; however, the number of types of feature vectors to be compared may be any (or the number of types of coordinate components configuring each vector may be any). Namely, two or more vectors located in mutually different spaces may each be compared with a same model. If there are two or more types of feature vectors subject to comparison, there may be a difference between the numbers of dimensions of these vectors.

In this case, however, the above-mentioned comparison processing may be executed on each feature vector; alternatively, a result of the comparison processing on feature vectors of the first type may be used for the comparison processing on feature vectors to be compared next, thereby allowing the feature quantity comparison apparatus to speed up the search processing.

Figure 32:
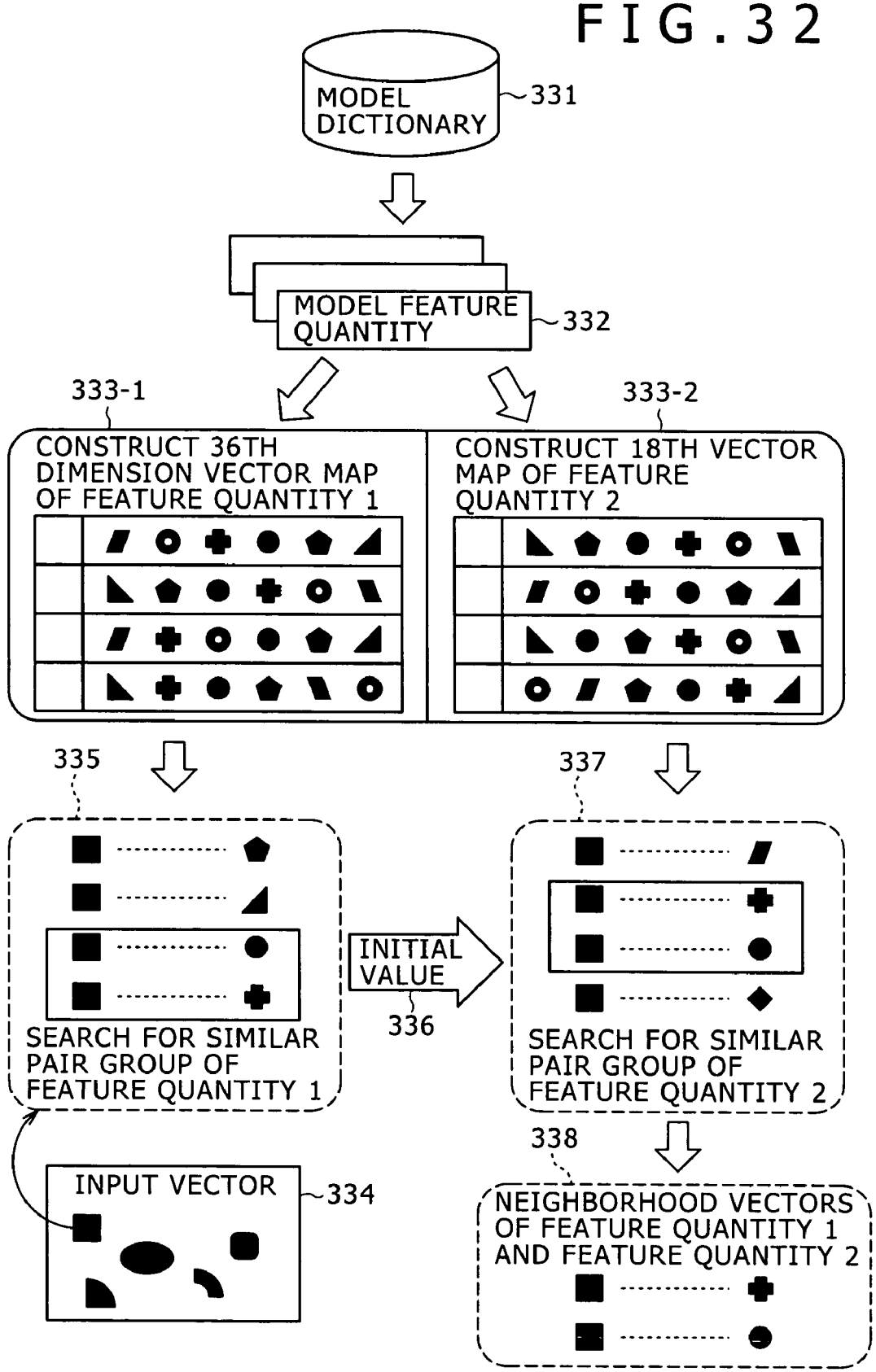
FIG. 32 is a schematic diagram illustrating a manner of searching for neighborhood vector groups.

Referring to FIG. 32, there is shown a schematic diagram illustrating a flow of processing for comparing feature vectors of two or more types.

In FIG. 32, a feature quantity (a model feature quantity 332) is extracted (a second layer from top) for each model stored in a model dictionary 331 (top layer) in which one model is stored and a vector map is constructed (a third layer from top) for each type of the model feature quantity 332. In FIG. 32, 36th-dimension vector map construction 333-1 (the left side of the third layer from top) of feature quantity 1 and 18th-dimension vector map construction 333-2 (the right side of the third layer from top) of feature quantity 2 are executed. When an input vector 334 (the left side of bottom layer) is entered, search 335 for a similar pair group of feature quantity 1 of the input vector 334 is executed on the 36th-dimension vector map of feature quantity 1 (the left side of fourth layer from top).

The 36th-dimension vector map of feature quantity 1 is constructed by use of the above-mentioned common representative point and neighborhood table for example. In this case, the similar pair group search 335 of feature quantity 1 is executed in generally the same manner as the nearest neighborhood vector search processing described above with reference to FIGS. 1 through 21 for example. Namely, in this similar pair group search 335 of feature quantity 1, a point at infinity is set as an initial value of a nearest neighborhood vector candidate, distances between all member vectors in a search range and the input vector are computed one by one, and, every time a member vector nearest to the input vector is retrieved, a nearest neighborhood vector candidate is updated to the member vector. This search processing is repeated to get the nearest neighborhood vector in the vector group.

Then, a similar pair group of feature quantity obtained as a search result of the similar pair group search 335 of feature quantity 1 is used as initial value 336 (the center of the fourth layer from top), thereby executing similar pair group search 337 of feature 2 (the right side of the fourth layer from top). The search processing in the above-mentioned procedure causes a search result of the similar pair group search 337 of feature quantity 2 to become a neighborhood vector 338 in both of feature quantity 1 and feature quantity 2 (or a vector approximating the input vector in two types of feature quantities).

If search processing is started from a point at infinity as with similar pair group search 335 of feature quantity 1, it is possible for all member vectors to become the candidate of the nearest neighborhood vector. Therefore, such search processing comparatively increases the operational quantity in the nearest neighborhood vector search by the feature quantity comparison apparatus. In contrast, if search starts from a predetermined point as with similar pair group search 337 of feature quantity 2, the feature quantity comparison apparatus may omit the operation for far points that obviously do not provide the nearest neighborhood vector (those points which are farther than a predetermined point).

In FIG. 32, the feature quantity comparison apparatus searches for member vectors that provide neighborhood vectors of the input vector in both feature quantity 1 and feature quantity 2, so that it is unnecessary to make any member vectors that do not provide neighborhood vectors in similar pair group search 335 of feature quantity 1 subject to search in similar pair group search 337 of feature quantity 2. Therefore, as described above, by use of a search result in similar pair group search 335 of feature quantity 1 as the initial value of similar pair group search 337 of feature quantity 2, the feature quantity comparison apparatus may reduce the operational quantity in similar pair group search 337 of feature quantity 2.

Further, the above-mentioned comparison between feature quantities allows the feature quantity comparison apparatus to search for a neighborhood vector 338 of the input vector in both feature quantity 1 and feature quantity 2 only by executing similar pair group search 335 of feature quantity 1 and similar pair group search 337 of feature quantity 2 without independently executing the similar pair search of feature quantity 1 and the similar pair search of feature quantity 2 and making a comparison between search results to extract a pair satisfying both. This novel configuration also allows a reduction of a whole operation quantity.

Namely, in searching for a nearest neighborhood vector for an input vector that provides the nearest neighborhood on the basis of two or more evaluation standards in the image recognition based on feature vectors for example, the above-mentioned search allows the feature quantity comparison apparatus to sequentially execute neighborhood searches based on two or more evaluation standards and determine that there exists no nearest neighborhood vector providing the nearest neighborhood based on two or more evaluation standards at the detection of a neighborhood vector nearer than a nearest neighborhood vector retrieved by the neighborhood computation at the previous stage, thereby providing a high-speed search of a neighborhood vector of an input vector that satisfies two or more conditions (or the nearest neighborhood search based on two or more evaluation standards) by discontinuing the neighborhood search. In other words, the present feature quantity comparison apparatus is able to quickly search sets for desired elements that satisfy a plurality of conditions.

The following describes an example of an apparatus to which the above-mentioned feature quantity comparison method is applied.

Figure 33:
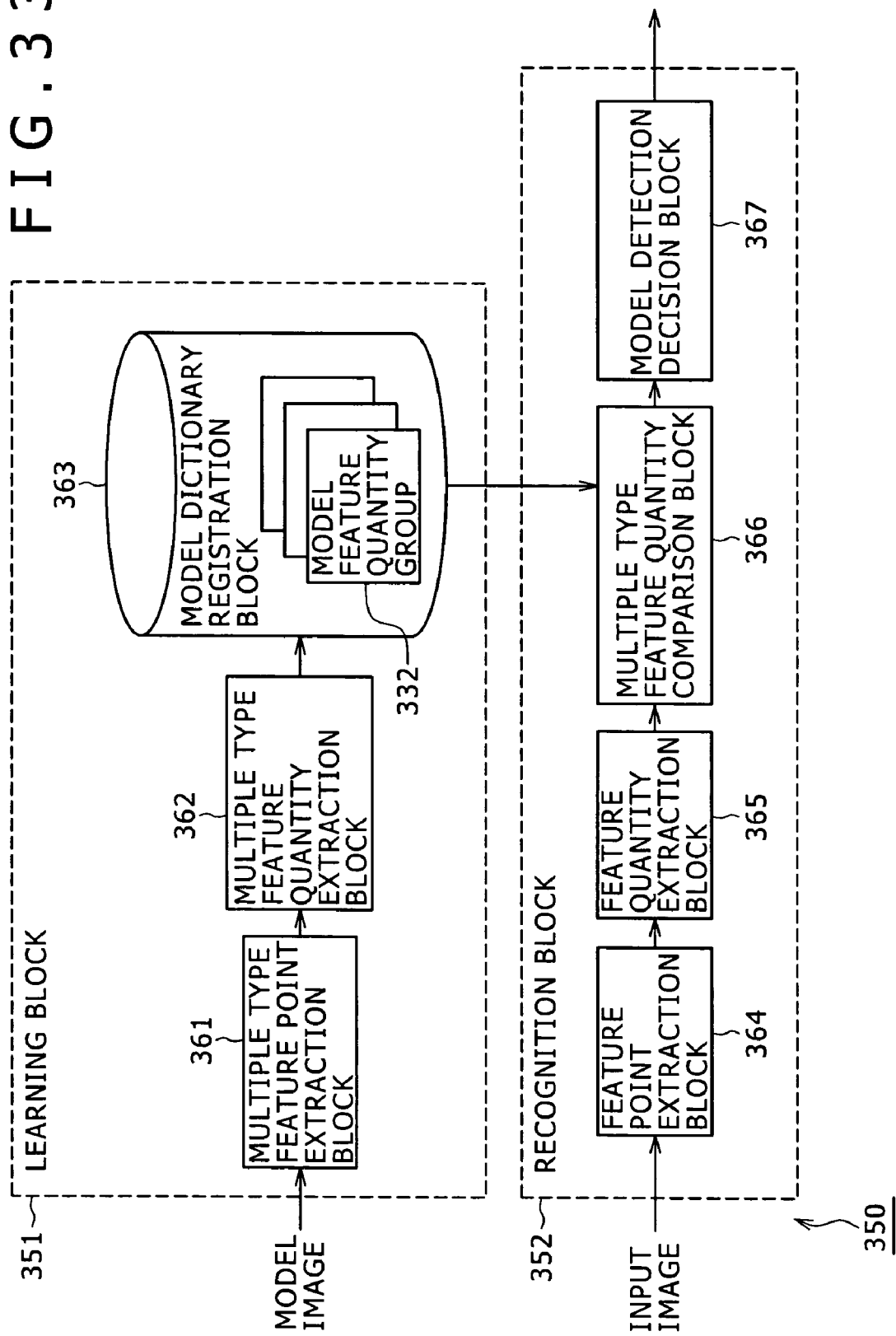
FIG. 33 is a block diagram illustrating still another exemplary configuration of the image processing apparatus according to the invention.

Referring to FIG. 33, there is shown a diagram illustrating another exemplary configuration of an image processing apparatus practiced as one embodiment of the invention.

In FIG. 33, an image processing apparatus 350 has a learning block 351 and a recognition block 352. The learning block 351 is a processing block for preparing a model image for use in the comparison of feature quantities and has a multiple type feature point extraction block 361, a multiple type feature quantity extraction block 362, and model dictionary registration block 363.

The multiple type feature point extraction block 361 extracts feature points of multiple types from an inputted model image and supplies the extracted feature points and the model image to the multiple type feature quantity extraction block 362. It should be noted that the multiple type feature point extraction block 361 is substantially the same as the feature point extraction block 241 shown in FIG. 23 except that two or more types of feature points are extracted from a model image (for example, the same in the extraction method of feature points), so that detail description thereof will be skipped.

The multiple type feature quantity extraction block 362 extracts, from a model image, the feature quantity of each feature point extracted by the multiple type feature point extraction block 361 and supplies the extracted feature quantity to the model dictionary registration block 363 as a model feature quantity. It should be noted that the multiple type feature quantity extraction block 362 is substantially the same as the feature quantity extraction block 242 shown in FIG. 23 except that the number of types of feature points to be extracted from a model image is plural (for example, the same in the extraction method of feature quantity of each feature point), so that detail description thereof will be skipped.

The model dictionary registration block 363 registers a model feature quantity group 332 supplied from the multiple type feature quantity extraction block 362 into a model dictionary for storage therein. Also, the model dictionary registration block 363 supplies the model feature quantity group 332 to a multiple type feature quantity comparison block 366 of the recognition block 352. It should be noted that the model dictionary registration block 363 is substantially the same as the model dictionary registration block 243 shown in FIG. 23 except that the number of model feature quantities to be held is plural (for example, a method of holding model feature quantities), so that detail description thereof will be skipped.

The recognition block 352 compares the feature vector of an input image with the feature vector of a model image registered with the model dictionary in the learning block 351 to recognize the input image and has a feature point extraction block 364, a feature quantity extraction block 365, a multiple type feature quantity comparison block 366, and a model detection decision block 367.

The feature point extraction block 364 extracts a predetermined feature point from the entered input image and supplies the extracted feature point and the input image to the feature quantity extraction block 365. The feature point extraction block 364 is basically the same in configuration as the feature point extraction block 244 shown in FIG. 23 and executes the similar processing, so that detail description thereof will be skipped.

The feature quantity extraction block 365 extracts the feature quantity of the feature point extracted by the feature point extraction block 364 and supplies the information about the feature quantity to the multiple type feature quantity comparison block 366. The feature quantity extraction block 365 is basically the same in configuration as the feature quantity extraction block 245 shown in FIG. 23 and executes the similar processing, so that detail description thereof will be skipped.

The multiple type feature quantity comparison block 366 compares the feature vector (or the input vector) of the input image with the model feature quantity group 332 held in the model dictionary registration block 363 on the basis of the feature quantity of the input image supplied from the feature quantity extraction block 365 and searches for a member vector to be neighborhood vector of the input vector for all feature points of plural types to make a comparison between the feature of the input image and the feature of the model image, supplying a result of this comparison to the model detection decision block 367. Details of the multiple type feature quantity comparison block 366 will be described later.

The model detection decision block 367 determines on the basis of the comparison result obtained by the multiple type feature quantity comparison block 366 whether a feature of the model image has been detected from the input image. The model detection decision block 367 is basically the same in configuration as the model detection decision block 247 shown in FIG. 23 and executes the similar processing, so that detail description thereof will be skipped.

Figure 34:
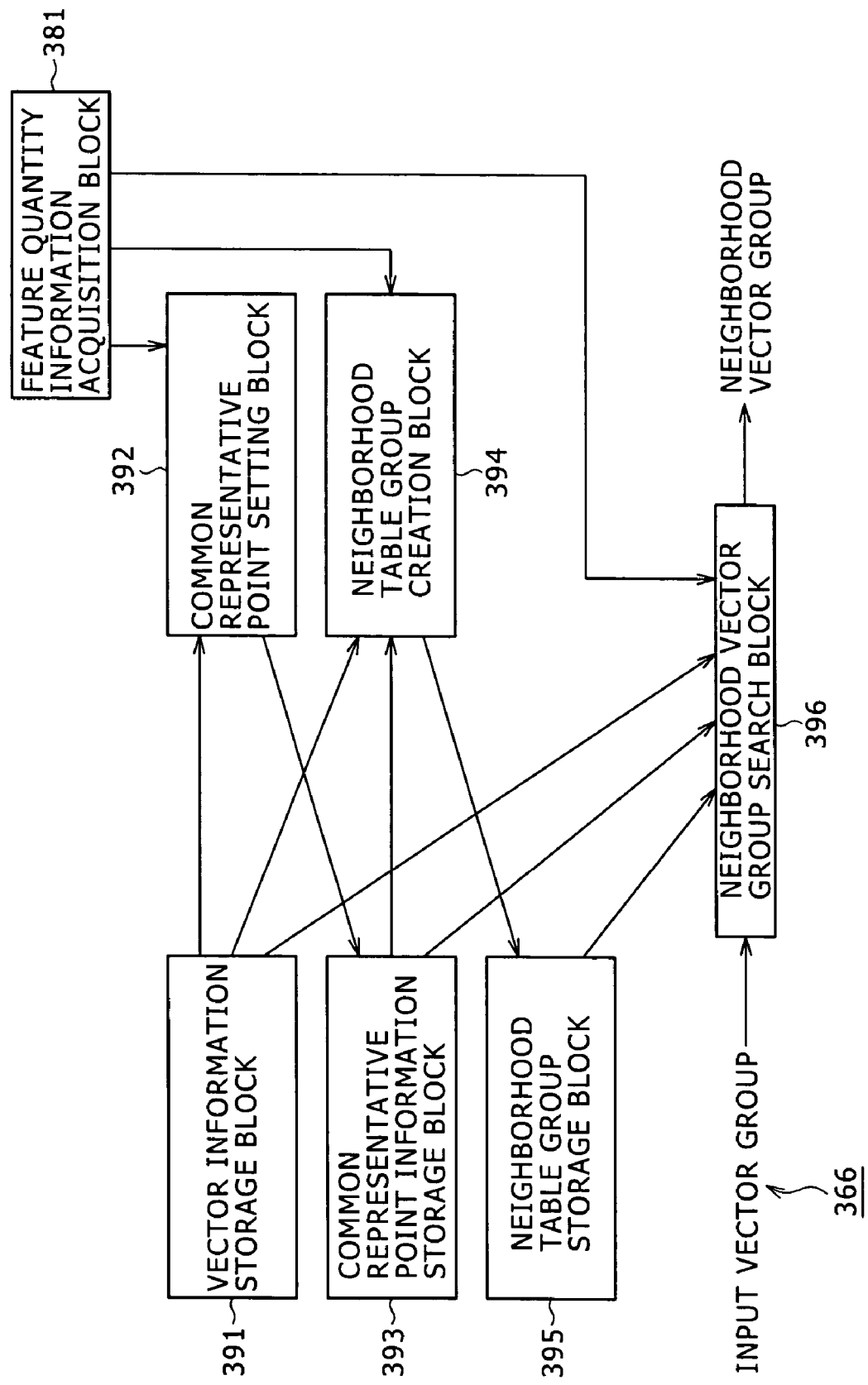
FIG. 34 is a block diagram illustrating a detail exemplary configuration of a multiple type feature quantity comparison block shown in FIG. 33.

Referring to FIG. 34, there is shown a block diagram illustrating a detail exemplary configuration of the multiple type feature quantity comparison block 366 shown in FIG. 33.

In FIG. 34, the multiple type feature quantity comparison block 366 has a feature quantity information acquisition block 381, a vector information storage block 391, a common representative point setting block 392, a common representative point information storage block 393, a neighborhood table group creation block 394, a neighborhood table group storage block 395, and a neighborhood vector group search block 396.

The feature quantity information acquisition block 381 gets, from the outside (through user input for example), feature quantity information for identifying a type of a feature point subject to comparison and supplies the obtained feature quantity information to the common representative point setting block 392, the neighborhood table group creation block 394, and the neighborhood vector group search block 396 as required.

The vector information storage block 391, the common representative point setting block 392, the common representative point information storage block 393, the neighborhood table group creation block 394, and neighborhood table group storage block 395 are substantially the same in configuration as the vector information storage block 11, the common representative point setting block 12, the common representative point information storage block 13, the neighborhood table group creation block 14, and the neighborhood table group storage block 15 shown in FIG. 1 and execute the similar processing except that the former execute processing on each of the feature vectors of two or more types. Therefore, detail description of the former will be skipped.

The neighborhood vector group search block 396 searches a neighborhood vector group for an input vector group on the basis of the vector information obtained from the vector information storage block 391, the common representative point information obtained from the common representative point information storage block 393, and neighborhood table group obtained from the neighborhood table group storage block 395. Then, the neighborhood vector group search block 396 supplies, the neighborhood vector group, a result of the search, to the model detection decision block 367 (FIG. 33).

Figure 36:
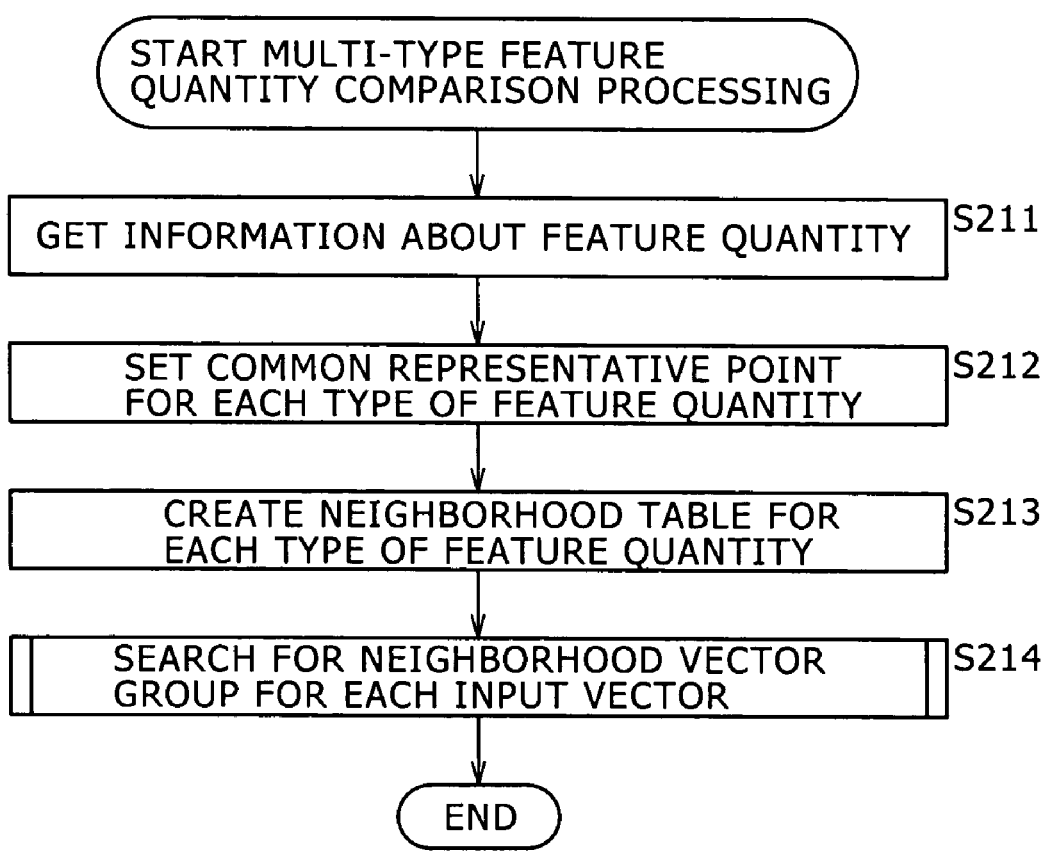
FIG. 36 is a flowchart indicative of multiple type feature quantity comparison processing.

Referring to FIG. 35, there is shown a block diagram illustrating a detail exemplary configuration of the neighborhood vector group search block 396 shown in FIG. 36. In FIG. 36, the neighborhood vector group search block 396 has an initialization processing block 411, a neighborhood vector group search control block 412, a neighborhood vector search block 413, a feature-classified neighborhood vector candidate setting block 414, a change flag confirmation block 415, and a neighborhood vector setting block 416.

The initialization processing block 411 executes initialization processing such as initializing a variable necessary for the search for a neighborhood vector group to an initial value. For example, the initialization processing block 411 initializes a feature-classified neighborhood vector candidate that is a neighborhood vector corresponding to one input vector, sets variable j ($0 \leq j \leq M-1$) to an initial value (for example, "0"), and initializes the change flag of the feature-classified neighborhood vector candidate. The change flag will be described later.

The neighborhood vector group search control block 412 executes control processing associated with the search for a neighborhood vector group that satisfies conditions for all types of features set as subject to search. The neighborhood vector search block 413 searches a feature-classified neighborhood vector for each input vector. At this moment, the neighborhood vector search block 413 computes distances between the input vector and model member vectors one by one as described before with reference to FIGS. 1 through 21. If a member vector having a distance shorter than the candidate of the feature-classified neighborhood vector is retrieved, then the neighborhood vector search block 413 updates the information about the feature-classified neighborhood vector candidate, nominating this member vector as the candidate. Repeating the above-mentioned processing, the neighborhood vector search block 413 nominates the feature-classified neighborhood vector candidate finally held as a feature-classified neighborhood vector (or a result of the search processing).

The feature-classified neighborhood vector candidate setting block 414 sets the last search result (or the feature-classified neighborhood vector) obtained by the neighborhood vector search block 413 to the initial value of a feature-classified neighborhood vector candidate in a next search operation. By use of this feature-classified neighborhood vector candidate, the feature-classified neighborhood vector candidate setting block 414 executes feature-classified neighborhood vector search on a new input vector.

If a candidate of a feature-classified neighborhood vector is updated in the search for this neighborhood vector, the neighborhood vector search block 413 sets a change flag indicative of this update. The feature-classified neighborhood vector candidate setting block 414 supplies the information about this change flag to the change flag confirmation block 415.

The change flag confirmation block 415 makes confirmation of the supplied change flag and supplies a result of this confirmation to the neighborhood vector group search control block 412. The change flag is indicative that a neighborhood vector candidate has changed and is provided for every candidate. Namely, any candidate on which the change flag is set is indicative that this candidate has been updated at least once.

On the basis of the above-mentioned confirmation result, the neighborhood vector group search control block 412 controls the search processing of a neighborhood vector group. For example, when there is no more unchanged feature-classified neighborhood vector candidate, the neighborhood vector group search control block 412 ends the neighborhood vector group search processing and controls each component to start the search processing for a next vector group. Also, if there is any unchanged feature-classified neighborhood vector candidate with no change flag set up when the dimension compression block 314 ends the search for feature-classified neighborhood vectors of all input vectors for example, the neighborhood vector group search control block 412 supplies that feature-classified neighborhood vector (candidate) to the neighborhood vector setting block 416.

Under the control of the neighborhood vector group search control block 412, the neighborhood vector setting block 416 sets an unchanged feature-classified neighborhood vector (candidate) as a neighborhood vector (group).

The following describes a flow of multiple type feature quantity comparison processing to be executed by the multiple type feature quantity comparison block 366 (FIG. 36) of the image processing apparatus 350 (FIG. 33), with reference to the flowchart shown in FIG. 36.

When multiple type feature quantity comparison processing starts, the feature quantity information acquisition block 381 of the multiple type feature quantity comparison block 366 gets information about feature quantities (or feature vectors) subject to comparison from the model dictionary registration block 363 or user input in step S211. The feature quantity information acquisition block 381 supplies the obtained information to the common representative point setting block 392 and the neighborhood table group creation block 394, upon which the procedure goes to step S212.

In step S212, on the basis of the vector information obtained from the vector information storage block 391 (or the vector information supplied from the model dictionary registration block 363 and stored in the vector information storage block 391), the common representative point setting block 392 sets a common representative point for each type of feature quantity (for each feature vector type). Having set the common representative point, the common representative point setting block 392 supplies the common representative point to the common representative point information storage block 393 for storage therein, upon which the procedure goes to step S213.

In step S213, on the basis of the vector information obtained from the vector information storage block 391 (or the vector information supplied from the model dictionary registration block 363 and stored in the vector information storage block 391) and the common representative point information obtained from the common representative point information storage block 393 (or the common representative point set by the processing of step S212), the neighborhood table group creation block 394 creates a neighborhood table for each type of feature quantity (or for each feature vector type). Having created the neighborhood table, the neighborhood table group creation block 394 supplies the created neighborhood table to the neighborhood table group storage block 395 for storage therein, upon which the procedure goes to step S214.

In step S214, on the basis of the vector information obtained from the vector information storage block 391 (or the vector information supplied from the model dictionary registration block 363 and stored in the vector information storage block 391), the common representative point information obtained from the common representative point information storage block 393 (or the common representative point set by the processing of step S212), and the neighborhood table group obtained from the neighborhood table group storage block 395, the neighborhood vector group search block 396 searches a neighborhood vector group corresponding to the entered input vector group. Details of this neighborhood vector group search processing will be described later. Having retrieved the neighborhood vector, the neighborhood vector group search block 396 supplies the retrieved neighborhood vector group to the model detection decision block 367 (FIG. 33), thereby ending the multiple type feature quantity comparison processing.

Figure 37:
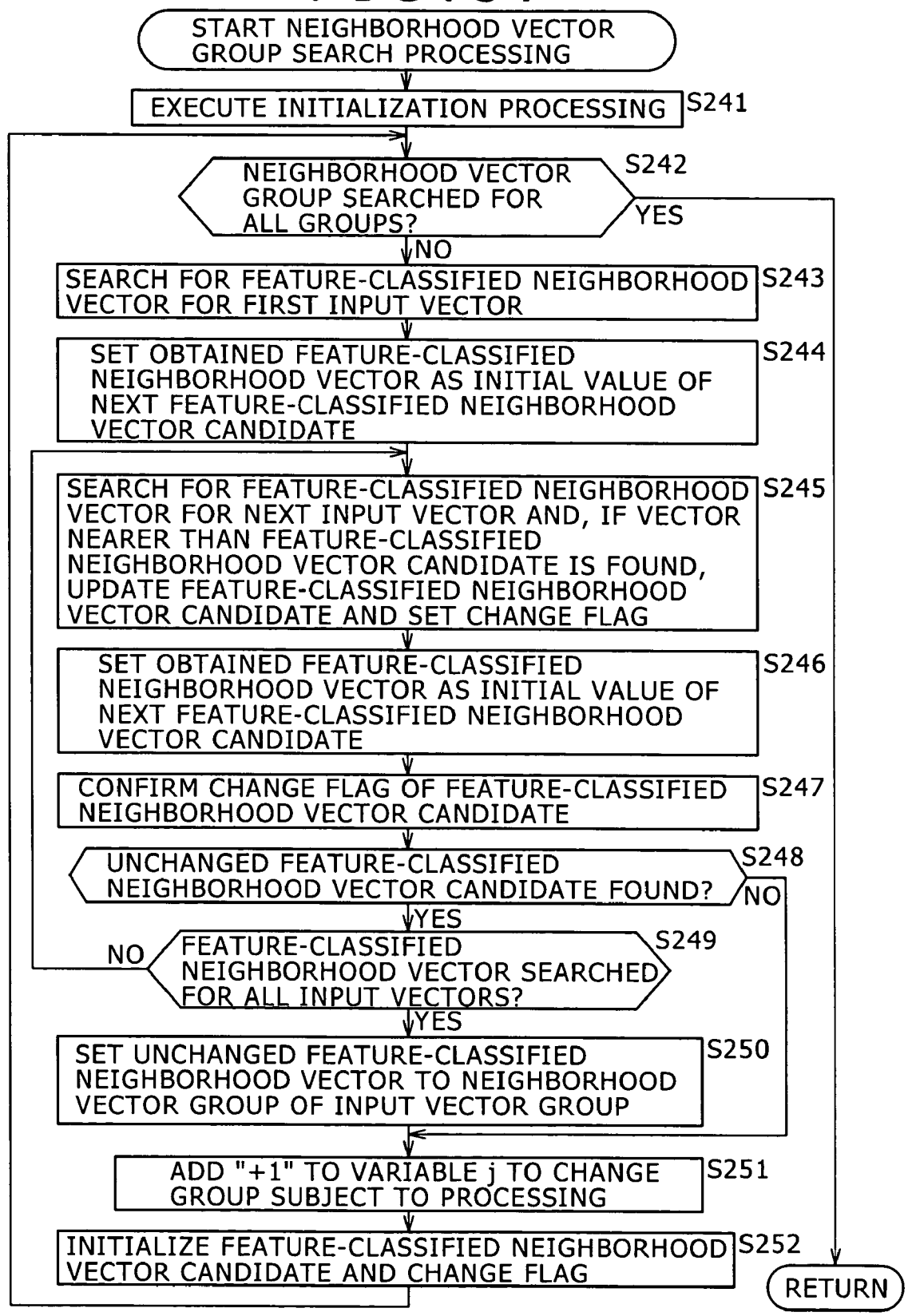
FIG. 37 is a flowchart indicative of neighborhood vector group search processing.

The following describes a flow of neighborhood vector group search processing executed in step S214 shown in FIG. 36, with reference to the flowchart shown in FIG. 37.

When neighborhood vector group search processing starts, the initialization processing block 411 of the neighborhood vector group search block 396 executes initialization processing in step S241, thereby setting a feature-classified neighborhood vector candidate to a point at infinity as an initial value, initializing the setting of change flag, and setting the value of variable j indicative of a vector group subject to processing to an initial value ("0" for example). After the initialization processing, the initialization processing block 411 supplies a result thereof to the neighborhood vector group search control block 412, upon which the procedure goes to step S242.

In step S242, the neighborhood vector group search control block 412 determines whether all vector groups have been searched for a neighborhood vector group of the input vector group. If there remain any vector groups not yet searched, then the neighborhood vector group search control block 412 supplies the information thereof to the neighborhood vector search block 413, upon which the procedure goes to step S243.

In step S243, the neighborhood vector search block 413 searches for a feature-classified neighborhood vector for the first input vector. This search may be made in any search method; for example, the nearest neighborhood vector search processing described before with reference to the flowchart shown in FIG. 19 may be used. The number of vectors subject to search may be one or more. Having retrieved the feature-classified neighborhood vector, the neighborhood vector search block 413 supplies the retrieved vector to the feature-classified neighborhood vector candidate setting block 414, upon which the procedure goes to step S244.

In step S244, the feature-classified neighborhood vector candidate setting block 414 sets the retrieved vector as an initial value of a feature-classified neighborhood vector candidate in a next search operation and supplies the information thereof to the neighborhood vector search block 413, upon which the procedure goes to step S245.

In step S245, the neighborhood vector search block 413 searches for a feature-classified neighborhood vector for a next input vector. In this search operation, if a vector nearer than the feature-classified neighborhood vector candidate has been retrieved, the neighborhood vector search block 413 updates the feature-classified neighborhood vector candidate and makes the retrieved vector the feature-classified neighborhood vector candidate, thereby setting up a change flag corresponding to this feature-classified neighborhood vector candidate. When the search processing ends, the neighborhood vector search block 413 supplies the final feature-classified neighborhood vector candidate to the feature-classified neighborhood vector candidate setting block 414 as the feature-classified neighborhood vector. Also, the neighborhood vector search block 413 supplies the information about the change flag to the feature-classified neighborhood vector candidate setting block 414.

In step S246, the feature-classified neighborhood vector candidate setting block 414 sets the vector retrieved this time as an initial value of a feature-classified neighborhood vector candidate in a next search operation like the case of step S244. At this moment, the value of the change flag is left unchanged. Further, the feature-classified neighborhood vector candidate setting block 414 supplies the information thereof to the neighborhood vector search block 413 and supplies the information about the change flag of each feature-classified neighborhood vector candidate to the change flag confirmation block 415, upon which the procedure goes to step S247.

In step S247, the change flag confirmation block 415 makes confirmation of the status of the change flag of the supplied feature-classified neighborhood vector candidate and supplies a result of this confirmation to the neighborhood vector group search control block 412, upon which the procedure goes to step S248.

In step S248, the neighborhood vector group search control block 412 determines on the basis of the supplied confirmation result whether there is any unchanged feature-classified neighborhood vector candidate. If any unchanged feature-classified neighborhood vector candidate is found, the neighborhood vector group search control block 412 causes the procedure to go to step S249, in which the neighborhood vector group search control block 412 determines whether search for the feature-classified neighborhood vector for all input vectors of the entered input vector group.

If any input vector not yet processed is found in the entered input vector group, the neighborhood vector group search control block 412 supplies a result of this decision to the neighborhood vector search block 413, upon which the procedure returns to step S245 to execute the processing on a next input vector. Namely, the neighborhood vector group search control block 412, the neighborhood vector search block 413, the feature-classified neighborhood vector candidate setting block 414, and the change flag confirmation block 415 repeat steps S245 through S249 until the neighborhood vector group search control block 412 determines that there is no more unchanged feature-classified neighborhood vector candidate in step S248 or search has been made for the feature-classified neighborhood vector for all input vectors of the entered input vector group in step S249.

If the search for the feature-classified neighborhood vector is found made for all input vectors of the entered input vector group in step S249, then the neighborhood vector group search control block 412 supplies the feature-classified neighborhood vector to the neighborhood vector setting block 416, upon which the procedure goes to step S250.

In step S250, the neighborhood vector setting block 416 sets an unchanged feature-classified neighborhood vector among the supplied feature-classified neighborhood vectors to the neighborhood vector group of the input vector group. When the setting has been completed, the neighborhood vector setting block 416 supplies that neighborhood vector group to the model detection decision block 367 (FIG. 33) and notifies the neighborhood vector group search control block 412 of the end of the processing, upon which the procedure goes to step S251.

If change flags of all feature-classified neighborhood vector candidates are set up and there is no unchanged feature-classified neighborhood vector candidates in step S248, then the neighborhood vector group search control block 412 determines that there is no vector in the neighborhood of the input vector in that vector group (namely determines that no desired neighborhood vector group cannot be obtained in that vector group) and ends the search of the neighborhood vector group in that vector group, upon which the procedure goes to step S251.

In step S251, the neighborhood vector group search control block 412 adds "1" to the value of variable j to change vector groups subject to processing. Also, the neighborhood vector group search control block 412 initializes the feature-classified neighborhood vector candidate in step S252 to set a virtual point at infinity, upon which the procedure returns to step S242 to repeat the above-mentioned processing therefrom.

Namely, the neighborhood vector group search control block 412, the neighborhood vector search block 413, the feature-classified neighborhood vector candidate setting block 414, and the change flag confirmation block 415 repeat steps S242 through S252 until the neighborhood vector group search control block 412 determines in step S242 that search has been made for the neighborhood vector group in all vector groups.

If a neighborhood vector group is found in all vector groups in step S242, then the neighborhood vector group search control block 412 ends the neighborhood vector group search processing, upon which the procedure returns to step S214 shown in FIG. 36 and then ends the multiple type feature quantity comparison processing.

As described above, use of a search result of one feature vector by the search for another feature vector allows the neighborhood vector group search block 396 to reduce unnecessary operational quantities, thereby providing a high-speed search for the neighborhood vector group for an input vector group. Namely, if there are two or more vector sets subject to search and comparison is made between an input vector group made up of input vectors of plural types and a vector group subject to search, the neighborhood vector group search block 396 is able to quickly search each vector set for the neighborhood vector group for each input vector group.

Therefore, if there are two or more vector sets subject to search and comparison is made between an input vector group made up of input vectors of plural types and a vector set subject to search, the image processing apparatus 350 is able to quickly search each vector set for the neighborhood vector group for each input vector group. Namely, if there are two or more sets subject to search and search is made for elements of two or more types, the image processing apparatus 350 is able to quickly search each set for a desired element group.

It should be noted that, in the above-mentioned example, there are two or more vector groups (or models) subject to search; however, the search method in which features subject to search of two or more types are compared may also be applied to the case where there is only one vector group subject to search. Namely, the search method in which a search result of one feature vector is used by the search for another feature vector may only have two or more types of features subject to search (or two or more types of input vectors) and therefore is independent of the number of vector groups providing models.

Consequently, if a comparison is made between the subject of search and features of two or more types, the image processing apparatus 350 is able to quickly search for the neighborhood vector group for an input vector made up of input vectors having different types. Namely, if a comparison is made between the subject of search and features of two or more types, the image processing apparatus 350 is able to quickly search each set subject to search for a desired element group.

It should be noted that each of the above-mentioned apparatuses may be configured by two or more blocks obtained on the basis of the above-mentioned processing block unit for example. Obviously, any unit of division may be used or any unit other than the above-mentioned processing blocks. Two or more apparatuses described above may be configured into one apparatus. Functions not described above may be combined into any of the above-mentioned apparatuses. Unless there are contradictions or troubles, the above-mentioned functions (or processing blocks) may be partially omitted. Certain processing to be executed by a particular processing block may be executed by another processing block.

In addition, the search processing method according to the invention may be applied to other than image processing; for example, the search processing may be applicable to information processing on such data other than image data as audio data and text data.

The above-mentioned sequence of processing operations may be executed by software as well as hardware. In this case, for example, the feature quantity comparison apparatus 10 shown in FIG. 1, the feature quantity comparison system 200 shown in FIG. 22, the image processing apparatus 230 shown in FIG. 23, the image processing apparatus 250 shown in FIG. 24, the feature quantity comparison apparatus 280 shown in FIG. 25, and the image processing apparatus 350 shown in FIG. 33 may be configured as a personal computer shown in FIG. 38.

Referring to FIG. 38, a CPU (Central Processing Unit) 501 of a personal computer 500 executes various processing operations as specified by programs stored in a ROM (Read Only Memory) 502 or programs loaded from a storage unit 513 into a RAM (Random Access Memory) 503. The RAM 503 also stores data that is required for the CPU 501 to execute various processing operations, for example.

The CPU 501, the ROM 502, and the RAM 503 are interconnected via a bus 504. This bus 504 is also connected with an input/output interface 510.

The input/output interface 510 is connected with a drive 515 as required on which a removable medium such as a magnetic disc, an optical disc, a magneto-optical disc, or a semiconductor memory is loaded from time to time, computer programs read from any of these storage media being installed in the storage unit 513 as required.

For the above-mentioned sequence of processing operations to be executed by software, the programs making up the software are installed from a network or recording media.

As shown in FIG. 38, these storage media are constituted by not only a package media made up of the magnetic disk (including flexible disks), the optical disk (including CD-ROM (Compact Disk Read Only Memory) and DVD (Digital Versatile Disk)), the magneto-optical disk (including MD (Mini Disk) (trademark)), or the semiconductor memory which is distributed separately from the apparatus itself, but also the ROM 502 or the storage unit 513 which stores programs and is provided to users as incorporated in the apparatus itself.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

What is claimed is:

1. An information processing apparatus for searching a plurality of sets for a desired element, comprising:
   a processor;
   a memory;
   common representative point setting means for setting common representative points that are a predetermined number of elements of a set obtained by averaging features of the plurality of sets;
   neighborhood table creation means for creating, for each of the plurality of sets, a neighborhood table comprising table information associated with elements of each of the plurality of sets located in the neighborhood of each common representative point based on the common representative points, wherein the neighborhood table lists distance information of the elements, and wherein the distance information for one of the elements is half of a distance from the one of the elements to the common representative point of the one of the elements; and
   search means for searching elements registered in the neighborhood table for the desired element,
   wherein the search means searches the elements registered in the neighborhood table for the desired element only when a distance of the desired element from the common representative point is smaller than a maximum value of the distance information corresponding to the common representative point in the neighborhood table,
   wherein the search means searches all the elements of the plurality of sets for the desired element when the distance of the desired element from the common representative point is bigger than or equal to the maximum value of the distance information corresponding to the common representative point in the neighborhood table, and
   wherein the common representative points setting means sets the common representative points by:
      selecting a target count for the common representative points,
      computing a first common representative point,
      computing, until a number of the common representative points is equal to or larger than the target count, new common representative points based on temporary points obtained by dividing each existing common representative point into two.

2. The information processing apparatus according to claim 1, wherein the common representative point setting means sets the common representative points based on all elements in the plurality of sets.

3. The information processing apparatus according to claim 1, wherein the common representative point setting means sets the common representative points based on a part of the elements in the plurality of sets.

4. The information processing apparatus according to claim 1, wherein the search means searches the elements registered in the neighborhood table for an element nearest to the desired element.

5. The information processing apparatus according to claim 4, wherein the neighborhood table lists the predetermined number of elements in an ascending order of the distance information of each one of the elements.

6. The information processing apparatus according to claim 1, further comprising:
   main component analysis means for analyzing a main component of a distribution of elements of the plurality of sets; and
   coordinate conversion means for converting coordinates of the elements such that the main component becomes one of coordinate axes.

7. The information processing apparatus according to claim 6, further comprising:
   dimension compression means for compressing the number of dimensions of the distribution of the elements, wherein the compressing reduces the number of dimensions.

8. The information processing apparatus according to claim 1, wherein the search means searches for elements of different types.

9. The information processing apparatus according to claim 8, wherein the search means searches for an element near a first element of the elements of different types and uses a result of this search for a search operation for an element near a second element of the elements of different types.

10. The information processing apparatus according to claim 1, wherein the common representative points setting means further allocates each one of the elements to one of the common representative points.

11. An information processing method for an information processing apparatus for searching a plurality of sets for a desired element, comprising:
   setting, by a computer, common representative points that are a predetermined number of elements of a set obtained by averaging features of the plurality of sets;
   creating, by the computer, for each of said plurality of sets, a neighborhood table comprising table information associated with elements of each of the plurality of sets located in the neighborhood of each common representative point on the basis of the common representative points, wherein the neighborhood table lists distance information for the elements, and wherein the distance information for one of the elements is half of a distance from the one of the elements to the common representative point of the one of the elements;
   searching, by the computer, elements registered in the neighborhood table for the desired element only when a distance of the desired element from the common representative point is smaller than a maximum value of the distance information corresponding to the common representative point in the neighborhood table; and
   searching, by the computer, all the elements of the plurality of sets for the desired element when the distance of the desired element from the common representative point is bigger than or equal to the maximum value of the distance information corresponding to the common representative point in the neighborhood table,
   wherein setting the common representative points further comprises:
      selecting a target count for the common representative points,
      computing a first common representative point,
      computing, until a number of the common representative points is equal to or larger than the target count, new common representative points based on temporary points obtained by dividing each existing common representative point into two.

12. A computer-readable medium including program instructions, which when executed by a processor, performs a method for searching each of a plurality of sets for a desired element, the method comprises:
   setting common representative points that are a predetermined number of elements of a set obtained by averaging features of the plurality of sets;
   creating, for each of said plurality of sets, a neighborhood table comprising table information associated with elements of each of the plurality of sets located in the neighborhood of each common representative point on the basis of the common representative points, wherein the neighborhood table lists distance information for the elements, and wherein the distance information for one of the elements is half of a distance from the one of the elements to the common representative point of the one of the elements;
   searching elements registered in the neighborhood table for the desired element only when a distance of the desired element from the common representative point is smaller than a maximum value of the distance information corresponding to the common representative point in the neighborhood table; and
   searching all the elements of the plurality of sets for the desired element when the distance of the desired element from the common representative point is bigger than or equal to the maximum value of the distance information corresponding to the common representative point in the neighborhood table,
   wherein setting the common representative points further comprises:
      selecting a target count for the common representative points,
      computing a first common representative point,
      computing, until a number of the common representative points is equal to or larger than the target count, new common representative points based on temporary points obtained by dividing each existing common representative point into two.

* * * * *